US007216153B2

(12) United States Patent
Allen et al.

(10) Patent No.: US 7,216,153 B2
(45) Date of Patent: May 8, 2007

(54) TELECOMMUNICATIONS EQUIPMENT AND CUSTOMER INFORMATION RETRIEVAL SYSTEM

(75) Inventors: Michael L. Allen, Shawnee, KS (US); Craig E. Bosse, Katy, TX (US); Lisa A. Brickhaus, St. Charles, MO (US); Ajay Budhraja, St. Louis, MO (US); Saul E. Carter, Florissant, MO (US); Sherry Cerutti, Broken Arrow, OK (US); Brenda Gideon, Katy, TX (US); Terry J. Jackson, Fayetteville, AR (US); Dmitri Savintsev, Bloomington, IN (US); Ronald D. Staggs, Manchester, MO (US); Richard B. Stobaugh, Bryant, AR (US); Cheryl Weisenborn, Lee's Summit, MO (US)

(73) Assignee: AT&T Labs, Inc., Austin, TX (US)

( * ) Notice: Subject to any disclaimer, the term of this patent is extended or adjusted under 35 U.S.C. 154(b) by 173 days.

(21) Appl. No.: 10/902,096

(22) Filed: Jul. 30, 2004

(65) Prior Publication Data

US 2005/0021682 A1 Jan. 27, 2005

Related U.S. Application Data

(63) Continuation of application No. 10/346,106, filed on Jan. 17, 2003, now Pat. No. 6,810,415, which is a continuation of application No. 09/342,833, filed on Jun. 28, 1999, now Pat. No. 6,549,940.

(60) Provisional application No. 60/091,087, filed on Jun. 29, 1998.

(51) Int. Cl.
*G06F 15/16* (2006.01)

(52) U.S. Cl. ...................... 709/218; 709/219

(58) Field of Classification Search ................ 709/218, 709/219
See application file for complete search history.

(56) References Cited

U.S. PATENT DOCUMENTS

| 5,261,044 A | 11/1993 | Dev et al. |
| 5,295,244 A | 3/1994 | Dev et al. |
| 5,410,692 A | 4/1995 | Torres |

(Continued)

OTHER PUBLICATIONS

U.S. Appl. No. 10/346,106.

(Continued)

*Primary Examiner*—Krisna Lim
(74) *Attorney, Agent, or Firm*—Greenblum & Bernstein, P.L.C.

(57) ABSTRACT

A system for providing telecommunications equipment information and customer information that includes a display and a processor. The display displays a graphical user interface that allows a user to access the equipment information and the customer information. The graphical user interface includes at least one input area that allows a user to input search criteria, related to at least one of equipment data and customer data, to initiate a search. The graphical user interface also includes at least one results area that displays a result of the search, the result including at least one of the equipment information and the customer information related to the search criteria. The processor implements the search for at least one of the equipment information and the customer information in response to the input search criteria.

20 Claims, 66 Drawing Sheets

U.S. PATENT DOCUMENTS

| | | |
|---|---|---|
| 5,504,921 A | 4/1996 | Dev et al. |
| 5,541,928 A | 7/1996 | Kobayashi et al. |
| 5,600,643 A | 2/1997 | Robrock et al. |
| 5,644,736 A | 7/1997 | Healy et al. |
| 5,671,408 A | 9/1997 | McBride |
| 5,687,212 A | 11/1997 | Kinser et al. |
| 5,714,971 A | 2/1998 | Shalit et al. |
| 5,778,357 A * | 7/1998 | Kolton et al. .................. 707/2 |
| 5,790,633 A | 8/1998 | Kinser et al. |
| 5,790,634 A | 8/1998 | Kinser et al. |
| 5,813,014 A | 9/1998 | Gustman |
| 5,832,503 A | 11/1998 | Malik et al. |
| 5,848,410 A | 12/1998 | Walls et al. |
| 5,890,172 A * | 3/1999 | Borman et al. .......... 715/501.1 |
| 5,913,215 A | 6/1999 | Rubinstein |
| 5,924,090 A | 7/1999 | Krellenstein |
| 5,953,718 A | 9/1999 | Wical |
| 6,006,217 A | 12/1999 | Lumsden |
| 6,009,459 A * | 12/1999 | Belfiore et al. ............. 709/203 |
| 6,028,602 A | 2/2000 | Weidenfeller et al. |
| 6,065,047 A * | 5/2000 | Carpenter et al. .......... 709/218 |
| 6,070,176 A * | 5/2000 | Downs et al. .............. 715/513 |
| 6,081,837 A * | 6/2000 | Stedman et al. ............ 709/219 |
| 6,163,778 A * | 12/2000 | Fogg et al. .................... 707/10 |
| 6,523,022 B1 * | 2/2003 | Hobbs ............................ 707/3 |
| 6,549,940 B1 * | 4/2003 | Allen et al. ................. 709/219 |
| 6,810,415 B2 | 10/2004 | Allen et al. |
| 6,959,286 B2 * | 10/2005 | Perkowski ................... 705/27 |

OTHER PUBLICATIONS

CBM Information Systems, LLC, Telephony Software Solition Website printout including descriptions of CBM's Sonet GUI Systems, Copyright 1998.

* cited by examiner

FIG. 11

| Customer | Circuit ID | |
|---|---|---|
| 9-1-1-FRANKLIN-COUN | S46/EMDT/002951 /SW | SGR |
| 911-FRANKLIN-COUNTY | S49/EVNT/917522_000/SW | SGR |
| 911-FRANKLIN-COUNTY | S46/EVNT/917522_001/SW | SGR |
| 911-FRANKLIN-COUNTY | S46/EVNT/917522_002/SW | SGR |
| A-C-EXPRESS-INC | T46/FXNA/314/441/0188 | SGX |
| ATX/GEN-CORP-AUTOMOT | S41/HCGS/604809 /SW | SHP |
| ATX/GENCORP | S41/HCGS/608175 /SW | SKZ |
| CON/CONSOLIDATED-NTW | C103 /T1 /SLLVMOXA01T/ST1LSMO01H01 | CRS |
| HEALTHLINE-MERAMEC-M | S46/FDOA/468997 /SW | SHG |
| MCI | C102 /T1 /SLLVMOXA01T/STLSMOZFWMS | CRO |
| MCI/MCI-TELECOMMUNIC | C105 /T1 /SLLVMOXA01T/STLSMOZFWMS | CRS |
| SBT/1ST-COMM-NATL-BA | S41/LCGS/400305 /SW /X | SGV |
| SBT/MO-BAPTIST-HOSP | S41/HCGB/401100 /SW | SHP |
| SBT/NEW-HAVEN-PHILLI | S41/LCGS/400511 /SW /J | SGK |
| SBT/ST-JOHNS-MERCY | S41/HCGB/400977 /SW | SHG |
| C361 /T32 /SLLVMORC /STCLMOMA | | |

Your selection for SCID is: N74002

| SCID | TOPOLOGY | LEVEL | MODE | RACK | |
|---|---|---|---|---|---|
| N74002 | RING | OC03 | HSTNTXAD | 01150.04-3 | 8 |
| N74002 | RING | OC03 | HSTNTXBA | 01134.02-3 | 5 |
| N74002 | RING | OC03 | HSTNTXCA | 04429.18-4 | 1 |
| N74002 | RING | OC03 | HSTNTXCL | 01143.07-1 | 2 |
| N74002 | RING | OC03 | HSTNTXFA | 01137.07-1 | 4 |
| N74002 | RING | OC03 | HSTNTXGP | 01110.05-4 | 6 |
| N74002 | RING | OC03 | HSTNTXOV | 01140.06-3 | 0 |
| N74002 | RING | OC03 | HSTNTXOV | 01134.06-3 | 3 |
| N74002 | RING | OC03 | HSTNTXWE | 01109.33-4 | 7 |

Listing for N74002

Draw  Reports 9 records retrieved.

FIG. 28

EFIS

File Edit View EFIS Window Help

Emergency Facility Information System

SONET Node List Report

N74002   OC03   RING                          6/25/98

| Node | Node Location | Rack | Cable and Pairs | CAC | East HECIGE |
|---|---|---|---|---|---|
| 1 | HSTNTXCA | 04429.18-4 | F582 3/4 | CBQ6JH5 | SNMSBGJ2 |
| 0 | HSTNTXOR | FIBER X-CONNECT | F581 17/18 | CBQ6JH5 | |
| 0 | HSTNTXNE | FIBER X-CONNECT | F675 13/22 | CBQ6JH5 | |
| 0 | HSTNTXOX | FIBER X-CONNECT | F480 56/56 | CBQ6JH5 | |
| 8 | HSTNTXAD | 01150.04-3 | F481 33/34 | CBQ6JH4 | SNMSBGJ2 |
| 7 | HSTNTXWE | 01109.33-4 | F802 5/6 | CBQ6JH3 | SNMSBGJ2 |
| 6 | HSTNTXGP | 01110.05-4 | F495 21/22 | CBQ6JH2 | SNMSBGJ2 |
| 5 | HSTNTXBA | 01134.02-3 | F580 1/2 | CBQ6NA9 | SNMSBGJ2 |
| 0 | HSTNTXSA | FIBER X-CONNECT | F491 7/8 | CBQ6NA9 | |
| 4 | HSTNTXFA | 01137.07-1 | F588 15/16 | CBQ6NV8 | SNMSBGJ2 |
| 3 | HSTNTXOV | 01140.06-3 | F890 21/22 | CBQ6NU5 | SNMSBGJ2 |
| 0 | HSTNTXUN | FIBER X-CONNECT | F768 17/18 | CBQ6NU5 | |
| 0 | HSTNTXJA | FIBER X-CONNECT | F525 47/48 | CBQ6NU5 | |

Prints the item

FIG. 32

CIRCUIT/FACILITY
MAIN MENU

CABLE LISTING
LOOKUP BY
CIRCUIT

CUSTOM
REPORTS

TELECOMMUNICATIONS EQUIPMENT AND CUSTOMER INFORMATION RETRIEVAL SYSTEM

CROSS REFERENCE OF THE RELATED APPLICATION

This is a continuation of U.S. application Ser. No. 10/346,106, filed on Jan. 17, 2003, now U.S. Pat. No. 6,810,415, issued on Oct. 26, 2004, which is a continuation of U.S. application Ser. No. 09/342,833, filed on Jun. 28, 1999, now U.S. Pat. No. 6,549,940, issued on Apr. 15, 2003 and which claims the benefit of U.S. Provisional Application No. 60/091,087, filed on Jun. 29, 1998, the contents of which are expressly incorporated herein by reference in their entireties.

BACKGROUND OF THE INVENTION

1. Field of the Invention

This invention relates to communication circuits and customer data information systems, and more specifically to communication circuits and customer data information systems that provide easy, efficient, and accurate access to the customer data information for use during emergency situations involving facility failures and service outages.

2. Discussion of Background Information

Telecommunications networks provide communication paths or routes for communication between a source or origination point and a destination or termination point. These networks may include millions of circuits, or signal paths, that provide the routes for communication between a source location and a destination location. There are many types of circuits, from those that carry a single signal to those that carry multiple signals. Also, these various types of circuits may have various information transfer rates or bandwidth. Due to the many types of circuits, a communication from a source to a destination may have a variety of paths that it may take to get from source location to the destination location. This availability of a variety of paths is important should a particular circuit or path breakdown for some reason. In these situations, a communication from a source to a destination may be rerouted from a path through circuits that would normally be used, but are faulty, to an alternate path of circuits that successfully route the communication.

However, before a communication can be rerouted, a determination must be made as to how, or if, it can be rerouted. To help make this determination, all information related to the communication network, including the circuits and other information, may need to be reviewed. This information may be stored in a database. Personnel that service and/or maintain the communications network may use a facility information system which provides a user interface that allows users (e.g., service personnel) to review details regarding the communications network. This facility information system provides access to the database and presents specific information about the communications network based on input from the user. Therefore, should a circuit have problems, data related to the faulty circuit may be obtained from the database. This data may contain information regarding other affected circuits, affected customers, and possible alternative routes.

Current facility information systems provide a user interface that is character based. This presents problems in that it is cumbersome to navigate around using this interface. Most options must be accessed by traversing through a tree of menu options. Also, if a user starts out in one menu, and traverses through the tree to get to the option desired, after selection of the option, the user must back out of the menu tree to get back to the original starting menu screen. This can be time consuming and inconvenient for the user who must remember how to get back to where (s)he started.

Further, current facility information systems access databases that only contain information related to the circuits of the communications network that reside in that area. For example, information related to the circuits for a particular state would reside in a database located in that state. Facility information systems in that state generally have access to the database that contains information regarding the circuits of the communications network that are located in that particular state. This presents a problem where customers that use these circuits, and circuits that reside in different states and that connect to these, are affected. These customers may be affected when a faulty circuit in one state affects circuits in other states, but the facility information system can only access information related to circuits of the state of the faulty circuit. Such customers may include common carriers such as AT&T, MCI, and Sprint, or private carriers. The users of the facility information system will usually work for service providers that provide the communication network and telephone services within a LATA (Local Access and Transport Area) that may extend across several states. Therefore, current facility information systems that are limited to viewing circuits only within the state that they reside cannot adequately service customers that use circuits in several states when a problem or outage occurs.

Moreover, the databases that contain information regarding circuits within a particular state are updated infrequently. Usually these databases are updated roughly every month. Therefore, users of the facility information system may not be viewing the latest information regarding the communication network even upon accessing the database.

SUMMARY OF THE INVENTION

Accordingly, the present invention is directed to an emergency facility information system and methods that substantially obviates one or more of the problems arising from the limitations and disadvantages of the related art.

It is an object of the present invention to provide an emergency facility information system that provides reliable access and retrieval of data relating to communication circuits and customer information during critical outage situations.

It is a further object of the present invention to provide an emergency facility information system that provides easy to use point and click operation.

Another object of the present invention to provide an emergency facility information system with an easy to use graphical user interface.

A still further object of the present invention is to provide an emergency facility information system that provides more detailed information available to users, and quicker data access.

It is an object of the present invention to provide a method for accessing communication circuits information and customer data information. Communications facility information system is accessed by a user. A graphical user interface is provided to the user for use of the communications facility information system. Search criteria is inputted to the communications facility information system by the user where the search criteria is related to equipment data and/or customer data, and the graphical user interface provides input areas for the user to enter the search criteria. At least one database is searched for the communication circuits information and/or the customer data information related to the search criteria. A result of the searching is displayed where the result includes the communication circuits information an/or the customer data information related to the search criteria.

It is another object of the present invention to provide a method for accessing communication circuits information and customer data information where the accessing includes providing a user ID and password to the communications facility information system, and verifying that the user ID and password are valid. The valid user ID and password allow the user access to the communications facility information system.

It is another object of the present invention to provide a method for accessing communication circuits information and customer data information where the graphical user interface is capable of displaying multiple windows simultaneously. The user is able to navigate between the multiple windows by selecting a desired one of the multiple windows.

It is another object of the present invention to provide a method for accessing communication circuits information and customer data information where the graphical user interface provides a main menu for the communications facility information system after the user accesses the communications facility information system. The main menu provides the user with options of selecting a circuit/facility subsystem or a SONET subsystem.

It is another object of the present invention to provide a method for accessing communication circuits information and customer data information where the selection of circuit/facility subsystem provides the user with options of selecting carrier circuit, facility reroute, customer, or cable.

It is another object of the present invention to provide a method for accessing communication circuits information and customer data information where the result includes the circuit id of a carrier circuit and user options of reroute, hierarchy, cable, standard report, and custom report if carrier circuit is selected and the user entered at least one of a system id, facility id, A location, and Z location as the search criteria.

It is another object of the present invention to provide a method for accessing communication circuits information and customer data information where the result includes a circuit id, status, vacant channel id, circuit route, and number of offices if facility reroute is selected and the user entered at least one of a system id, facility id, A location, Z location, circuit id, avoid location, and number of offices as the search criteria.

It is another object of the present invention to provide a method for accessing communication circuits information and customer data information where the result includes a customer name, customer address, ACNA, circuit id, MCN, contact name, and contact number if customer is selected and the user entered at least one of customer name and customer address as the search criteria.

It is another object of the present invention to provide a method for accessing communication circuits information and customer data information wherein options of interoffice circuits, exchange circuits, lookup by customer, and lookup by circuit are presented to the user if cable listing is selected.

It is another object of the present invention to provide a method for accessing communication circuits information and customer data information where the result includes a listing of cables wherein each listed cable has an associated cable id, location A and location Z if interoffice circuits is selected and the user entered at least one of a cable id, pair id, pair range, A CLLI, Z CLLI, and terminal address as the search criteria.

It is another object of the present invention to provide a method for accessing communication circuits information and customer data information where a second result includes a circuit id, TSP, pair id, HICAP, location A, location Z, customer name, terminal address, and WFA wire center for one of the listed cables if the one cable of the listed cables is selected.

It is another object of the present invention to provide a method for accessing communication circuits information and customer data information where the result includes a listing of cables wherein each listed cable has an associated cable id, location A and location Z if exchange circuits is selected and the user entered at least one of a NPANXX, terminal address, cable id, pair id, and pair range as the search criteria.

It is another object of the present invention to provide a method for accessing communication circuits information and customer data information where a second result includes a circuit id, TSP, pair id, HICAP, location A, location Z, customer name, terminal address, and WFA wire center for one of the listed cables if the one cable of the listed cables is selected.

It is another object of the present invention to provide a method for accessing communication circuits information and customer data information where the result includes a listing of cables wherein each listed cable has an associated cable id, location A and location Z if lookup by customer is selected and the user entered at least one of customer name, customer address, ACNA, and circuit id as the search criteria.

It is another object of the present invention to provide a method for accessing communication circuits information and customer data information where another result includes the circuit id, TSP, pair id, HICAP, location A, location Z, customer name, terminal address, and WFA wire center for one of the listed cables if the one cable of the listed cables is selected.

It is another object of the present invention to provide a method for accessing communication circuits information and customer data information where the result includes a listing of cables wherein each listed cable has an associated cable id, location A and location Z if lookup by circuit is selected and the user entered a circuit id.

It is another object of the present invention to provide a method for accessing communication circuits information and customer data information where another result includes the circuit id, TSP, pair id, HICAP, location A, location Z, customer name, terminal address, and WFA wire center for one of the listed cables if the one cable of the listed cables is selected.

It is another object of the present invention to provide a method for accessing communication circuits information and customer data information where a second result includes the circuit id, status, vacant channel id, circuit route, and number of offices if the reroute option is selected and the user entered at least one of the system id, facility id, A location, Z location, circuit id, avoid location, and number of offices as the search criteria.

It is another object of the present invention to provide a method for accessing communication circuits information and customer data information where a second result includes displaying a down hierarchy of the carrier circuit includes a status picture tree, channel id, and circuit id of channels that ride on the carrier circuit if the hierarchy option is selected.

It is another object of the present invention to provide a method for accessing communication circuits information and customer data information where a third result includes displaying an up hierarchy of the carrier circuit includes a status picture tree, channel id, and circuit id of carriers that the carrier circuit rides on if a hierarchy up option is selected.

It is another object of the present invention to provide a method for accessing communication circuits information and customer data information where a second result includes a listing of cables wherein each listed cable has an associated cable id, location A and location Z if the cable option is selected.

It is another object of the present invention to provide a method for accessing communication circuits information and customer data information where a third result includes the circuit id, TSP, pair id, HICAP, location A, location Z, customer name, terminal address, and WFA wire center for one of the listed cables if the one cable of the listed cables is selected.

It is another object of the present invention to provide a method for accessing communication circuits information and customer data information where a fourth result includes displaying a cable standard report includes a customer name, total number of circuits, and a listing of all circuits and their type for each cable associated with the customer name, if standard reports and customer listing by cable have been selected.

It is another object of the present invention to provide a method for accessing communication circuits information and customer data information where a fourth result includes displaying a cable standard report includes a total per circuit type for each cable associated with the customer name, if standard reports and cable totals have been selected.

It is another object of the present invention to provide a method for accessing communication circuits information and customer data information where a fourth result includes displaying a circuit id and customer name for each high capacity cable associated with the customer name, if standard reports and HICAP listing have been selected.

It is another object of the present invention to provide a method for accessing communication circuits information and customer data information where a fourth result includes displaying a list of data from which to select for incorporation into a customized report generated for a circuit, if custom reports and the circuit have been selected.

It is another object of the present invention to provide a method for accessing communication circuits information and customer data information where a fourth result includes displaying a list of data from which to select for incorporation into a customized report generated for a piece of equipment, if custom reports and the equipment have been selected.

It is another object of the present invention to provide a method for accessing communication circuits information and customer data information where a fourth result includes displaying a list of data from which to select for incorporation into a customized report generated for a facility, if custom reports and the facility have been selected.

It is another object of the present invention to provide a method for accessing communication circuits information and customer data information where a fourth result includes displaying a list of data from which to select for incorporation into a customized report generated for a circuit, if custom reports and hierarchy have been selected.

It is another object of the present invention to provide a method for accessing communication circuits information and customer data information where a fourth result includes displaying a list of data from which to select for incorporation into a customized report generated for a ring, if custom reports and the ring have been selected.

It is another object of the present invention to provide a method for accessing communication circuits information and customer data information where a second result includes the circuit id, customer name, TSP, A location, Z location, status, contact name, and contact number if the standard report option and circuit hierarchy with customers are selected.

It is another object of the present invention to provide a method for accessing communication circuits information and customer data information where a second result includes customer name, the circuit id, and level if the standard report option and circuit listing by customer are selected.

It is another object of the present invention to provide a method for accessing communication circuits information and customer data information where a second result includes a listing of all circuit types by circuit if the standard report option and totals are selected.

It is another object of the present invention to provide a method for accessing communication circuits information and customer data information where a second result includes a list of the totals for each circuit type for each selected circuit if the standard report option and priority circuit restoration are selected.

It is another object of the present invention to provide a method for accessing communication circuits information and customer data information where a second result includes displaying a list of data from which to select for incorporation into a customized report generated for a circuit, if the custom report option and the circuit have been selected.

It is another object of the present invention to provide a method for accessing communication circuits information and customer data information where a second result includes displaying a list of data from which to select for incorporation into a customized report generated for a piece of equipment, if the custom report option and the equipment have been selected.

It is another object of the present invention to provide a method for accessing communication circuits information and customer data information where a second result includes displaying a list of data from which to select for incorporation into a customized report generated for a facility, if the custom report option and the facility have been selected.

It is another object of the present invention to provide a method for accessing communication circuits information and customer data information where a second result includes displaying a list of data from which to select for incorporation into a customized report generated for a circuit, if the custom report option and hierarchy have been selected.

It is another object of the present invention to provide a method for accessing communication circuits information and customer data information where a second result includes displaying a list of data from which to select for incorporation into a customized report generated for a ring, if the custom-report option and the ring have been selected.

It is another object of the present invention to provide a method for accessing communication circuits information and customer data information where the result includes an A end, Z end, cable id, CAC, level, node A, node Z, SCID, and topology, if SONET is selected, and the user has entered at least one of a cable id, CAC, circuit id, circuit layout order, SCID, and rack id.

It is another object of the present invention to provide a method for accessing communication circuits information and customer data information where a second result includes the cable id, east designation, node id, node location, pair id, relay rack id, SCID, topology, and west designation, if draw has been selected.

It is another object of the present invention to provide a method for accessing communication circuits information and customer data information where a second result includes the cable id, CAC, level, node id, node location, pair id, and topology, if reports and node listing have been selected.

It is another object of the present invention to provide a method for accessing communication circuits information and customer data information where a second result includes an A location, Z, location, CAC, circuit id, circuit layout order, contact name, contact number, customer name, high speed indicator, and low speed indicator, if reports and high speed mapping have been selected.

It is another object of the present invention to provide a method for accessing communication circuits information and customer data information where a second result includes an A location, Z, location, CAC, circuit id, circuit layout order, contact name, contact number, customer name, frame id, high speed indicator, and low speed indicator, if reports and low speed mapping have been selected.

It is another object of the present invention to provide a method for accessing communication circuits information and customer data information where a second result includes customer id, customer name, and HICAP circuits, if reports and HICAP listing have been selected.

It is another object of the present invention to provide a method for accessing communication circuits information and customer data information where a second result includes a listing of a total number of all circuit types, if reports and priority circuit listing have been selected.

It is another object of the present invention to provide a method for accessing communication circuits information and customer data information where a second result includes associated circuits, circuit id, contact name, contact number, customer address, and customer name, if reports and customer listing have been selected.

It is another object of the present invention to provide a communications facility information system that includes at least one database where each at least one database contains communication circuits information and/or customer data information; at least one processor where each at least one processor is operably connected to each at least one database, and where each at least one processor provides the capability to search each at least one database for the communication circuits information and/or the customer data information; and at least one remote station where each at least one remote station operably connects to each at least one processor, and each at least one remote station provides access to the communications facility information system by a user. Each at least one remote station is used by the user to input search criteria to the communications facility information system where the search criteria is related to equipment data and/or customer data. The communications facility information system provides a graphical user interface including input areas for the user to enter the search criteria, wherein the communications facility information system provides a display of a result of the search at the at least one remote station. The result includes the communication circuits information and/or the customer data information related to the search criteria.

It is another object of the present invention to provide a communications facility information system where the graphical user interface is capable of displaying multiple windows simultaneously. The user is able to navigate between the multiple windows by selecting a desired one of the multiple windows.

It is another object of the present invention to provide a communications facility information system that provides the user the capability to obtain more general information related to the result.

It is another object of the present invention to provide a communications facility information system that provides the user the capability to obtain more detailed information related to the result.

Other exemplary embodiments and advantages of the present invention may be ascertained by reviewing the present disclosure and the accompanying drawings.

BRIEF DESCRIPTION OF THE DRAWINGS

The present invention is further described in a detailed description which follows in reference to the noted plurality of drawings by way of non-limiting examples of preferred embodiments of the present invention in which like reference numerals represent similar parts throughout the several views of the drawings and wherein:

FIG. 11 shows a Priority Circuit Restoration display according to the present invention;

FIG. 13 shows a display with results returned for selection of customer, circuit ID, and CAC under the Custom Reports menu of FIG. 12;

FIG. 16 shows a Customer menu according to the present invention;

FIG. 28 shows a SCID listing display according to the present invention;

FIG. 32 shows a Node Listing report display according to the present invention;

DETAILED DESCRIPTION OF THE PRESENT INVENTION

Figure 1:
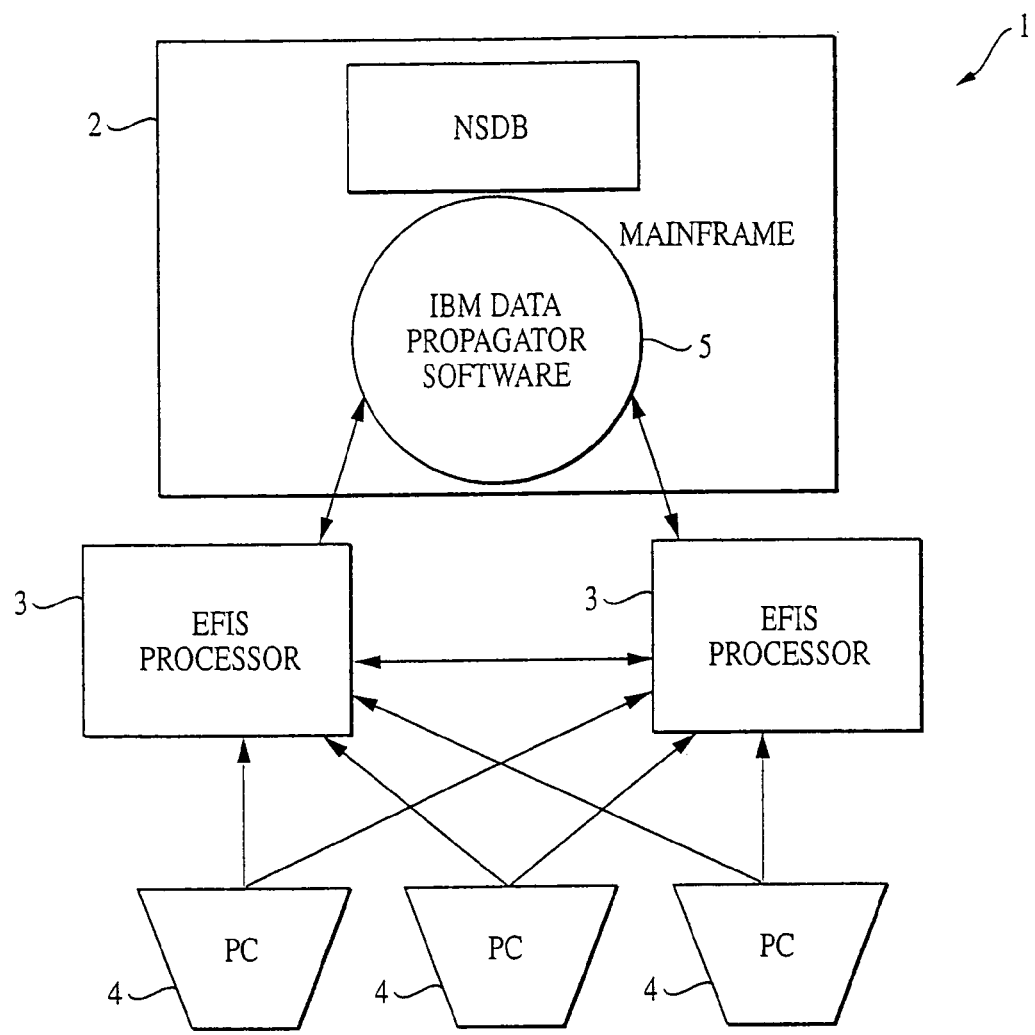
FIG. 1 is a block diagram of an exemplary emergency facility information system according to the present invention.

The particulars shown herein are by way of example and for purposes of illustrative discussion of the embodiments of the present invention only and are presented in the cause of providing a useful and readily understood description of the principles and conceptual aspects of the present invention. In this regard, no attempt is made to show structural details of the present invention in more detail than is necessary for the fundamental understanding of the present invention, the description taken with the drawings making it apparent to those skilled in the art how the several forms of the present invention may be embodied in practice.

The present invention will be described using an embodiment of an emergency facility information system (EFIS) that includes one or more databases that store information regarding circuits and customers of a communications network. The EFIS databases may be a collection of ORACLE® tables. The tables may contain data that are either composites or subsets of NSDB IMS tables or DB2 tables. The system also includes processors that access these databases and allow a system user to access the network information using a personal computer. The users may use a personal computer to access the processors and gain access to the emergency facility information system. The personal computers gain access by using a modem, Internet, or any other method that provides a communication link between devices that may be close or separated by a considerable distance.

The system provides the user with the ability to search for information related to the circuits and/or customers, and also to compile information sought in the form of reports. The system provides a graphical user interface to the user that allows the user to view information in one or more windows. The graphical user interface allows the user to move through various menus and screens without having to back out of each screen to get back to an origination point before selecting a new path.

Several terms and acronyms will be used in the written description to describe the present invention. Although some may be known, use of several of these is not strictly standardized in the art. Therefore, since these terms and acronyms are used throughout this description, the following list of definitions is provided to clarify terms and acronyms used in the description, and to provide a central place where one may look to find a definition and an understanding of a particular term or acronym.

1. Definitions, Acronyms, and Abbreviations 2-char wire center code—2 alpha-numeric character code which represents a specific wire center.

911 Circuit—All 911 emergency circuits.

A location (A loc, Loc A)—origination end of a circuit; A location CLLI code

A and Z address—the street address of the A (originating) or Z (terminating) end of the circuit.

A and Z contact address—the street address of the customer contact person.

A and Z contact name—name of customer contact person.

A and Z contact phone—phone number of the customer contact person

A/Z End indicator—the literal A or Z is stored with the database record to indicate the record is associated with the originating or terminating end of the circuit.

ACNA—Access Customer Name Abbreviation; 3–4 characters assigned to inter-exchange carriers (i.e. AT&T, MCI, Sprint, etc.)

Accounting Control Office (ACO)—code used to identify the business office associated with the customer circuit records and billing information.

Avoid location—a CLLI code location that is to be excluded from a list of available circuits that pass through that location for possible rerouting.

Back—go to the previously displayed screen

Cable (Cable ID)—a unique identifier or name with a wire center for cable that carries customer circuits.

Cable type—the use of the cable for either exchange or trunking

Cable designation—indicates whether the exchange cable is a feeder or distribution cable.

CAC—Circuit Access Code.

Carrier circuit—high capacity circuit (HICAP) that is channelized (carries multiple circuits); minimum 1.544 Mbits/circuit Channel ID (on parent circuit)—a standard numbering scheme for bandwidth assignment or subdivisions of the associated parent circuit.

Circuit Action of Order—the order action such as add, disconnect, rename, or rearrange Circuit ID (CID)—a unique combination of alpha-numeric character that is used to convey intelligence about the type and usage of the circuit.

Circuit Priority Level—user defined restoration priority ranking based on circuit capacity or usage.

Class of service—numbering scheme applied to circuit classification of business or residence usage.

CLLI—Common Language Location Identifier; an 11 character code that denotes the location of the equipment where a telephone call originates (i.e. city, state, switching center, etc.)

CLO—Circuit Layout Order—order number assigned by an operation support system.

Data Prop—Data Propagator; set of DB2 tables which act as the intermediary between NSDB and EFIS; only will house changes from NSDB; all EFIS updates are gathered from Data Propagator.

DataGate—Middleware product; provides functionality common to all distributed applications across most hardware platforms.

DB2—Database 2; relational database architecture

DBMS—Database Management System.

Derived cable name—distribution cable name at the terminating end of a pair gain system.

Drilling Down—progressing down to lower levels in the hierarchy of a circuit, or other information, to get further details Drilling Up—progressing up to higher levels in the hierarchy of a circuit, or other information, to get more general information Drop—a wire or cable from a pole or cable terminal to a building DSI Circuit—Digital Signal 1; a 1.544 Mbps digital signal; (generally 24 voice conversations)

DS3 Circuit—Digital Signal 3; a 44.736 Mbps digital signal (28 DSI signals).

EFIS—Emergency Facility Information System

Equipment Action Code—the literal A for add and D for delete for equipment.

Equipment Action indicator—the Database field that contains the equipment action code of A or D.

Essential Line Indicator (ESL)—a database field that indicates the circuit has a specific restoration priority level.
Facility ID—a component of a carrier circuit id that represents a characteristic of the circuit such as the bandwidth
Facility (cable)—material cable is made of
Facility (carrier)—means of transport
Facility Binding Post—the physical point of terminating the cable pair.
Facility Bindin, Post Color—the color of wires of the cable pair when there is no physical binding post.
File Transfer Protocol (FTP)—a service that supports file transfer between local and remote computers
HECIG—Human Equipment Catalog Item Group—a human code representing a group of equipment having identical capabilities.
HICAP—High Capacity Circuit; any circuit with greater capacity than a DS3 circuit (e.g. OC12); non-channeled
High speed mapping—optical level time slot for the assignment of a specific amount of bandwidth to carry a circuit.
Installation Center (ICTR)—group assigned the responsibility of coordinating installation activities associated with circuits.
IEC—InterExchange Carriers (e.g. AT&T, MCI, Sprint); long-haul long distance carriers; inter-LATA carriers
IMS tables—a hierarchical database structure as opposed to a relational database structure.
Jack ID—number scheme for cross connection of equipment using a group of jacks contained in a panel.
LATA—Local Area and Transport Area; one of several local geographical areas in the US within which a local telephone company may offer telecommunication services, local or long distance
LEC—Local Exchange Carrier; local phone companies
Level—refers to the SONET bandwidth such as OC03, OC12, or OC48.
Local service offering—refers to the central office that will provide the local service.
Loop contact name—name of person at the customers location that will coordinate with the telephone company installer.
Loop telephone number—phone number of the contact person at the customer location
Market Area—organizational entity in which the circuit resides.
MCN—Major Customer Number; assigned to large customers internally by service provider
Maintenance Control Office (MCO)—the group that has over all coordination responsibility of maintenance activities associated with a circuit.
Maintenance Center (MCTR)—group that may be assigned the maintenance activities for one end of a circuit.
Message circuit—circuit owned by the telephone company; non-customer assigned trunk circuits that run between offices; carries multi-customer traffic; typically rides on a carrier type circuit
OC-X—Optical carrier level X; a SONET optical signal (e.g. OC-1=51.84 Mbps; OC-12=622.08 Mbps)
NCI—Network Channel Interface—device that interconnects customer equipment to the telephone network
Node A—refers to the location that a low level circuit is added to a SONET configuration.
Node Z—refers to the location that a low level circuit is dropped off of a SONET configuration.
Node ID—a number assigned to a Node in SONET to indicate it's positional order in the configuration.
NPA—Numbering Plan Area (i.e. Area Code in a telephone number)
NSDB—Network and Services Database.
Number of offices—refers to the number of offices to use in rerouting a damaged facility.
NXX—the first three digits in a seven digit telephone number that denotes the telephone company central office that serves that number
Pair ID—a unique number assigned to each pair in a cable.
Pair gain—the multiplexing of x number phone conversations over a lesser number of physical facilities
Pair range—a grouping of pair numbers from low to high (i.e. 1 to 100)
Parent circuit—refers to the transport circuit that the child is assigned a channel number on the parent.
PC—Personal Computer.
Pending merge status—internally used database status to indicate whether all internal. processing is completed for a particular circuit record.
Protection type—refers to redundancy assigned to the circuit.
Priority classification—an assigned classification of restoration priority based on capacity or usage of the circuit.
Priority total—a total count of all circuits that may have a priority classification.
Rack—refers a location of a physical object for mounting equipment.
SCID—SONET Carrier ID—6 character code that uniquely identifies SONET configurations
Sequence Number—an internal database ordering number for group data.
Service Address of Customer (SA)—street address of the customer circuit.
Service Name—customer name
Slot Number—optical time slot which represents a standard bandwidth position.
SOAC—Service Order Assignment Control.
SONET—Synchronous Optical Network.
SORD—Service Order Retrieval and Distribution.
Special circuit—dial tone type circuit ranging from voice to 1.544 Mbis/circuit capacity; not channelized; single customer buys bandwidth
Speed equipment code—HECIG for high and low speed SONET equipment
SQLNET—Structured Query Language Network.
SRS—Software Requirements Specification.
SS7 Circuit—Signal System 7; control links between offices.
Status—defines whether the circuit is in-effect (working), disconnected (not working) or pending (i.e. to be installed)
Status picture—bitmap symbol used to visually display status
Sub-tending circuits—lower level circuits that ride on a higher level circuit
System ID—a component of a carrier circuit ID that is an arbitrarily assigned number
T1—a digital transmission link with a capacity of 1.544 Mbps; uses two twisted pair wires
Telephone circuit ID—circuit ID format for switched voice grade circuits.
Terminal Address ID (Term)—street or building address where telephone cable terminates.
Target Identifier (TID)—a combination of the location CLLI code and the relay rack to identify a SONET node.
Topology—SONET configuration; either RING or CHAIN.
Tracking Key—Same as the TIRKS CLO (Circuit Layout Order)

Transmission designation—transmit can be from the A to Z end or Z to A; specified as AZ or ZA Transmit/Receive indicator—database field to indicate whether a cable pair is used for transmit or receive purpose.

Transport facility indicator—database field used to identify a SPAN line; the indicator will be S TSP—Telecommunications Service Priority; a flag that denotes that a particular circuit has the highest priority regarding installation and repair Update Date—date the database record was updated.

Update ID—system or user the initiated the update.

Update Time—time of day that update occurred.

Update Segment—database segment that was updated

Vacant channel ID—spare or unassigned channel of a parent circuit.

Virtual group ID—identifier of a sub-SONET bandwidth; (i.e. VT1.5, VT2, VT3, VT6)

Wire Center—another term for a Central Office switch and its corresponding geographic boundaries.

Z location (Z loc, Loc Z)—termination end of a circuit; Z location CLLI code

Zoom In—magnify 1 item in a SONET ring diagram.

FIG. 1 shows a block diagram of an exemplary emergency facility information system (EFIS) 1 according to the present invention. As shown in FIG. 1, the communication system may include one or more databases 2 (only one shown) that contain communication circuit information regarding all networks, circuits, trunks, equipment, and other information regarding the communication system, as well as information related to customers owning or using parts of the system. The database 2 is connected to one or more EFIS processors 3 that perform the processing for the emergency facility information system 1. The database may contain a data propagator 5 that is a set of DB2 (Database 2) tables which act as the intermediary between the NSDB and EFIS. All EFIS updates are retrieved through data propagator 5.

Each EFIS processor 3 has the same information, and may be located in different regions, thereby, providing users with fault tolerant access to the system. If one EFIS processor 3 is down or being updated, another EFIS processor 3 takes over and services the users. The EFIS processors 3 access the database 2 for retrieval of information related to the circuits, trunks, customers, status, etc. of communication system 1. This information may be retrieved by the EFIS processors 3 using the FTP protocol, or any other method for accessing a database. Users may access the EFIS processors 3 by using a remote station or terminal such as a personal computer 4 Various remote stations or personal computers may be operably connected to the EFIS 1, by telephone wires, direct connection, local area network, Internet, or other methods. Remote stations may be any device with display capability that can interface and communicate with a processor.

The EFIS provides easy access and use to one or more users by providing a graphical user interface which can display different information simultaneously in separate windows displayed on the screen. A user can access EFIS and search for data and information related to communication circuits and/or customers. EFIS also allows a user to drill up or down on a selected item or data displayed (e.g., move up or down in the hierarchy of a circuit). If a user drills up on the selected item or data, information related to the selected item or data in a broader sense is obtained and displayed (i.e., information related to what this item or data is a part of, contained in, or connected to at a higher level). If a user drills down on the selected item or data, further more detailed information is obtained and displayed (i.e., information related to what the selected item or data contains in it, is made up of, or what connects to or makes up the selected item or data at lower levels). A user may then select one of the newly displayed items or data and then drill up or down on it. Therefore, EFIS allows a user to easily access and efficiently search communication circuit information and customer data information, and easily navigate through the resultant information to obtain more general or more detailed information, in accordance with the user's needs.

For a user to access the EFIS 1, the user may need to submit a user ID and password. The EFIS system will validate the user ID and password to ensure that they are correct. If the user ID and password submitted by the user are incorrect, the system will prompt the user to re-enter the user ID and password. If the user ID and password are correct, the EFIS computer will allow the user access to the EFIS system 1, by displaying the EFIS main menu on the user's personal computer 4.

Figure 2:
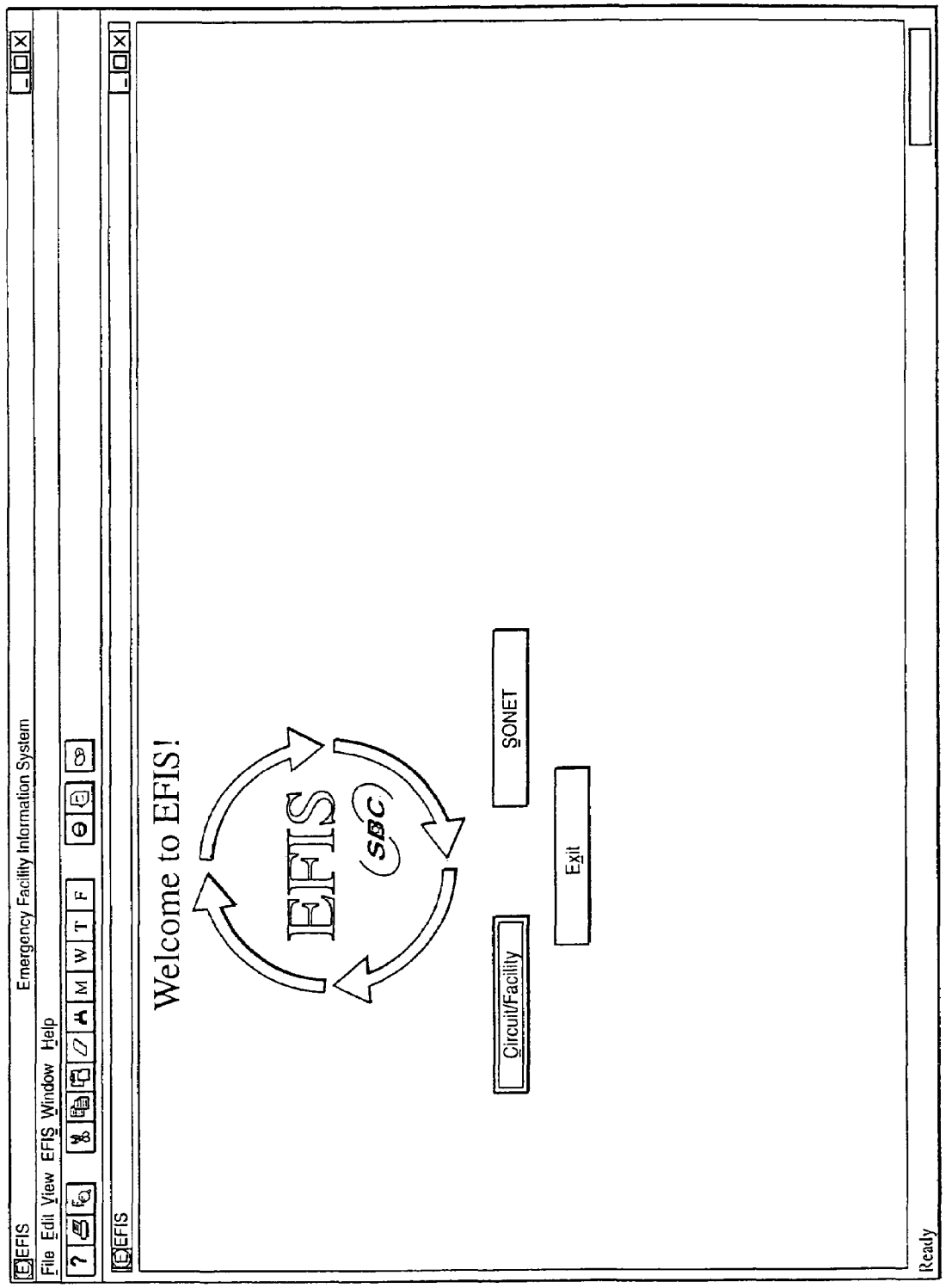
FIG. 2 shows an EFIS main menu according to the present invention.

As shown in FIG. 2, the EFIS main menu is a graphical user interface that includes a window with tool bars, command lines, and menu bars. The EFIS main menu allows users to select between two main modules, the Circuit/Facility module, or the SONET module. An Exit button is also presented to allow a user to exit the emergency facility information system. A tool bar may appear just below the menu bar at the top of every EFIS screen. The tool bar may include buttons that allow the user access to other applications or functions.

The EFIS main menu also has a menu bar. The EFIS menu bar includes standard Windows commands, and shortcuts to common EFIS queries. "Print preview", "printing", and "file save as" functions allow the user to view, print or save any of the reports or result sets created while using EFIS. Sorting may be accomplished by clicking the heading in any report displayed in a grid format. Thus, report tables in EFIS may be resorted as desired by the user. The user may want to see the bottom of a long list without scrolling down several screens. In such a situation, the user would simply click the header or the column that the user wants to use as a basis for sorting. This would act as a toggle switch. If the user clicks the column or header only once, this will cause a sort to occur alphanumerically from 0 to 9 and then A to Z by that column's data. If the user clicks again, a reverse sort will occur by that column's data (i.e., Z to A and then 9 to 0).

A user may enter search criteria into EFIS to be used to search for information related to circuits or customer information in the system. Wild cards may be used by the user of EFIS to expand the search. Two special wild card characters that may be used are percent sign (%) and underscore (_). The percent sign matches zero, one, or many characters. For example, if the user enters "6%", the following would be valid matches: 63, 63B, 633142, 6AF12. Therefore, everything that starts with "6" is a valid match. If "%6" is entered by the user, valid matches would be: 6, 628736, 345A46. Thus, everything that ends with "6" is a valid match. If "%6%" is entered by the user, then everything that has a "6" would be a valid match.

An underscore "_" is a space holder for exactly one character. Any character may go in this space holder, but just one. For example, if the user enters "6_", the following would be valid matches: 60, 62, 6A, which are strings consisting of "6" and one other character. If the user enters "_6", valid matches would contain strings consisting of any one character followed by a "6". Similarly, if "_6_" is entered, valid matches would include any one character followed by a "6" followed by one other character.

Figure 3:
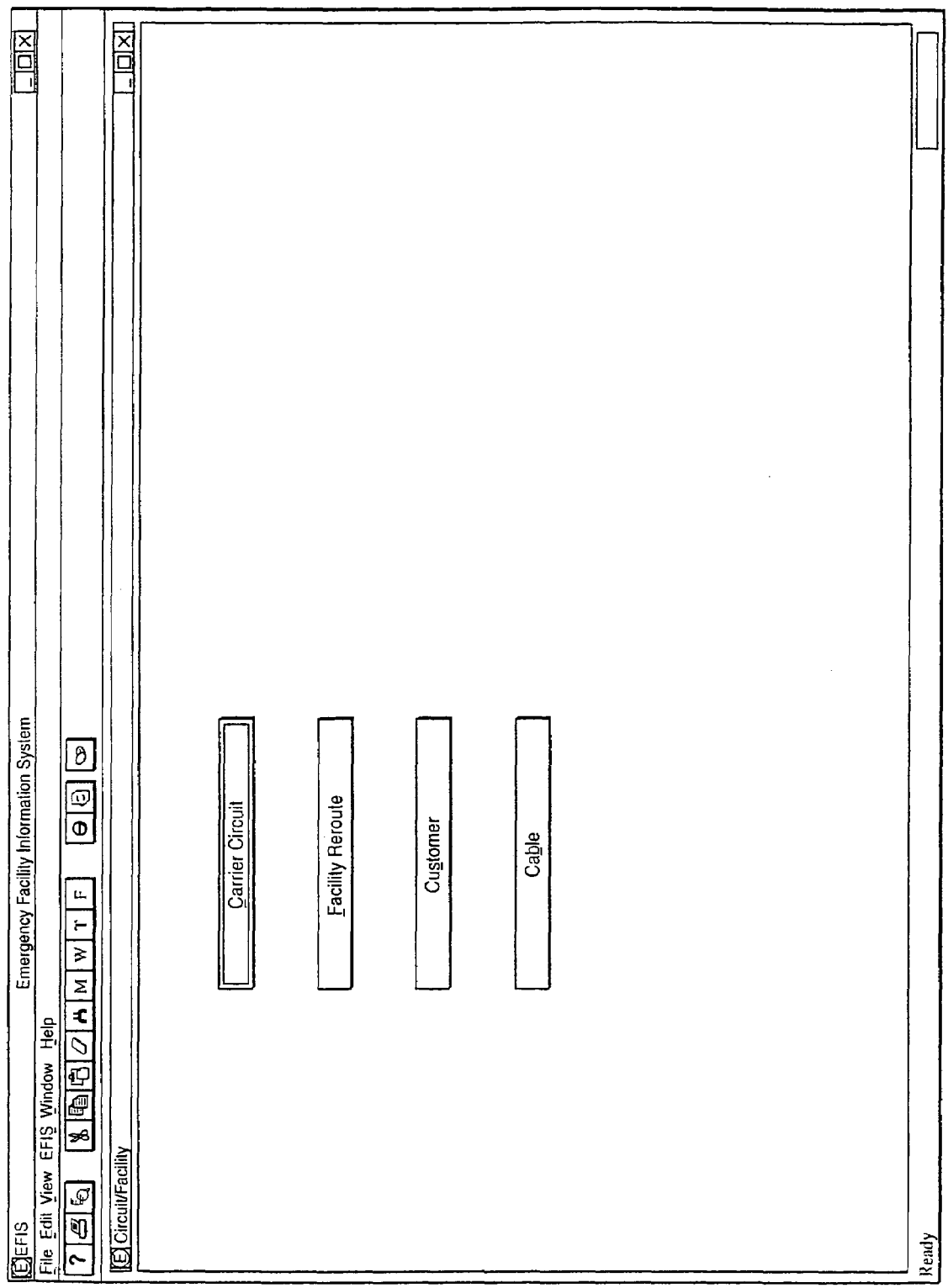
FIG. 3 shows a Circuit/Facility main menu according to the present invention.

From the EFIS main menu, if the Circuit/Facility button is selected, a circuit/facility menu will appear. This menu is shown in FIG. 3, and may be used if the user is looking for information on a carrier circuit, facility re-route, customer, or cable. This menu also allows a user to select a search path. The user may need to have some information available to help narrow the search path. This information may include: some part of the system ID, some part of the facility ID, some part of the A-location, some part of the Z-location, some part or spelling of the customer name, and/or some part or spelling of the customer address.

The Circuit/Facility menu may give the user choices for searching, such as: carrier, facility, customer, and cable. If the carrier button is selected, the user is allowed to look for information about a carrier or circuit ID. Selection of the facility button may be made by the user to search for the best re-route, while knowing the circuit ID. If the user desires to search for information about a specific customer, they would select the customer button. The cable button may be selected by the user to search for information about a cable that the user can narrow or define.

Figure 4:
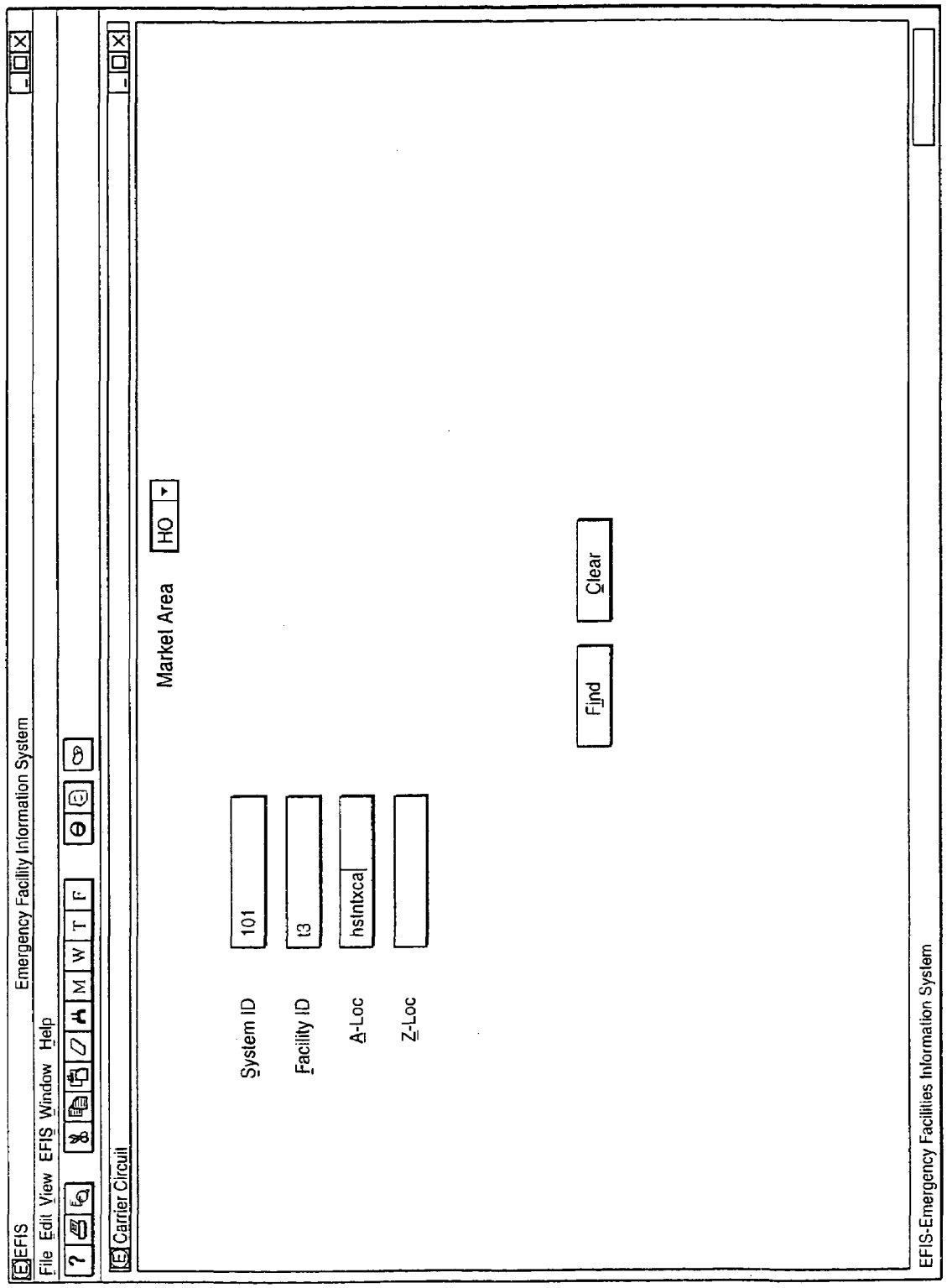
FIG. 4 shows a Carrier Circuit menu according to the present invention.

If the user selects Carrier Circuit Input, a carrier circuit menu will appear as shown in FIG. 4. This menu allows a user to narrow their search by specifying a facility, system, and location. This menu presents four input fields where the user may enter information. This menu allows the user to enter information regarding any part of the facility ID, any part of the system ID, or any part of either the A-location or Z-location.

After the user has entered any known, or desired, information into one or more of these information boxes, the user will select the "find" button. This causes EFIS to find information about any carrier circuit that contains the information the user has indicated in the text entry fields. The user must enter information in at least one of the fields before selecting the find button. After selection of the find button, the next screen to appear will be the Carrier Circuit-Selection Output screen. If the user has entered information into the text entry fields, and then wants to change or delete this information, the user can select a Clear button and EFIS will delete what the user has entered from all text entry fields on the screen. The user may then start over if he or she so chooses. The user may drill down on any circuit or customer information to get further details regarding the information. Drilling down is available from all appropriate displays.

Figure 5:
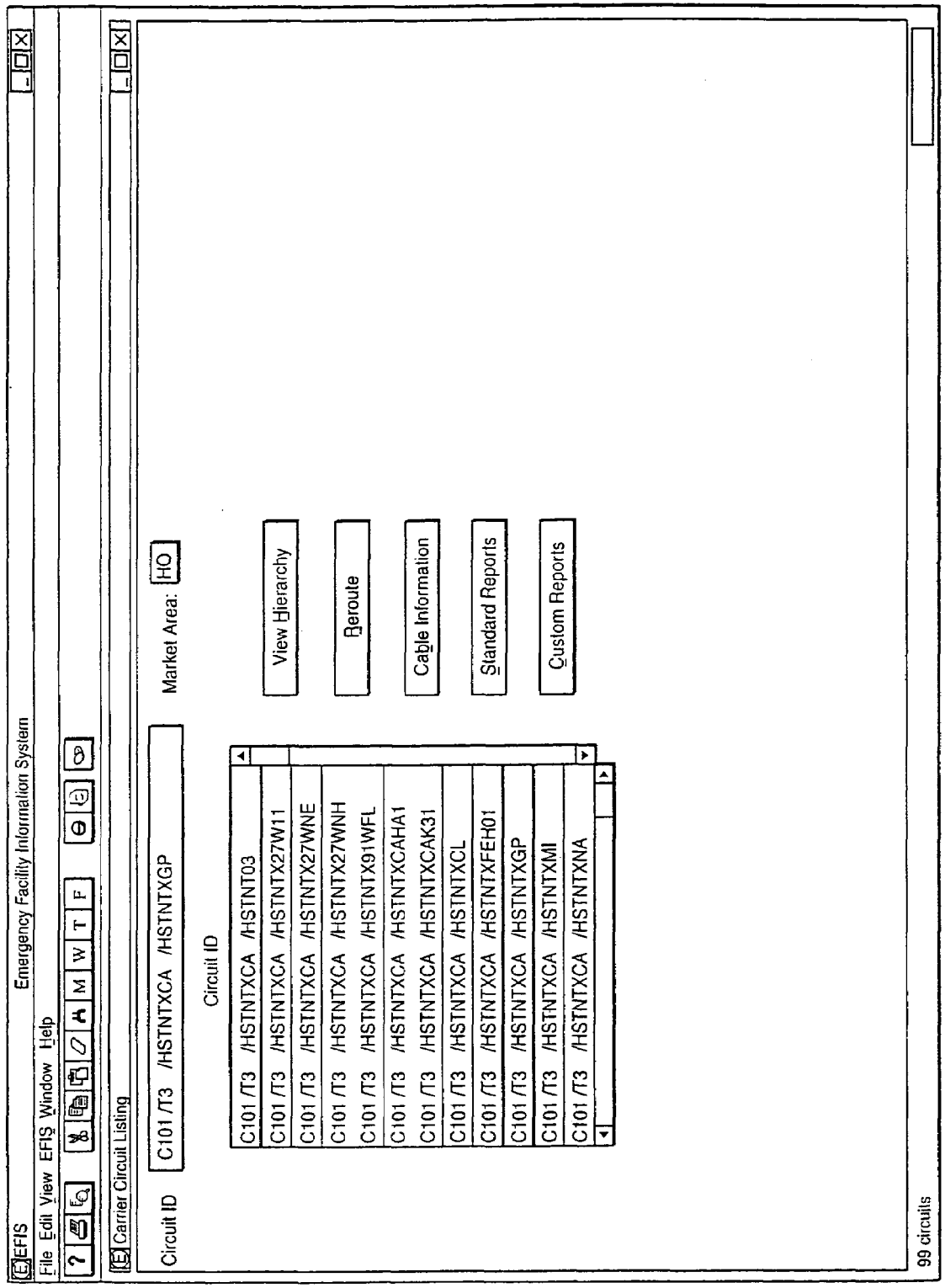
FIG. 5 shows a Carrier Circuits-Selection Output display according to the present invention.

The Carrier Circuit-Selection Output screen, shown in FIG. 5, is the first screen that appears after the user selects "find" on the carrier circuit input screen. This screen may either show a list of matching circuit ID's from which the user may select, or show a single matching circuit ID. The user may then select a circuit ID and select a particular report to be created. The user may select reports such as, View Hierarchy Report, Re-route Report, Cable Information Report, Standard Reports, or Custom Reports.

Figure 6:
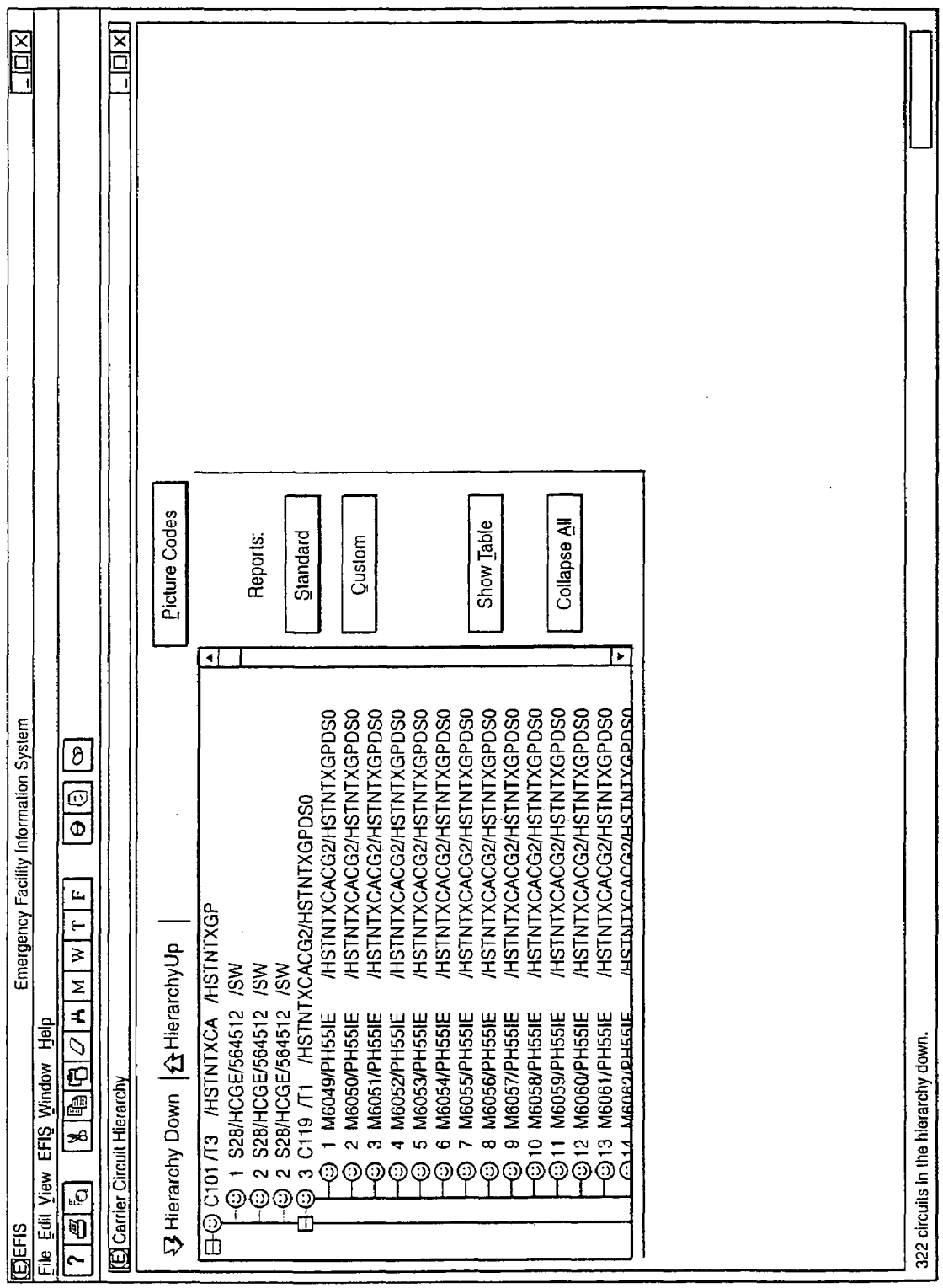
FIG. 6 shows a View Hierarchy display according to the present invention.

If View Hierarchy was selected, a screen denoting the carrier circuit hierarchy will be displayed as shown in FIG. 6. The user may then view the hierarchy up or down from the current carrier circuit. The user may want other information, for example, what other high capacity circuits are effected by damage to the particular circuit selected. If the user wants a hierarchy of carriers that this circuit rides on (i.e., carriers that this view if it is embedded in), the user would select hierarchy up. If the user wants an hierarchy of channels that ride on this circuit, the user would select hierarchy down. A Show Table option may be selected by the user which causes display of a circuit hierarchy in a table format rather than a tree view.

Figure 7:
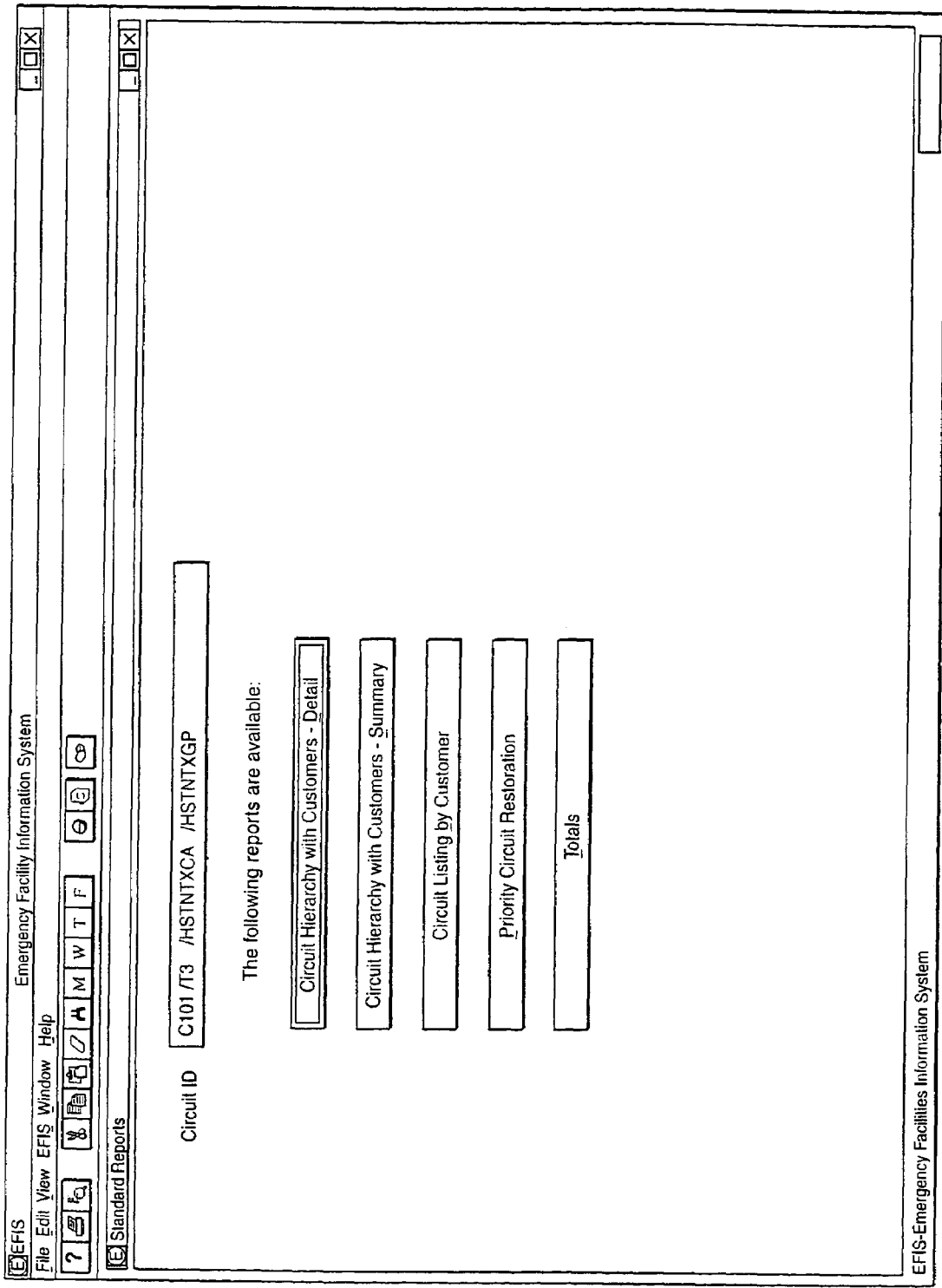
FIG. 7 shows a Standard Reports menu according to the present invention.

From any point in the hierarchy, the user may select a circuit ID and print Standard and Custom Reports. If Standard Reports is selected, the screen shown in FIG. 7 will be displayed which allows a user to choose from various standard reports. These include the following reports: Circuit Listing By Customer, Circuit Hierarchy With Customers, Totals, Priority Circuit Restoration, and Circuit Totals.

Figure 8:
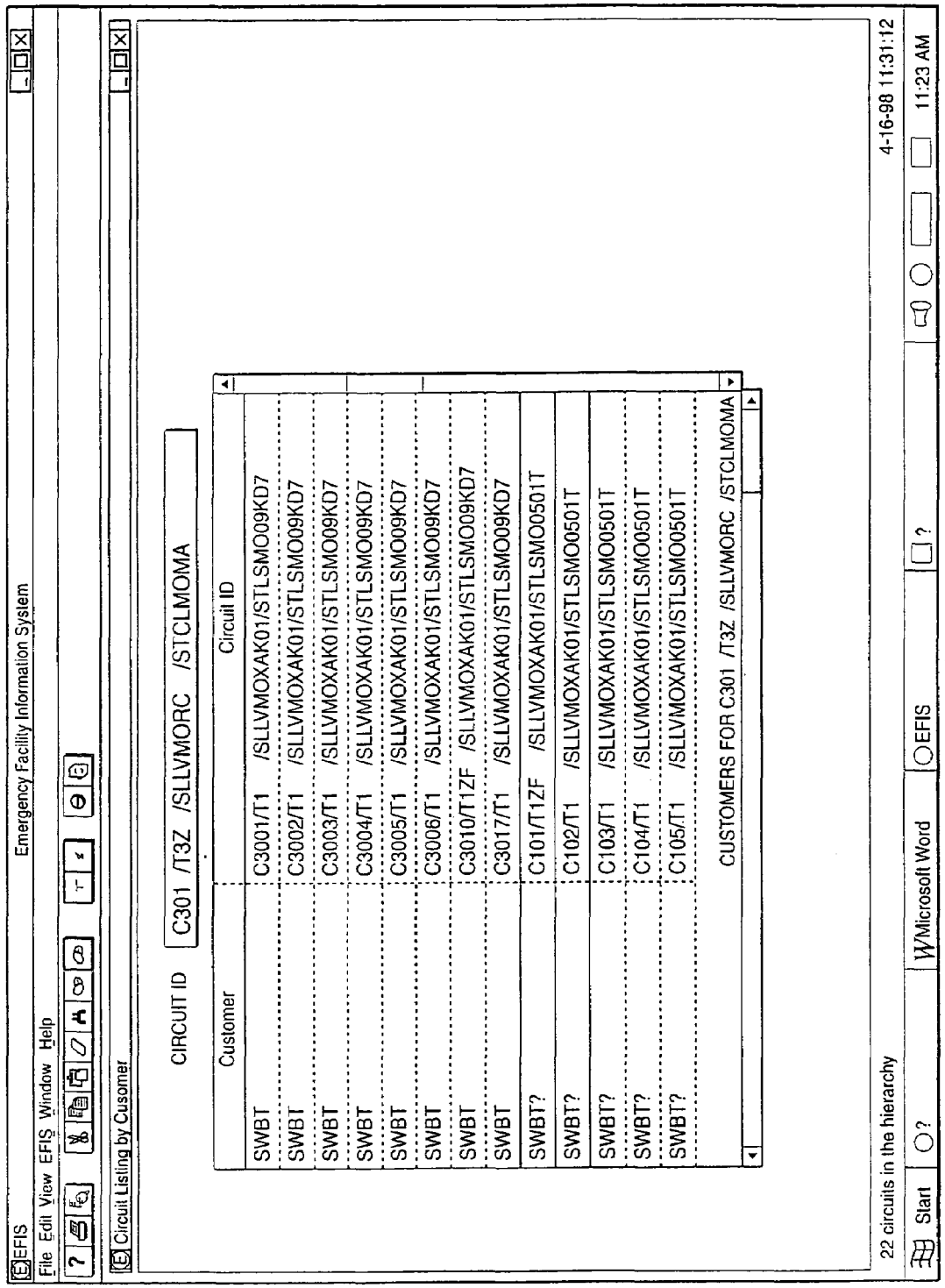
FIG. 8 shows a Circuit Listing by Customer Report display according to the present invention.

The Circuit Listing by Customer Report is a standard report for carrier circuits. It is available to the user whenever the user selects Circuit Listing by Customer and a circuit ID and depresses the right mouse button. This report includes customer and circuit ID for each circuit level, and is shown in FIG. 8.

Figure 9:
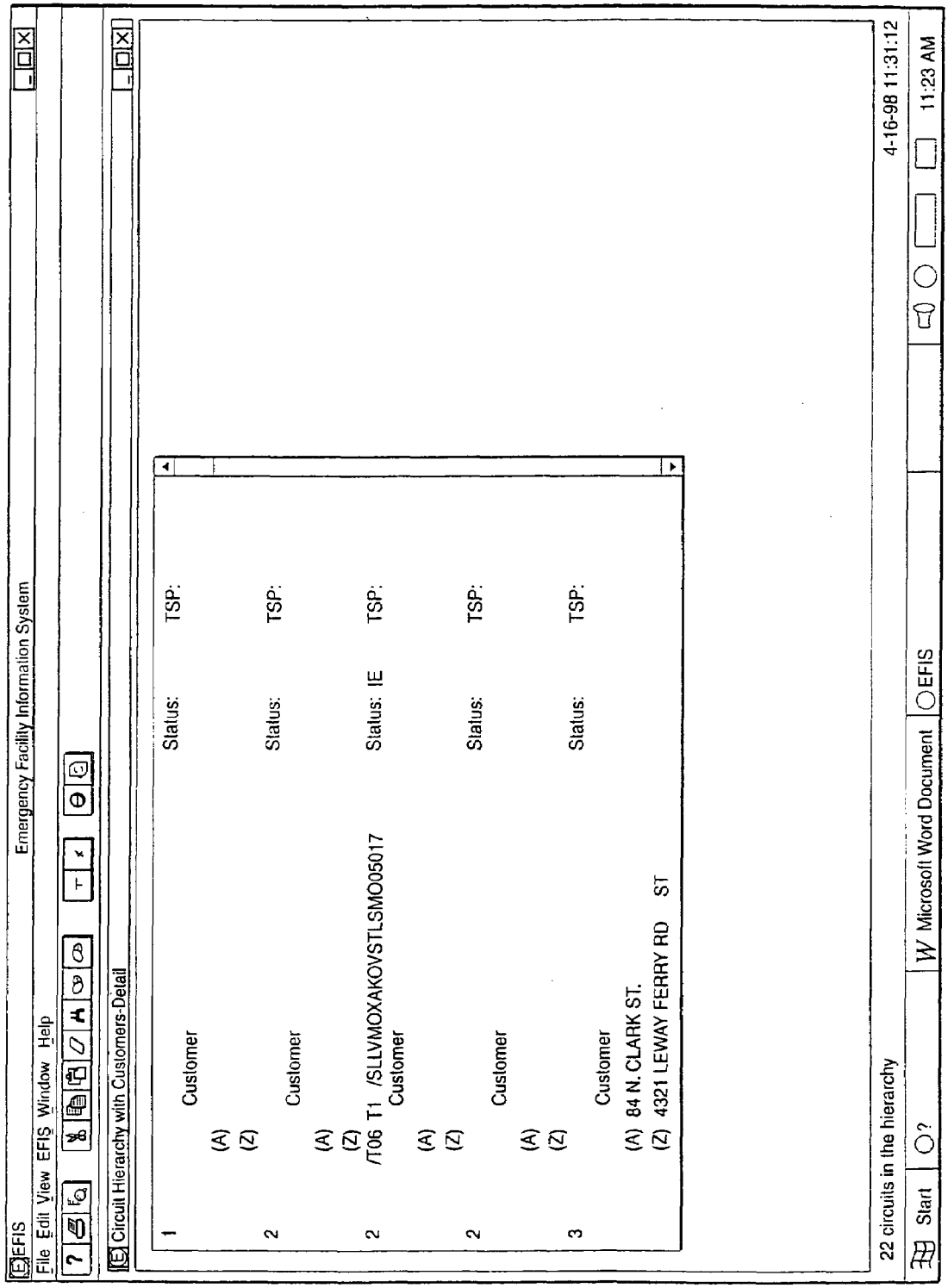
FIG. 9 shows a Circuit Hierarchy with Customers display according to the present invention.

Circuit Hierarchy with Customers is a standard report for carrier circuits that is available whenever the user selects Circuit Hierarchy with Customers and depresses the right mouse button with a circuit ID selected. This report is shown in FIG. 9, and includes what facilities the selected circuit rides on (or what assigned signals ride on the selected circuit) by level. This report also includes the customer, channel and circuit ID, status, TSP, A and Z address, A and Z contact name, and A and Z contact address.

Figure 10:
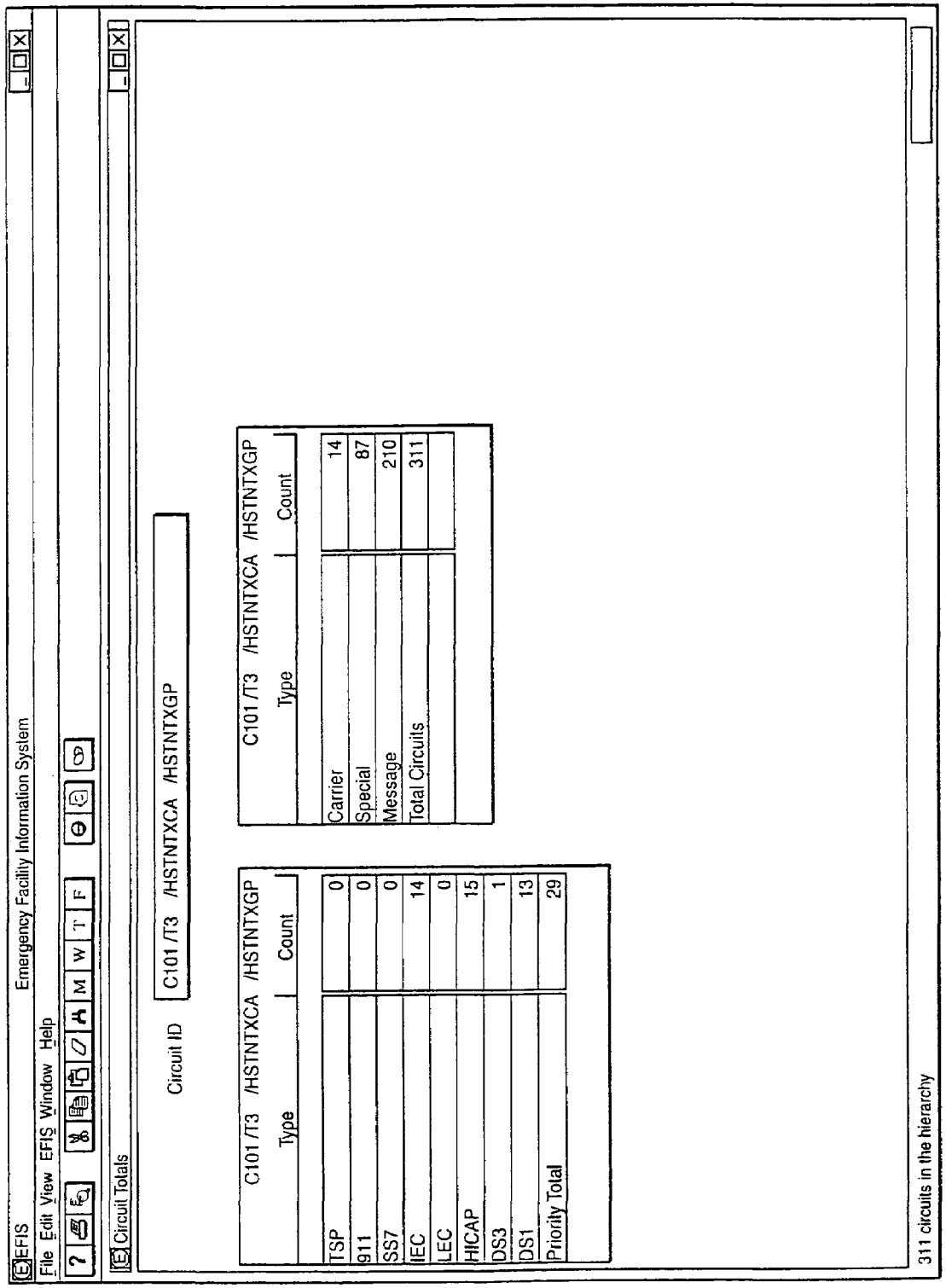
FIG. 10 shows a Circuit Totals display according to the present invention.

Circuit Totals is a standard report for carrier circuits, and is shown in FIG. 10. This report is available to a user whenever the user selects Circuit Totals and right clicks a circuit ID or chooses Circuit Totals Report option. This report includes the number of circuits by type (e.g., TSP, 911, SS7, IEC, LEC, HICAP, DS3, or DS1). It also includes a number of circuits that are Carrier, Message, and Special, and the total number of priority circuits.

Figure 11:
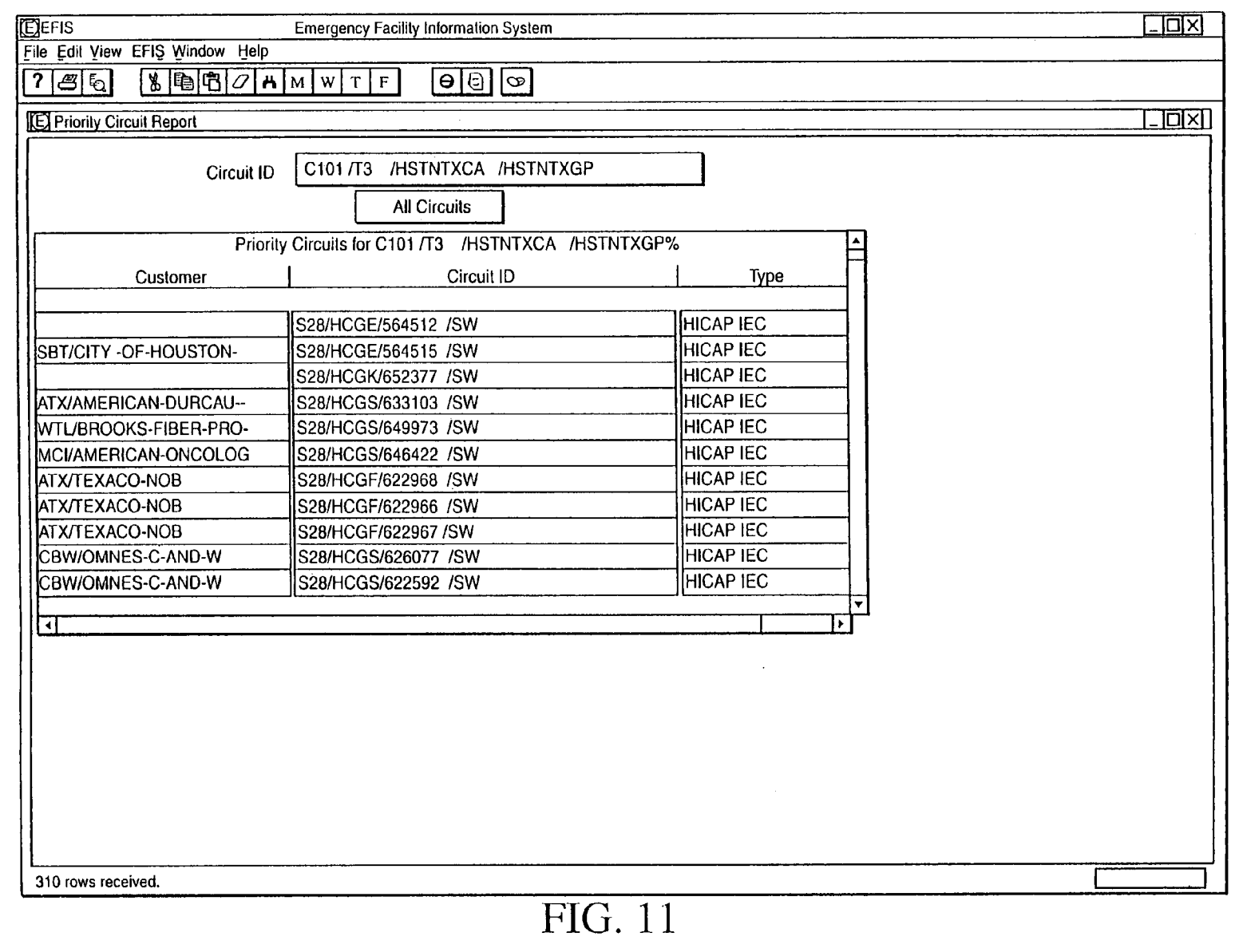

Priority Circuit Restoration is a standard report for carrier circuits, and is shown in FIG. 11. It is available to the user whenever the user selects Priority Circuit Restoration and right clicks the mouse button with a circuit ID selected, or chooses the Priority Circuit Report option. This report includes the customer name, circuit ID, and circuit type (e.g., TSP, 911, SS7, IEC, LEC, HICAP, DS3, DS1).

Figure 12:
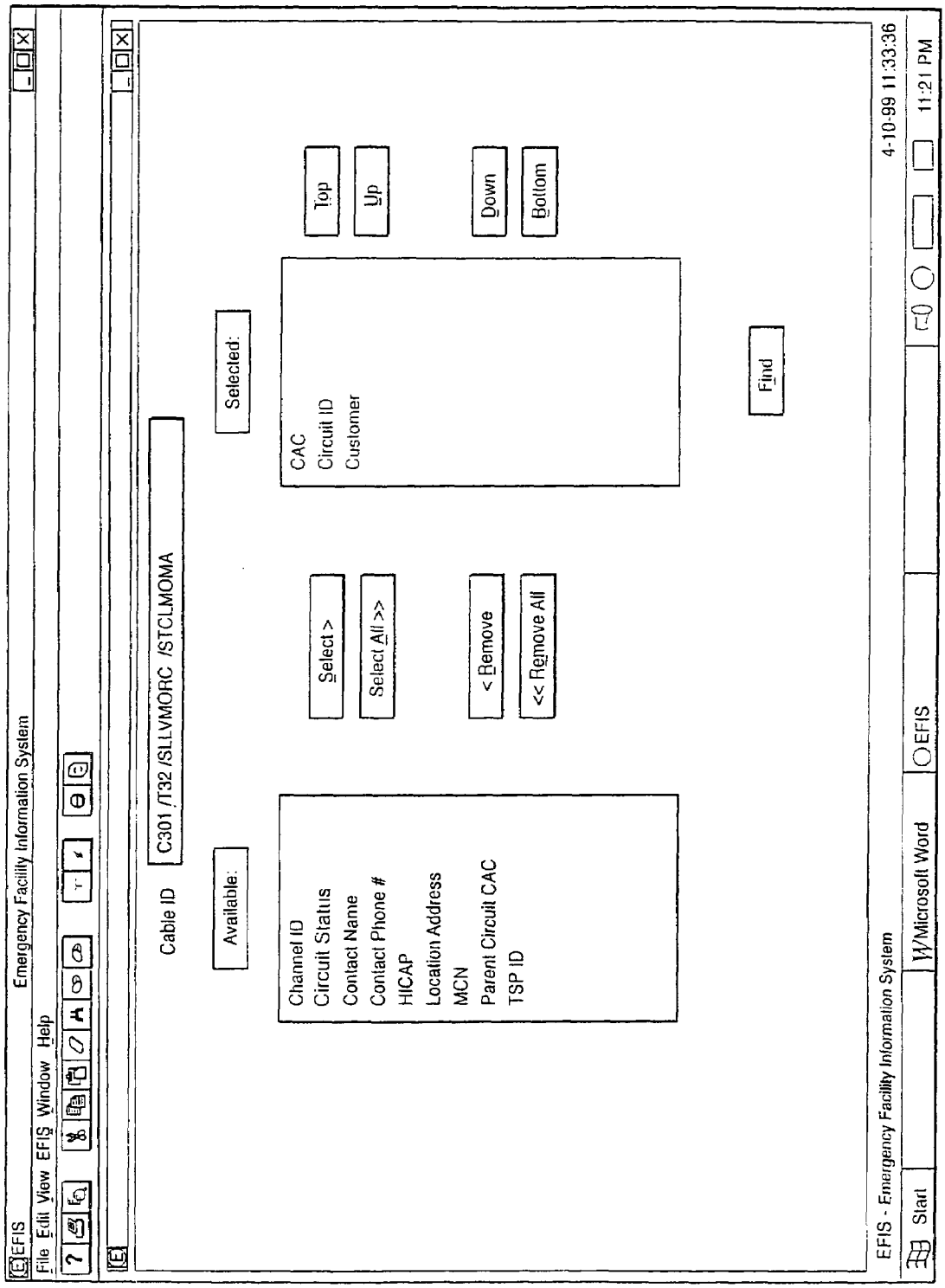
FIG. 12 shows a Custom Reports menu according to the present invention.

The Custom Reports option is available when the user has queried a carrier circuit or has clicked the right side mouse button while a circuit ID is selected. This report option, shown in FIG. 12, presents a list of information available regarding the selected circuit and allows the user to select one or more of these pieces of information to be used during preparation of the report. Based on which items are selected by the user, the following results may be returned (i.e obtained): circuit ID, circuit status, contact name A-end, contact name Z-end, contact phone number A-end, contact phone number Z-end, A-Loc address, Z-Loc address, TSP ID, HICAP, MCN or parent circuit CAC. FIG. 13 shows results return for selection of customer, circuit ID, and CAC.

Figure 14:
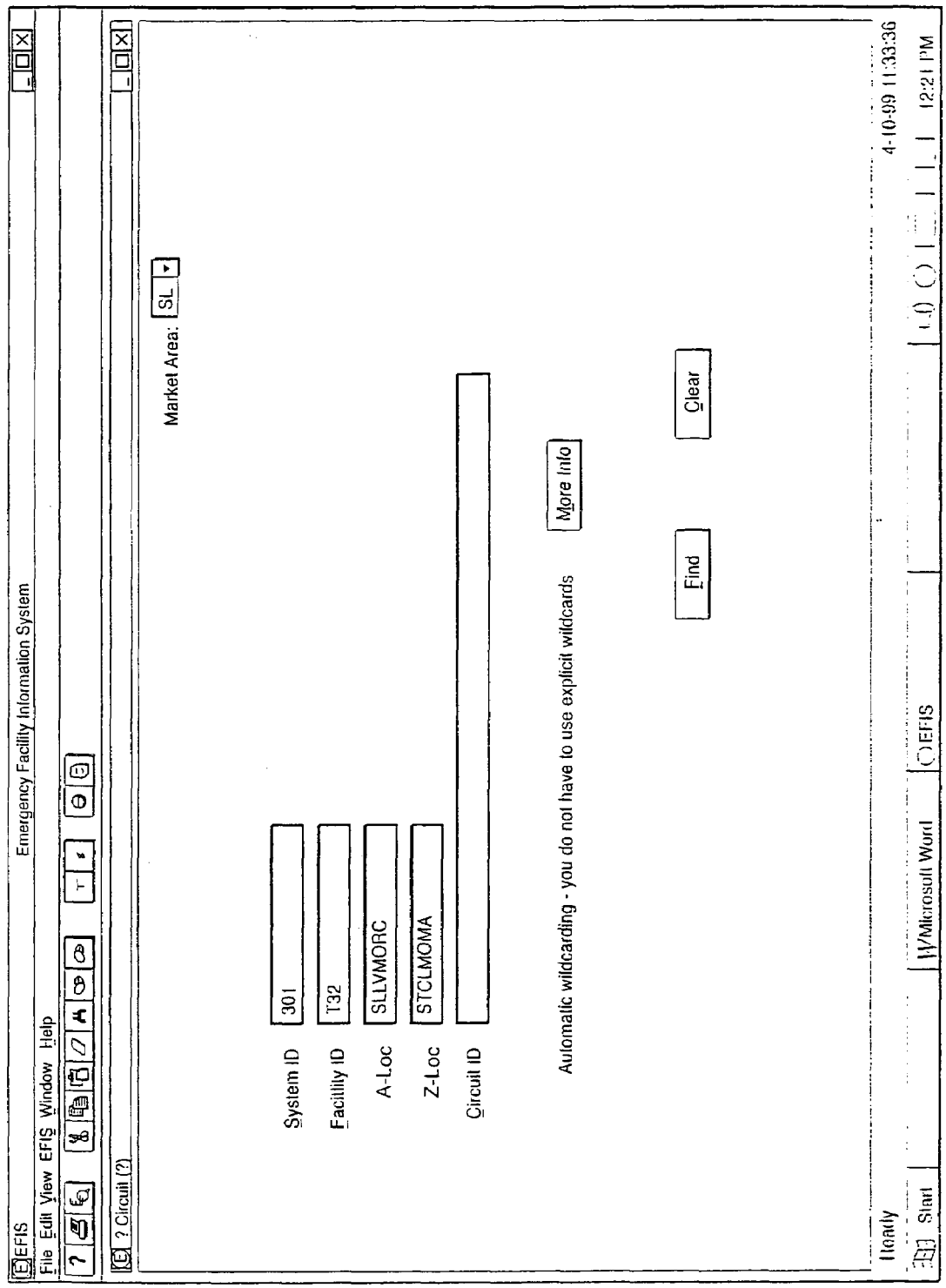
FIG. 14 shows a Carrier Circuit Reroute display according to the present invention.
Figure 15:
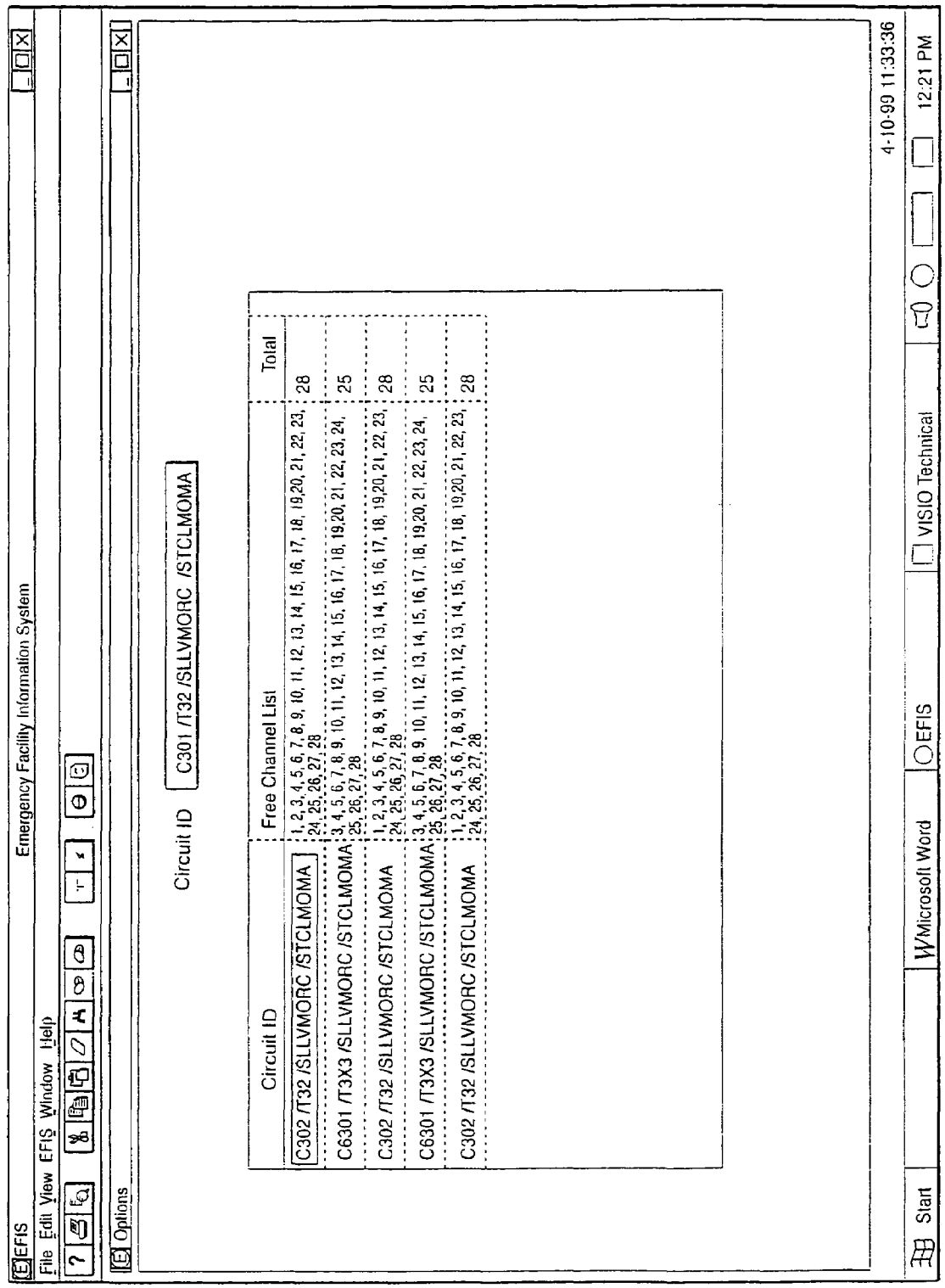
FIG. 15 shows a display with a result set after selection of a specific circuit and reroute under the Carrier Circuit Reroute display of FIG. 14 according to the present invention.

If the facility reroute button of the circuit facility main menu is selected by the user, the menu shown in FIG. 14 will appear. This menu will display text input fields for the user to enter a system ID, facility ID, A-Loc, Z-Loc, and circuit ID. The user may enter the full information, i.e., the full circuit ID, or a partial circuit ID. If a partial circuit ID is entered, the query may give the user several choices, whereby, the user must select one circuit ID for the reroute query. The default number of central offices for rerouting a circuit is two with optional three or four office reroute search. After the user has selected a specific circuit and chooses a reroute office option, the result set is returned, as shown in FIG. 15. This may include the circuit ID, list of available channels, and total free channels.

Figure 16:
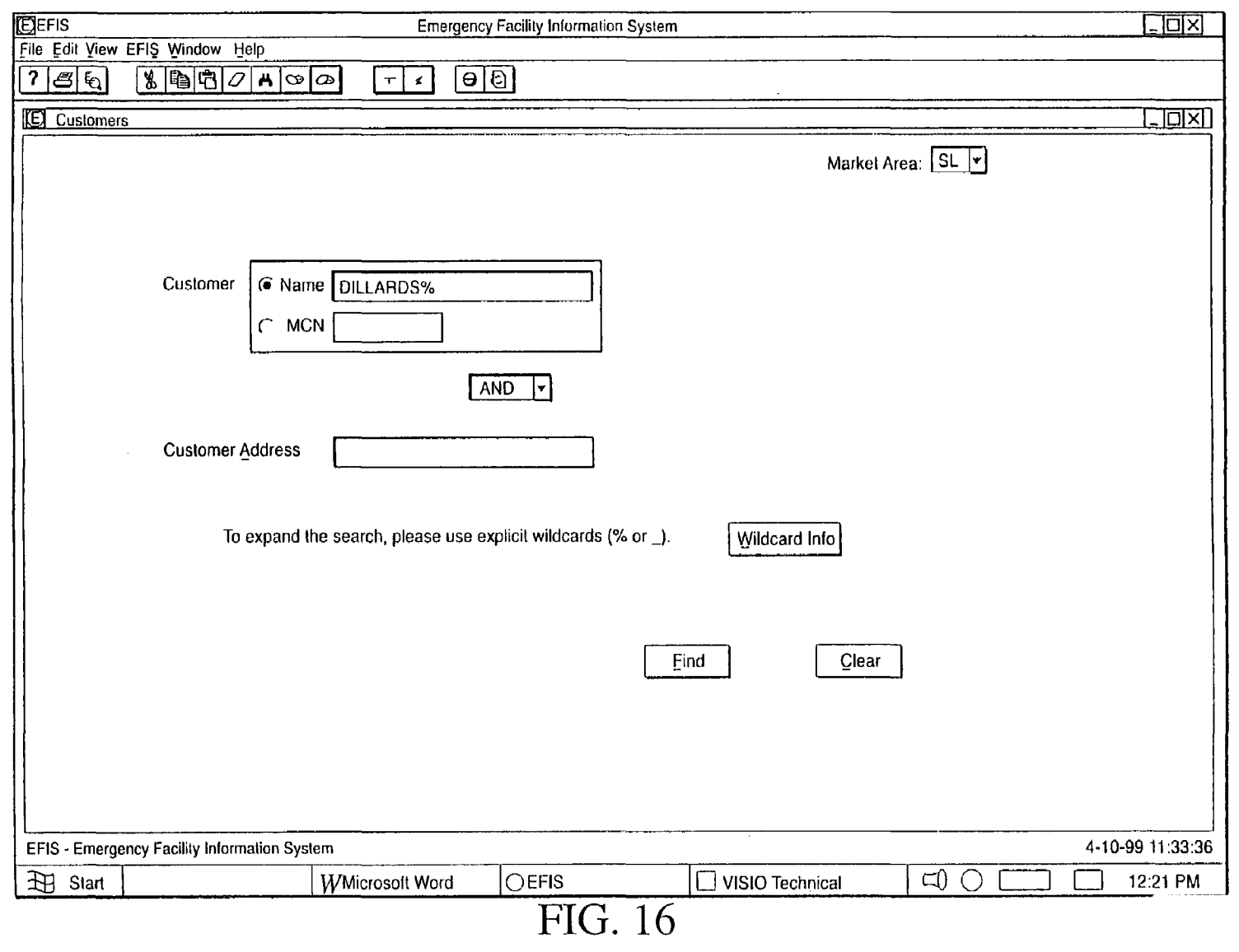
Figure 17:
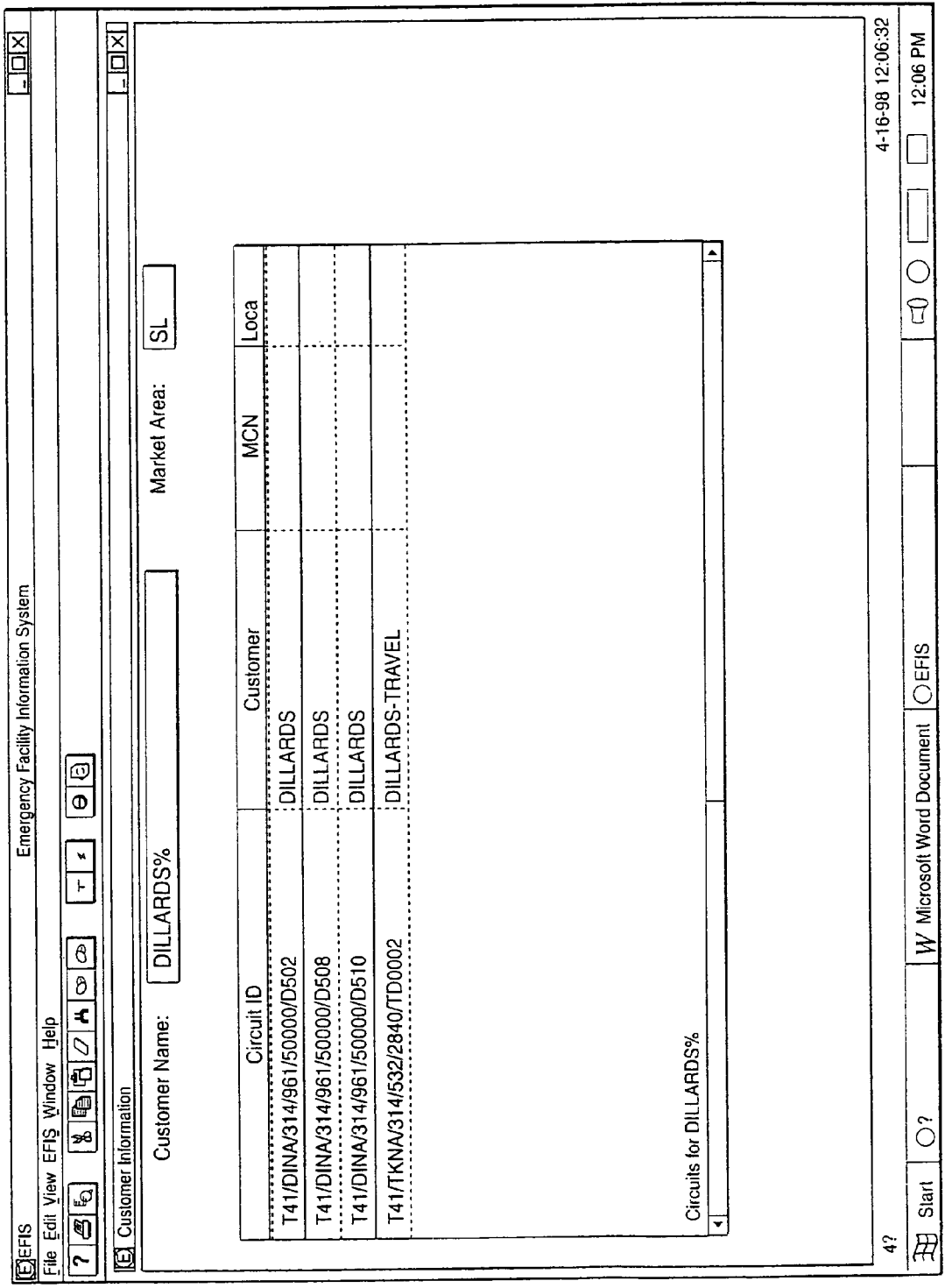
FIG. 17 shows a results display after Find is selected in the Customer menu of FIG. 16 according to the present invention.
Figure 18:
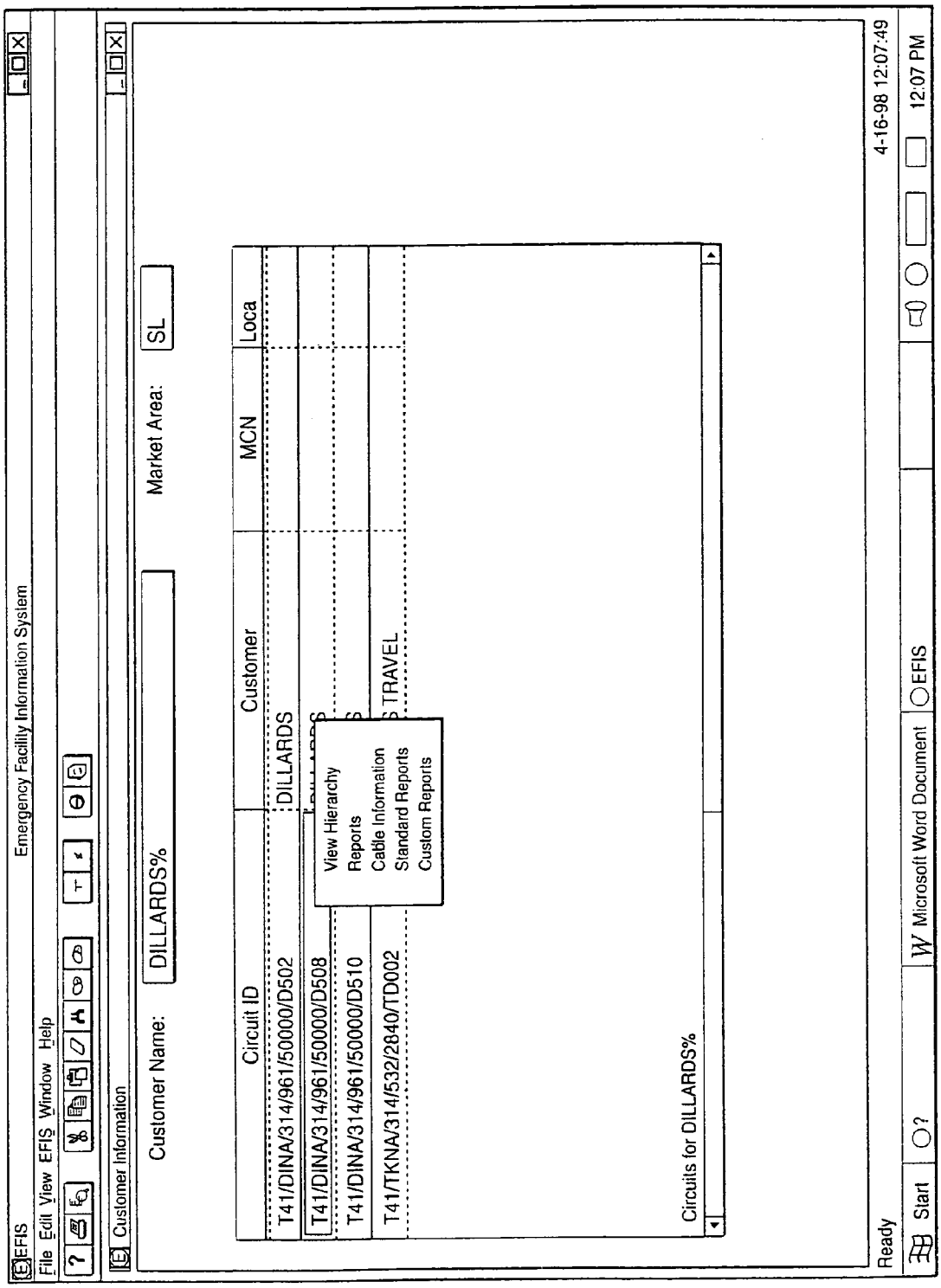
FIG. 18 shows a display with customer information in a grid format according to the present invention.

If the customer button on the circuit facility main menu is selected by the user, the screen shown in FIG. 16 appears where the user may make a query based on either a customer name, or major customer number (MCN) and/or a customer address. Wild card utilization may be used to expand the input criteria. Selection of the find button initiates the query. A clear button clears the input fields for a new selection. When the find button is selected, a new screen is displayed, as shown in FIG. 17. The results returned on this screen include a number of fields from the database such as circuit ID, customer name, customer address, MCN, A location, Z location, ACNA, and contact name and phone number. From this screen a circuit ID may be selected (by clicking the mouse button) to display additional report options such as View Hierarchy, Reroute, Standard and Custom Reports, identical to the previously described report options. Selecting the right mouse button is a feature that is available from any report, and displays a circuit ID in a grid format, as shown in FIG. 18.

Figure 19:
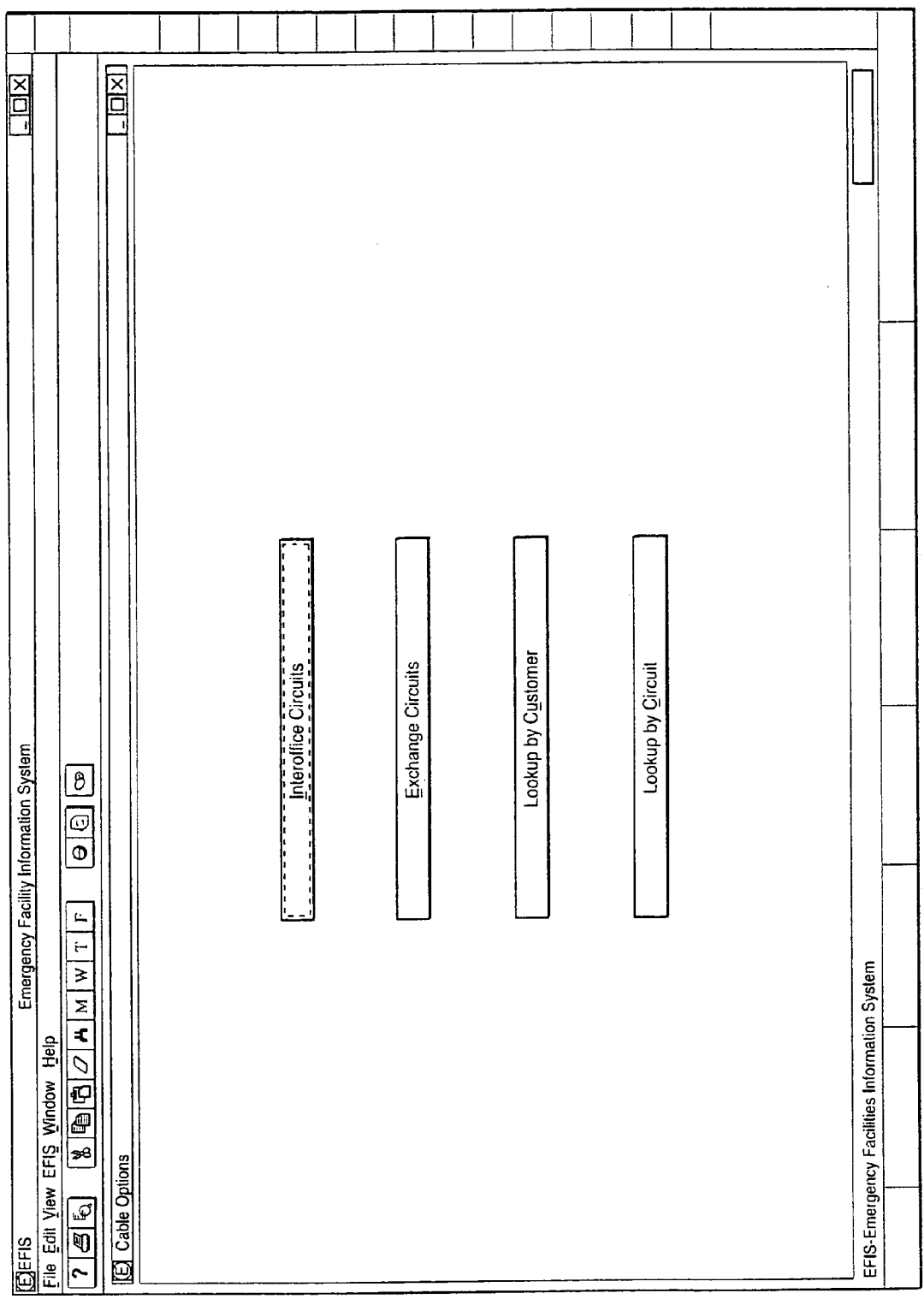
FIG. 19 shows a Cable menu display according to the present invention.

If Cable is selected from the circuit facility main menu, the screen shown in FIG. 19 is displayed that offers the user selections to choose from such as Interoffice Circuits, Exchange Circuits Lookup By Customer, and Lookup By Circuit. If Interoffice Circuits is selected, another menu will be displayed which provides text input areas for the user to enter cable ID, pair (range optional), A-CLLI, Z-CLLI, and terminal address. After entering any information necessary by the user and selecting find, EFIS will run the query and the interoffice circuits listing will appear.

If the Exchange Circuits option is selected by the user, an input screen will appear which allows the user to enter any information that he or she may already have on a cable that extends out from an office to a customer. This may include information such as Wire Center (NPANNX), terminal address, cable ID, or pair (range optional).

Figure 20:
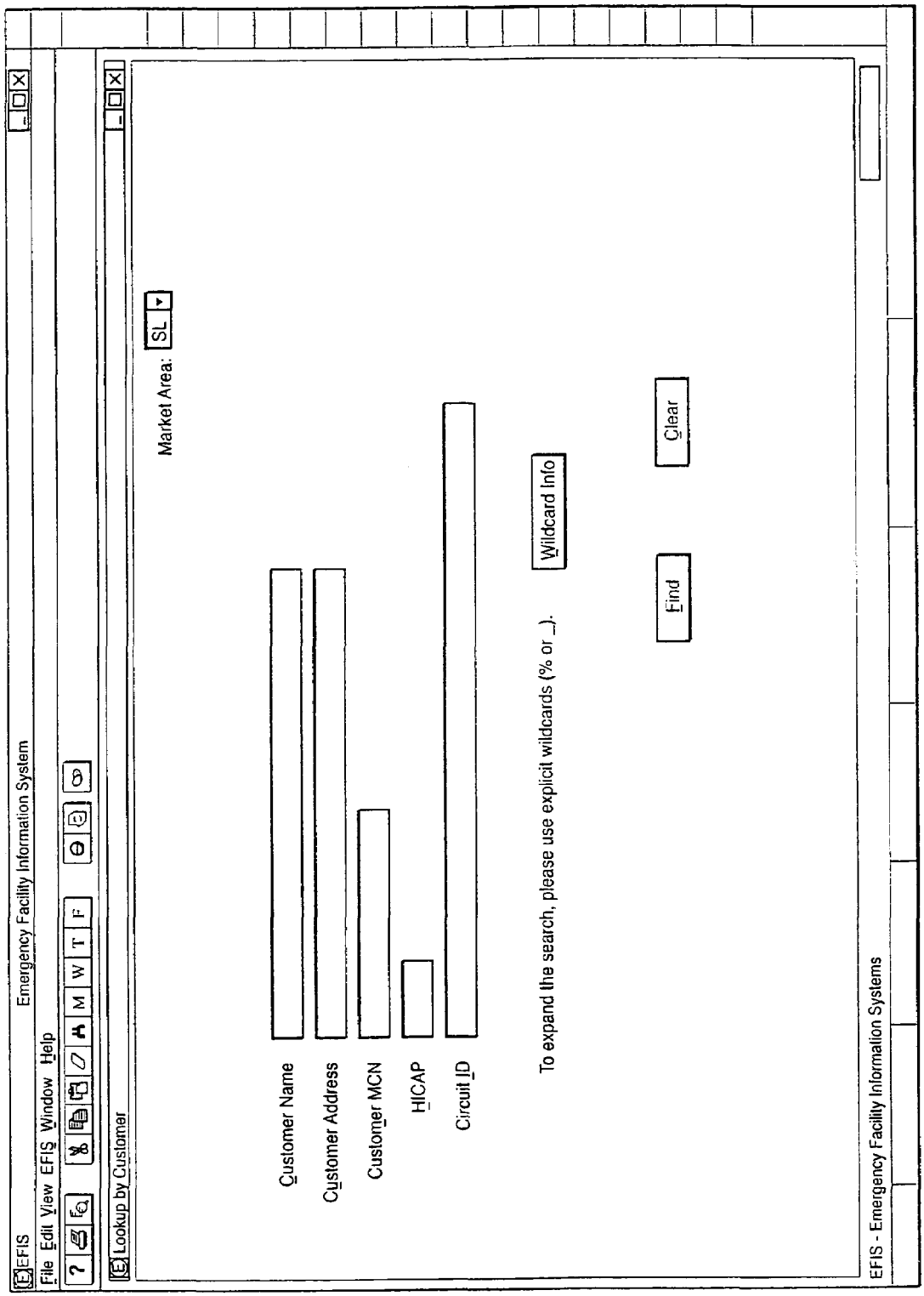
FIG. 20 shows a Lookup by Customer menu display according to the present invention.

If the user selects Lookup by Customer, the screen shown in FIG. 20 will appear which displays text input fields for the user to enter customer information such as the customer name, customer address, ACNA, and circuit ID. When find is selected, EFIS will run the query and the customer cable listing will appear.

Figure 21:
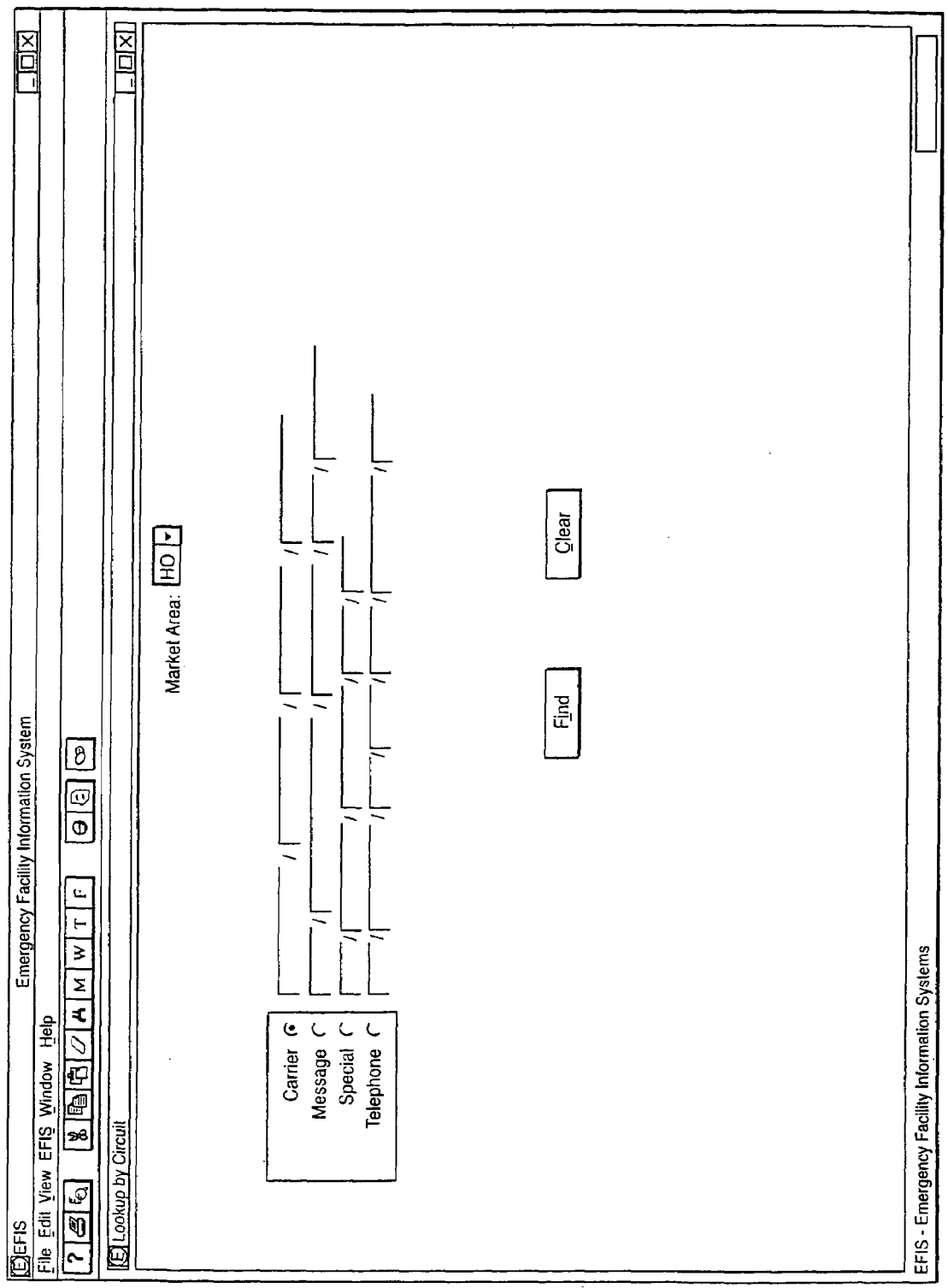
FIG. 21 shows a Lookup by Circuit menu display according to the present invention.
Figure 21A:
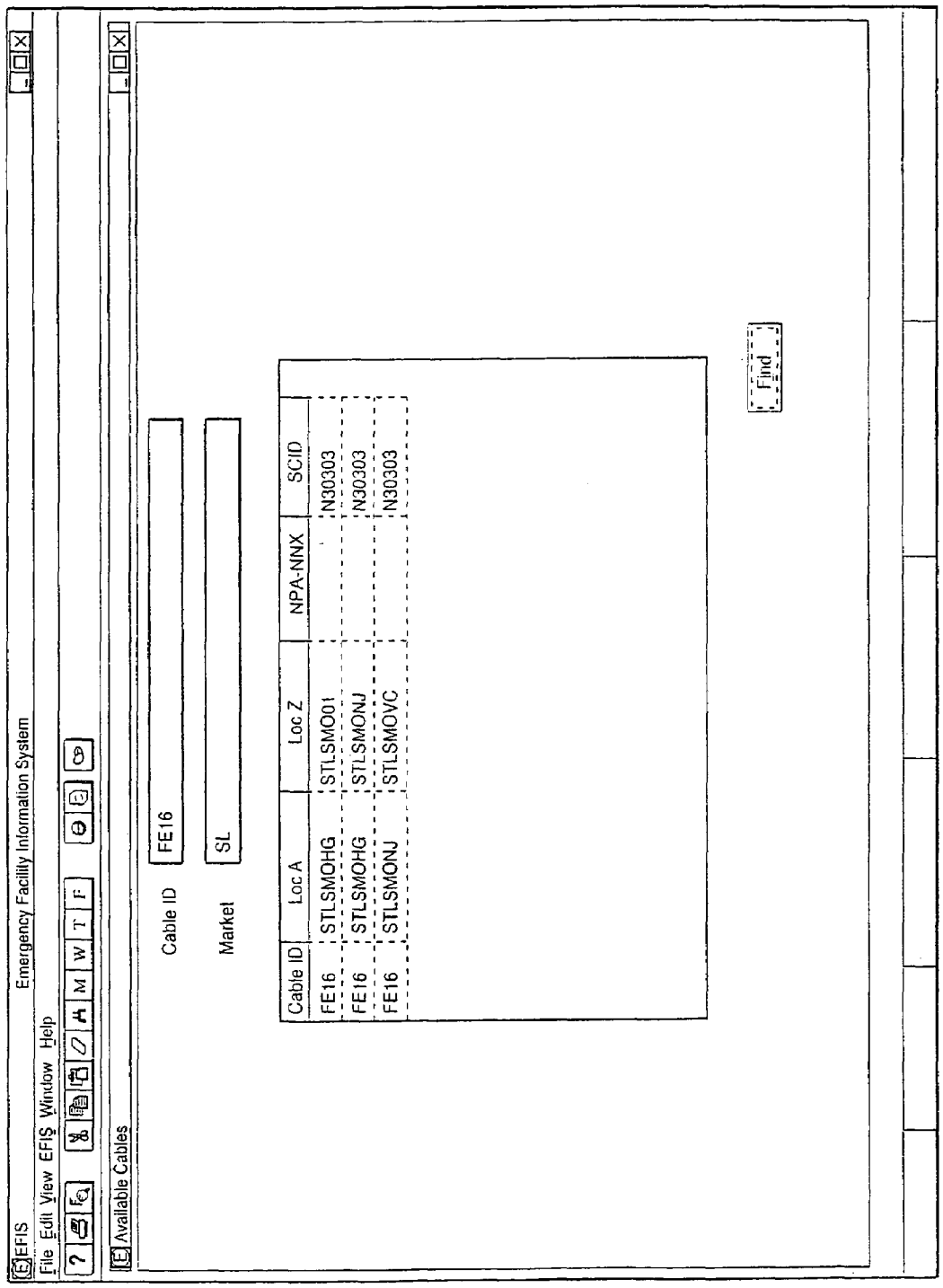
FIG. 21A shows a display displaying a list of cables resulting after entering information under the menus of FIGS. 20 or 21 according to the present invention.
Figure 22:
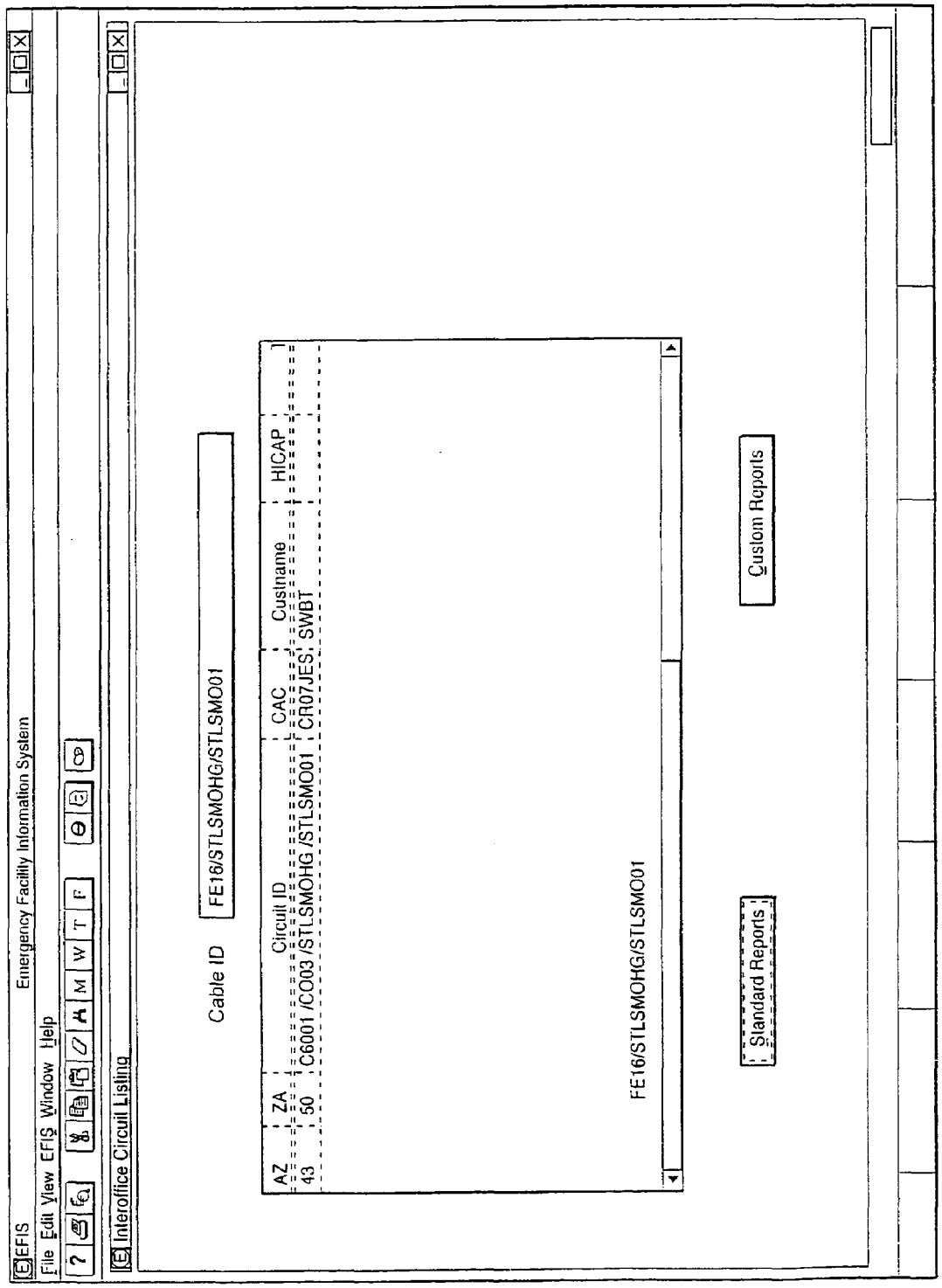
FIG. 22 shows a display with more detailed information after the user drills down on a selected cable in FIG. 21A according to the present invention.

If the user selects Lookup by Circuit, another screen appears which allows the user to enter a full or partial circuit ID. Once entered, and the find button is selected, EFIS will run the query and return a list of cables assigned to that circuit ID, as shown in FIG. 21. Selecting one of the cables listed, and selecting the find button, will cause the system to return more specific cable information. A high level view of each circuit that is physically assigned to each individual cable pair will be displayed. The information displayed will include: cable ID, A location, Z location, NPANNX, and SCID. Selecting one of the cables and pressing the find button effectively drills down (i.e., progresses down to lower levels) on the selected cable producing the screen shown in FIG. 22 with additional information. This screen allows the user to select Standard Reports or Custom Reports.

Figure 23:
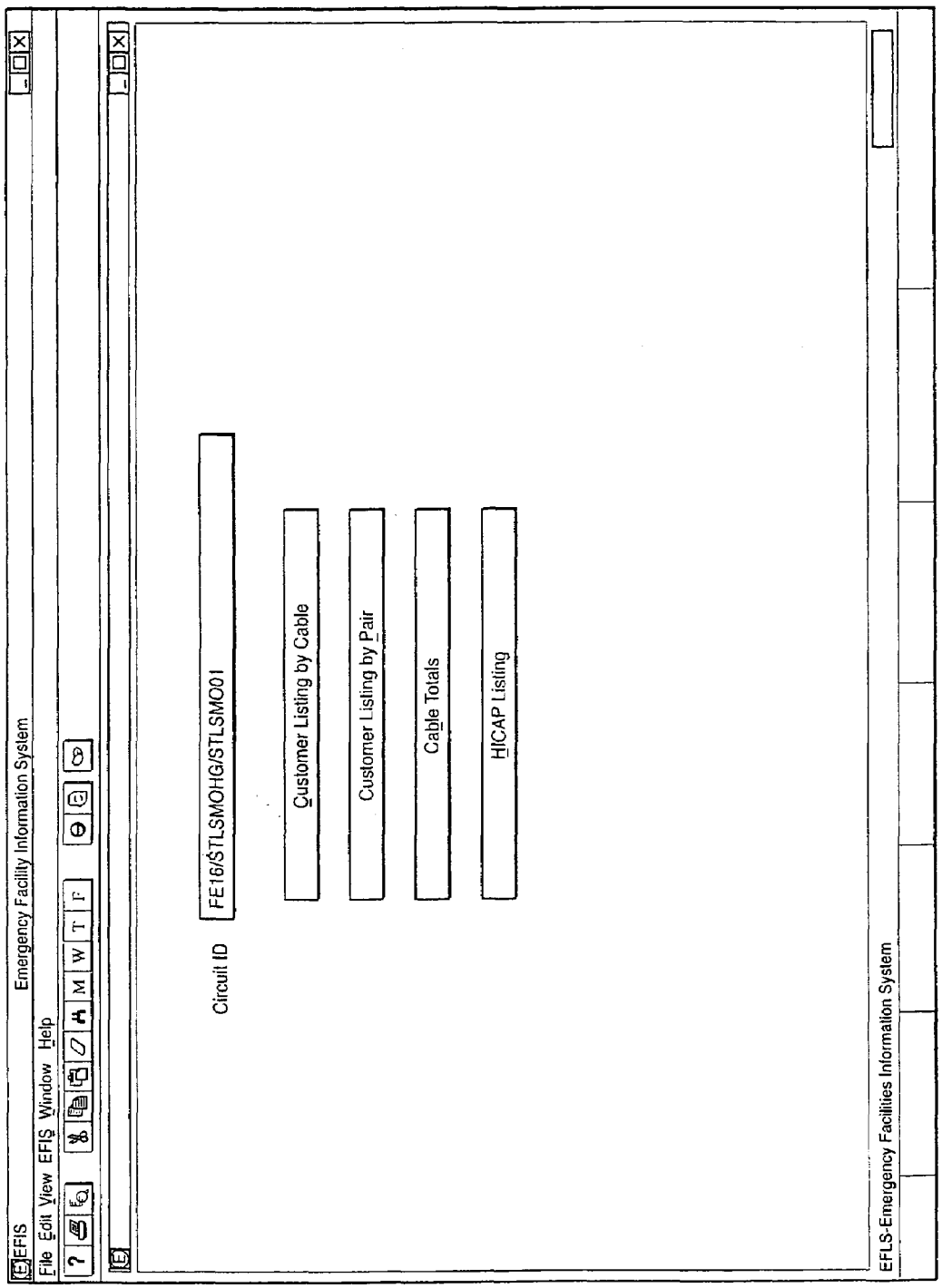
FIG. 23 shows a Standard Reports menu display according to the present invention.

If the user selects Standard Reports, the screen shown in FIG. 23 will be displayed which allows the user to select between a number of options. These options include Customer Listing By Cable, Customer Listing By Pair, Cable Totals, and HICAP Listing.

Figure 24:
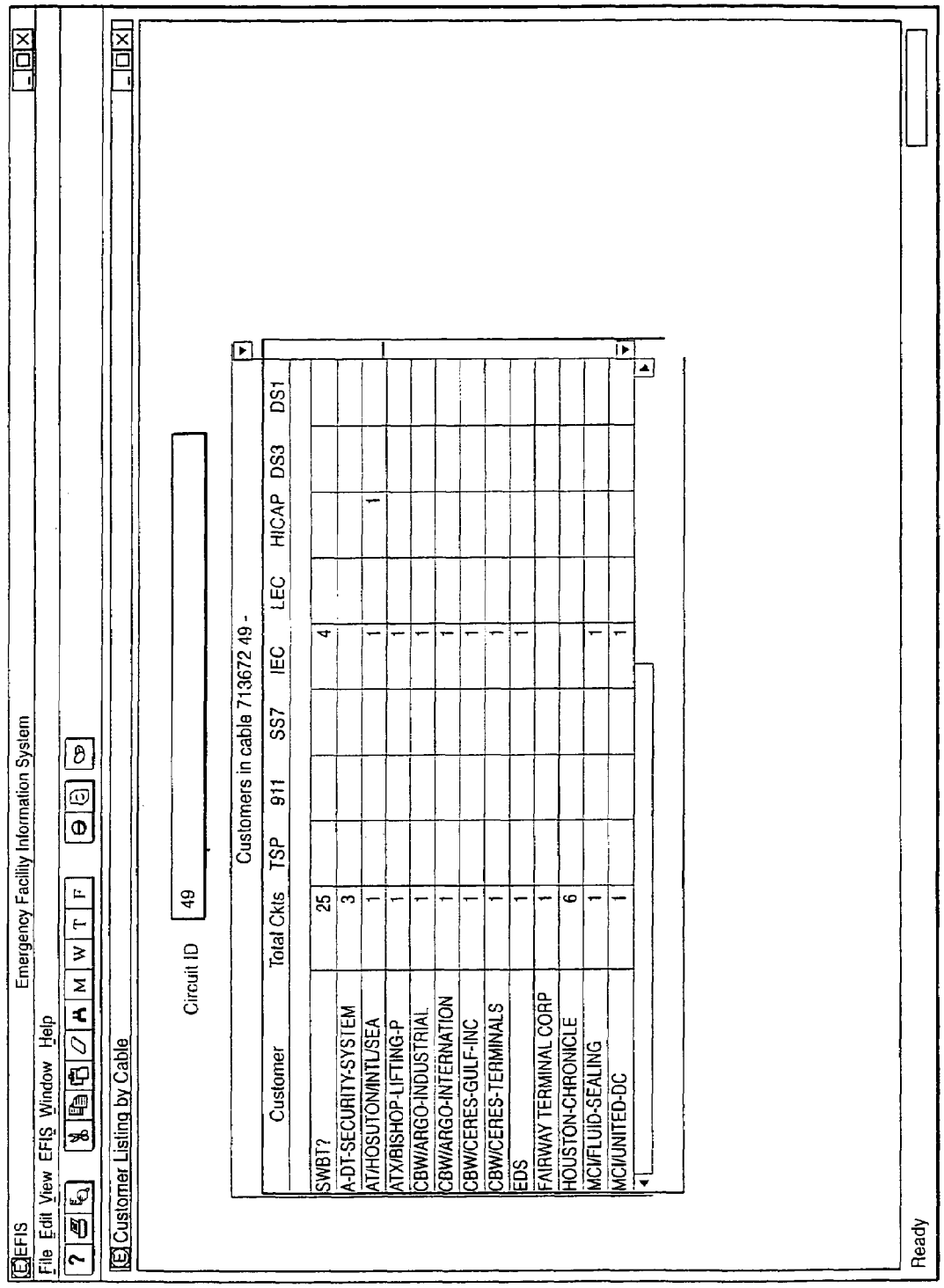
FIG. 24 shows a Customer Listing by Cable report display according to the present invention.

If Customer Listing By Cable report is selected, the screen shown in FIG. 24 is displayed which totals by customer, the priority counts for the following categories (TSP, 911, SS7, IEC, LEC, HICAP, DS3, DS1 and total circuits). The counts reflect all sub-tending circuits for each carrier circuit hierarchy.

Figure 25:
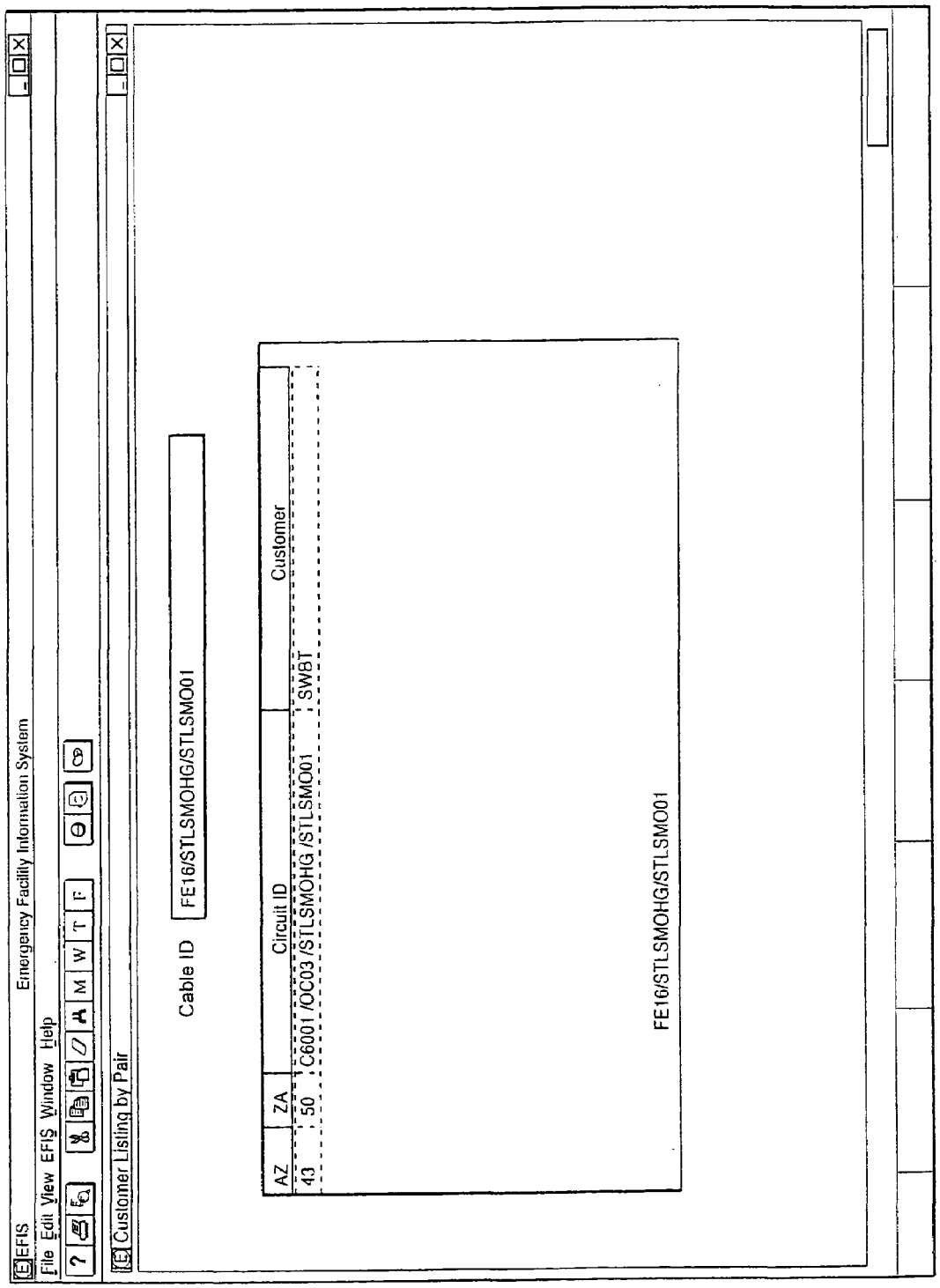
FIG. 25 shows a Customer Listing by Pair report display according to the present invention.

Selecting Customer Listing By Pair report displays the screen shown in FIG. 25 which details customer and circuit ID for each cable pair, as well as sub-tending circuits for each carrier circuit hierarchy.

Figure 26:
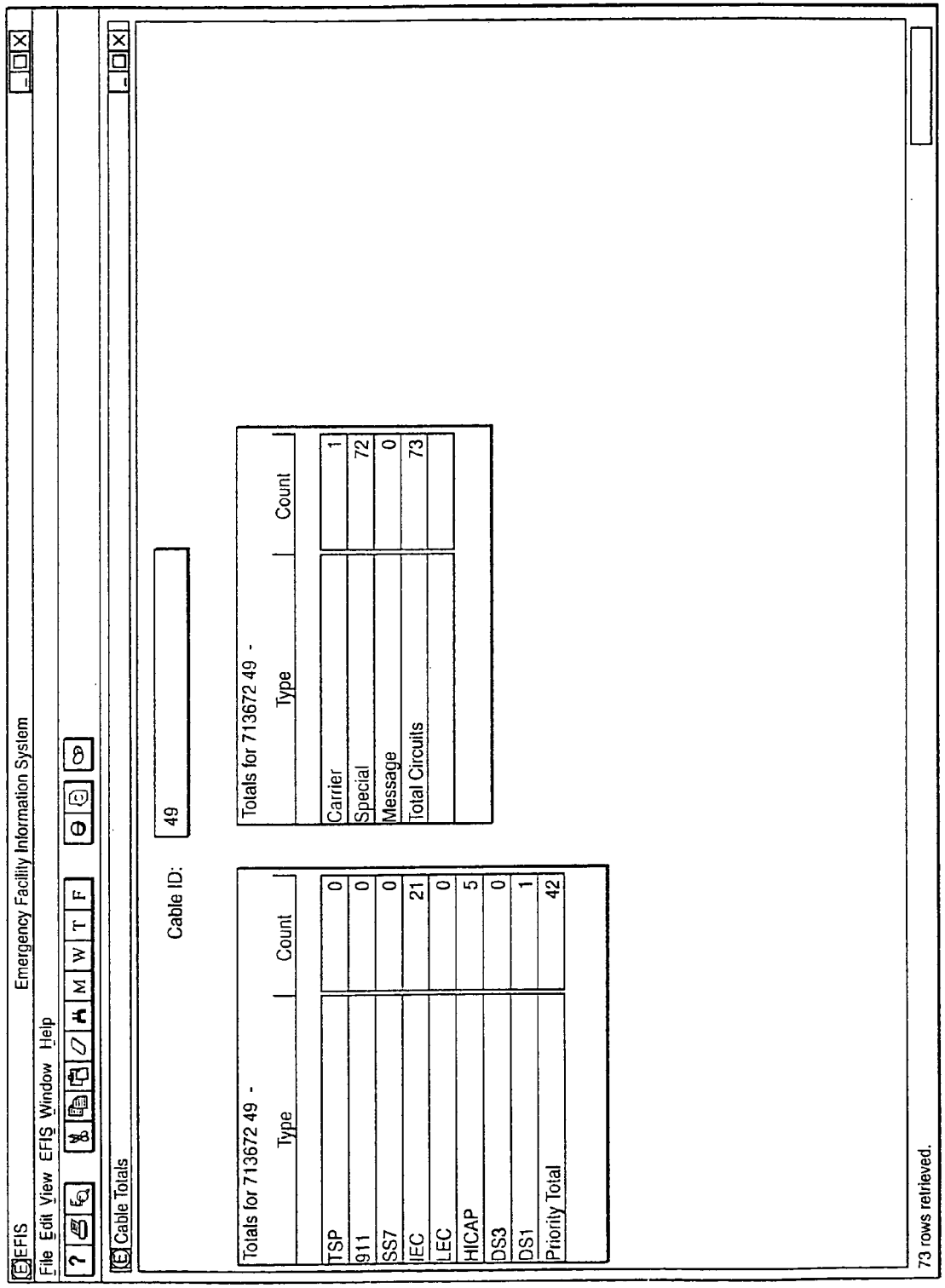
FIG. 26 shows a Cable Totals report display according to the present invention.

Selecting Cable Totals generates the screen shown in FIG. 26 which summarizes cable totals for the following categories (TSP, 911, SS7, IEC, LEC, HICAP, DS3, DS1 and total circuit counts for Carrier, Special, and Message circuit formats).

Selecting the HICAP Circuit Listing generates a new screen which lists only DS1 and above circuits that meet this selection criteria. These results include sub-tending high capacity circuits in each carrier circuit hierarchy.

Selecting Custom Reports allows a user to select from a predefined list of fields and create a report containing only the criteria selected. A user may select between a list of fields that may include cable designation, cable ID, cable type, CAC, circuit ID, circuit status, contact name A location, contact name Z location, contact address A location, contact address Z location, contact phone A location, contact phone Z location, customer, HICAP flag, NPA/NNX, pair ID, terminal address, and TSP.

Figure 27:
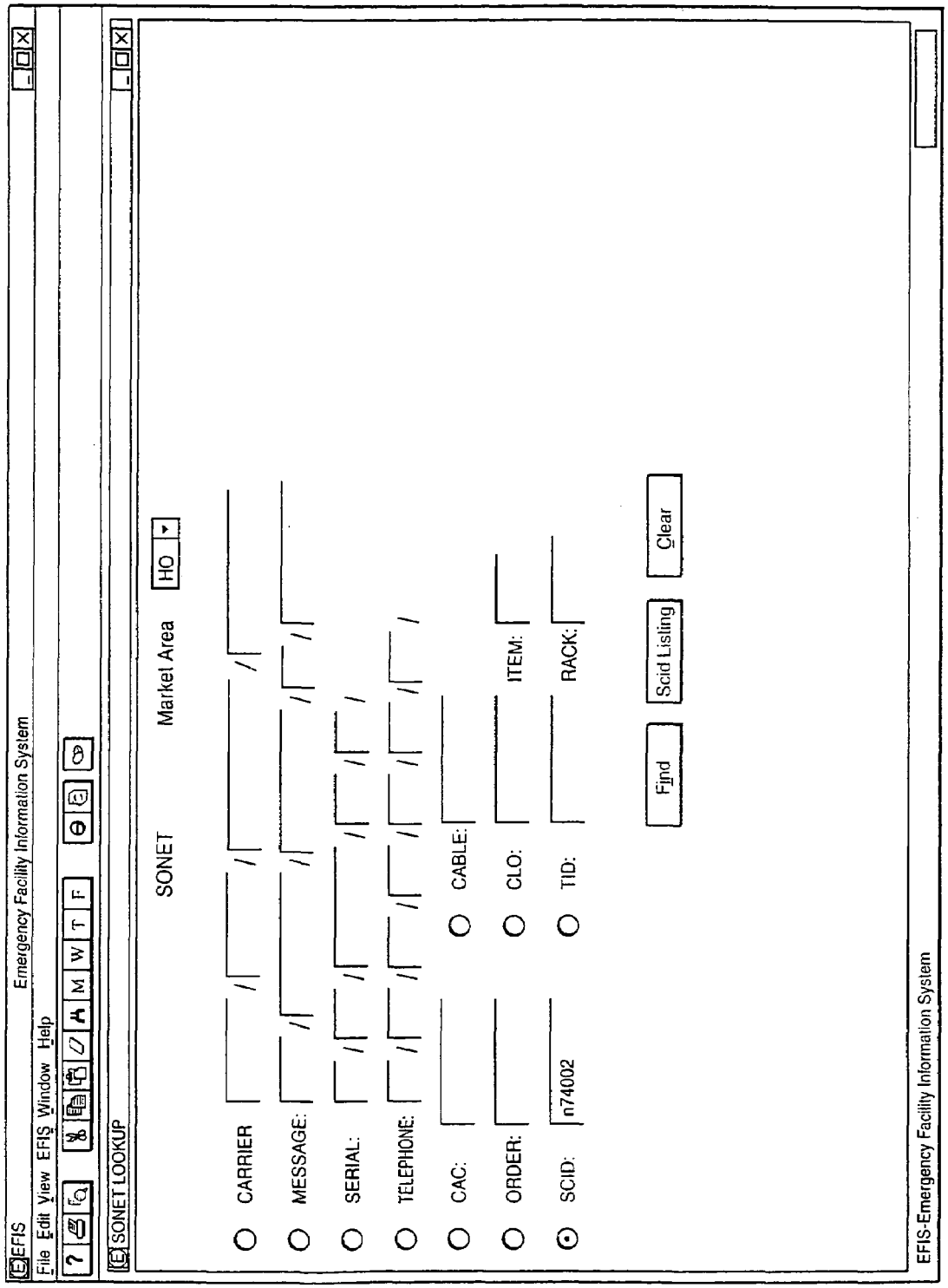
FIG. 27 shows a SONET Lookup menu display according to the present invention.

Returning to the EFIS main menu, if SONET is selected, then the menu shown in FIG. 27 appears showing the SONET circuit lookup input screen. Depending on what input information is known by the user, the user will then select one of several options corresponding to the information known by the user. The options include a carrier circuit ID, message circuit ID, special circuit ID, telephone circuit ID, CAC, cable, order number (SORD), CLO (circuit layout order), SCID, TID and Rack. Selecting Clear clears all input fields. SCID listing returns all SCIDs in a market area. Selection of Find initiates a query based on the input values. The results are then displayed on a new screen, as shown in FIG. 28. The new screen will also include options for selections such as Draw and Reports.

Figure 29:
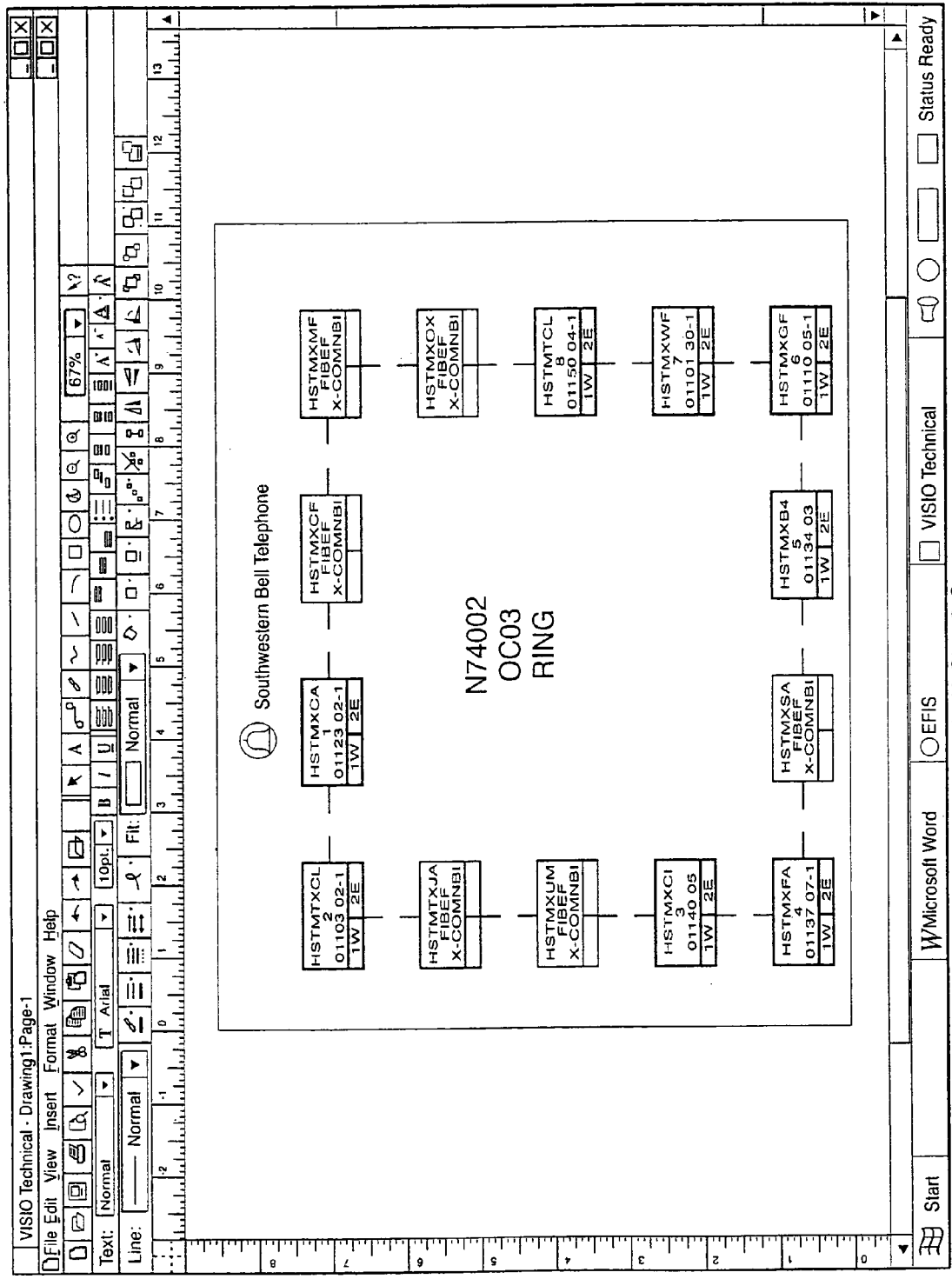
FIG. 29 shows a SONET layout according to the present invention.
Figure 30:
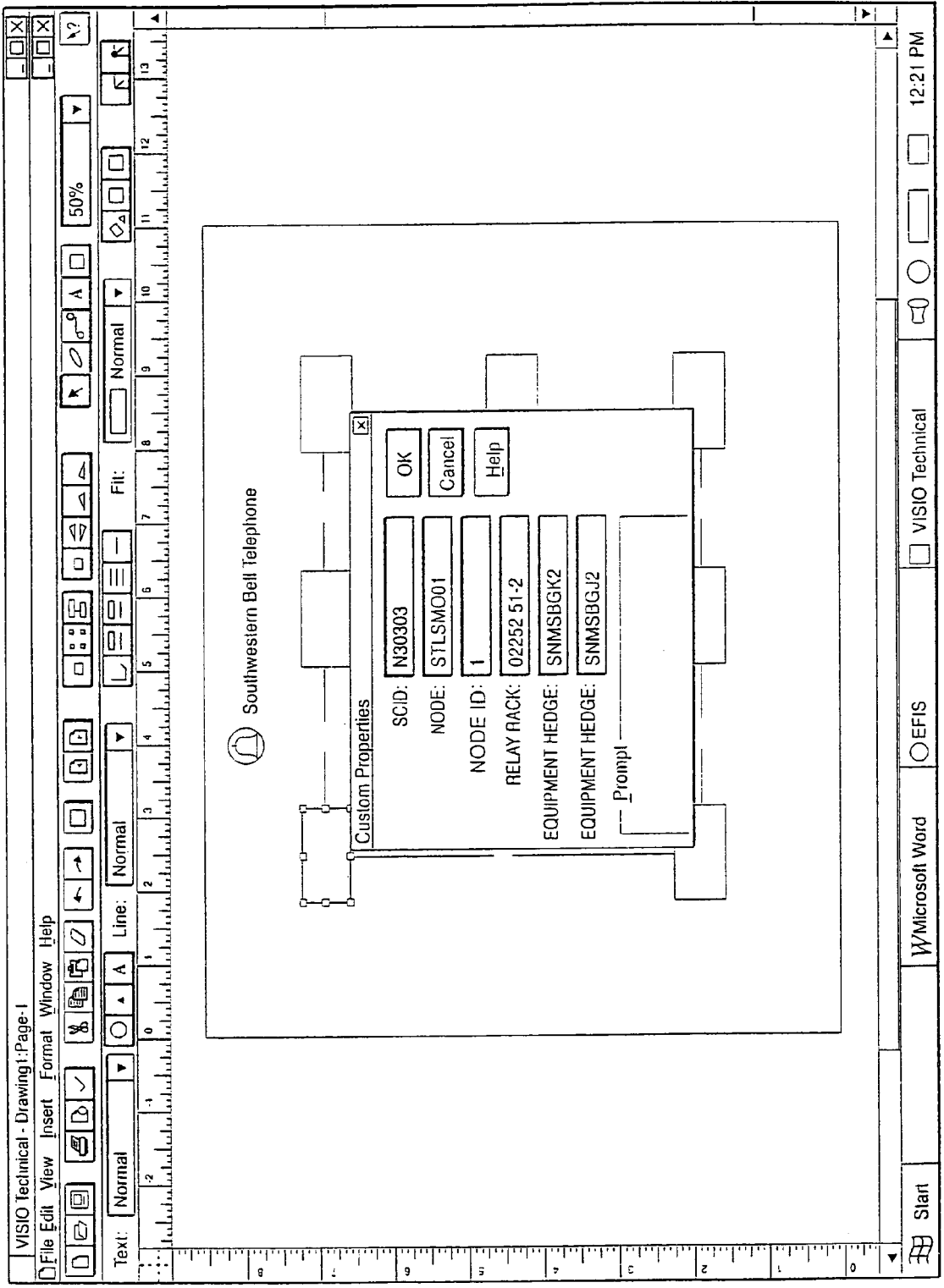
FIG. 30 shows a pop-up box on the SONET layout of FIG. 29 displaying node details according to the present invention.

Selecting Draw initiates a query based on the SCID selected and starts VISIO® for display of SONET layout, as shown in FIG. 29. Selecting the right mouse button will cause the system to display a pop-up box with node details, shown in FIG. 30.

Figure 31:
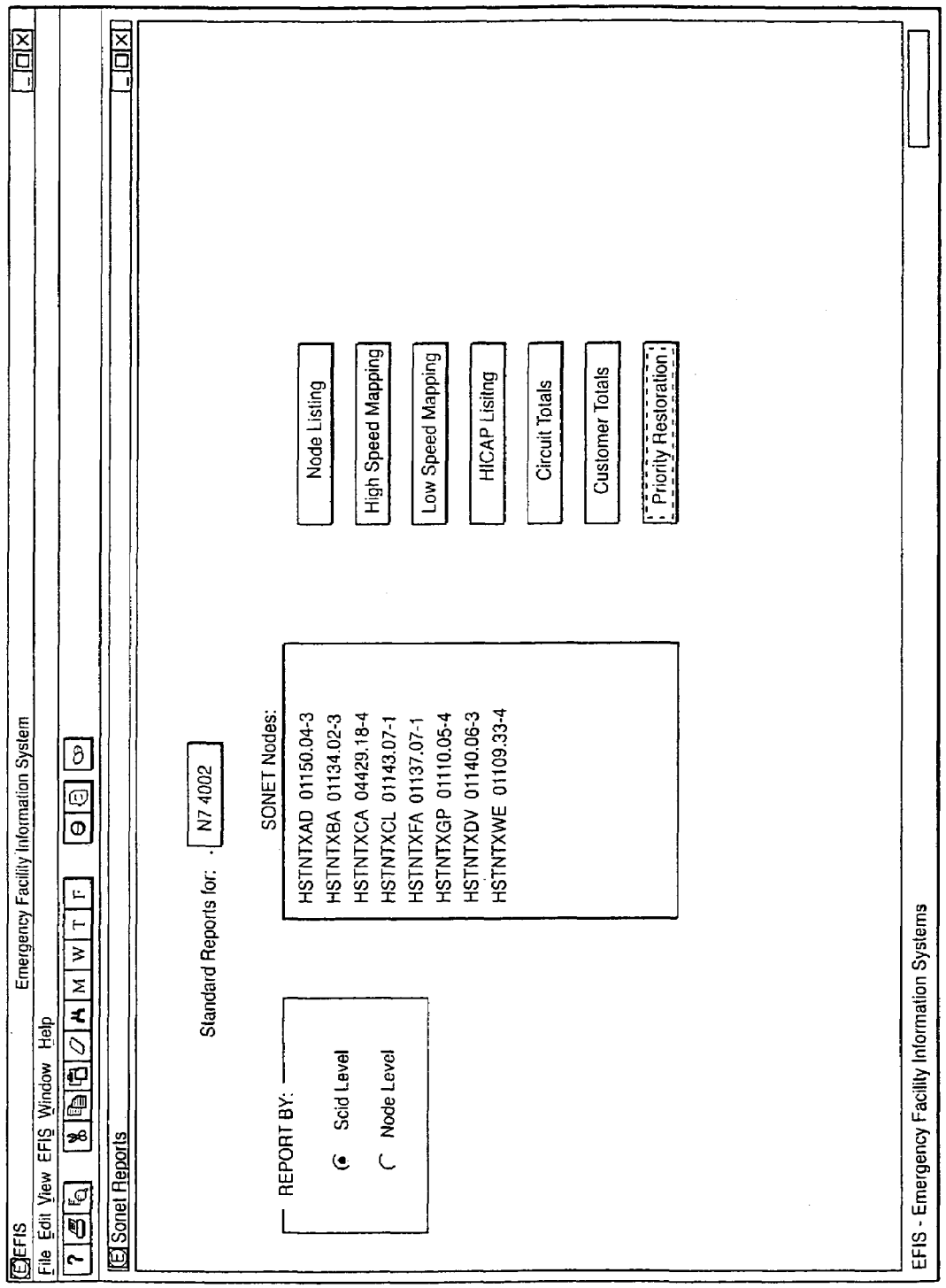
FIG. 31 shows a SONET Reports menu display according to the present invention.

Selecting Reports causes the display of report options available for a particular node, or the entire SCID. A screen will be displayed, as shown in FIG. 31, allowing the user to select between choices such as node listing, high speed assignments or mapping, low speed assignments or mapping, HICAP listing, circuit totals, customer totals and priority restoration.

Selection of Node Listing report displays a new screen, as shown in FIG. 32, with a text description on the SONET layout in the order of sequence. The new screen will display information regarding the node ID, node location, relay rack appearance, connecting cable ID, CAC for connecting circuit ID, and equipment identifiers (HECIG).

Figure 33:
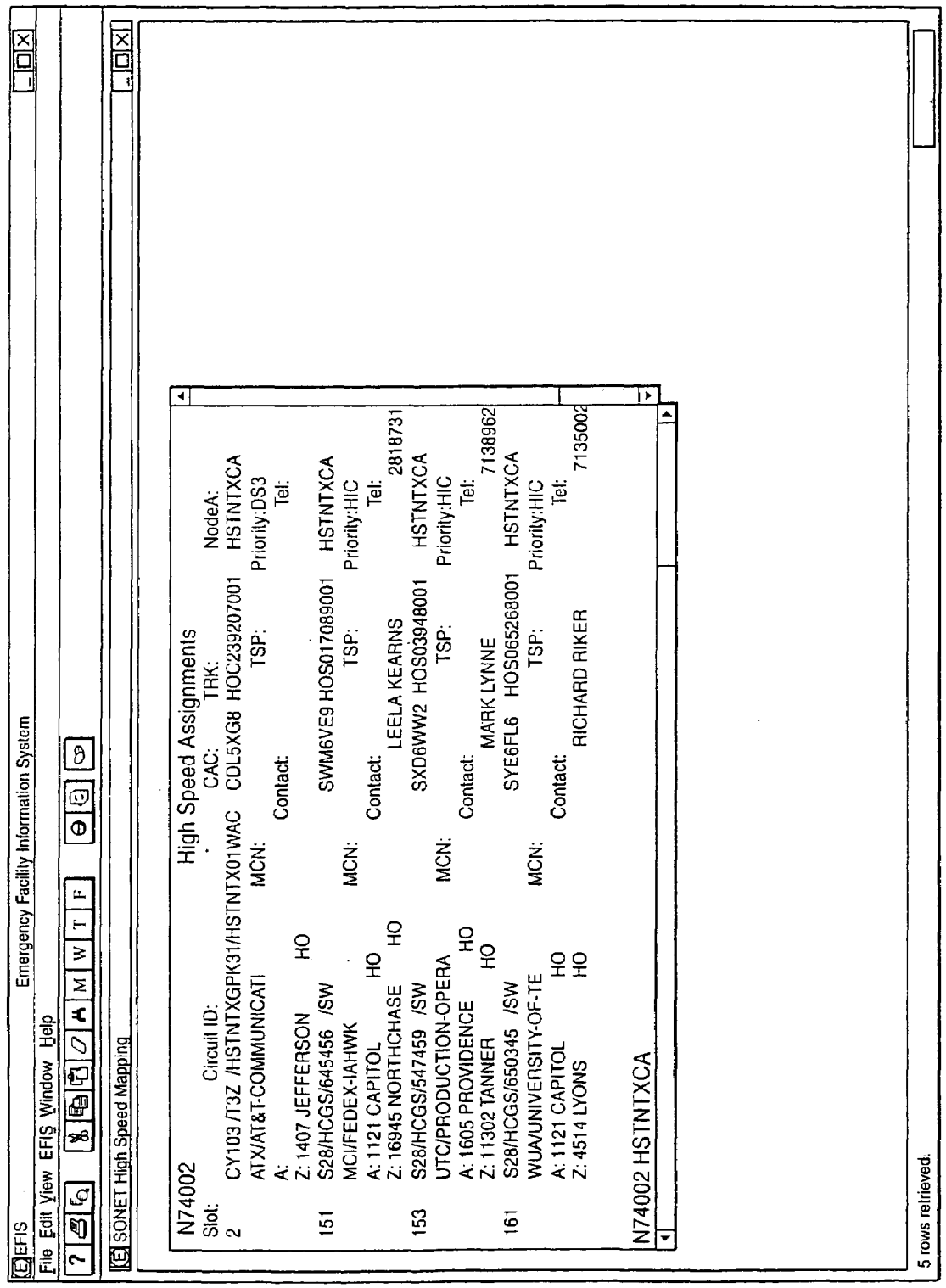
FIG. 33 shows a High Speed report display according to the present invention.

If the user selects the High Speed report option, a new display will appear as shown in FIG. 33, showing the high speed slot assignment for individual circuits on the SCID. This display will contain information regarding the slot number, circuit ID, CAC, CLO, A and Z locations (points of entry and exit from SCID), customer name, MCN, TSP, circuit priority level, A and Z address of circuit ID, and contact name and telephone number.

Figure 34:
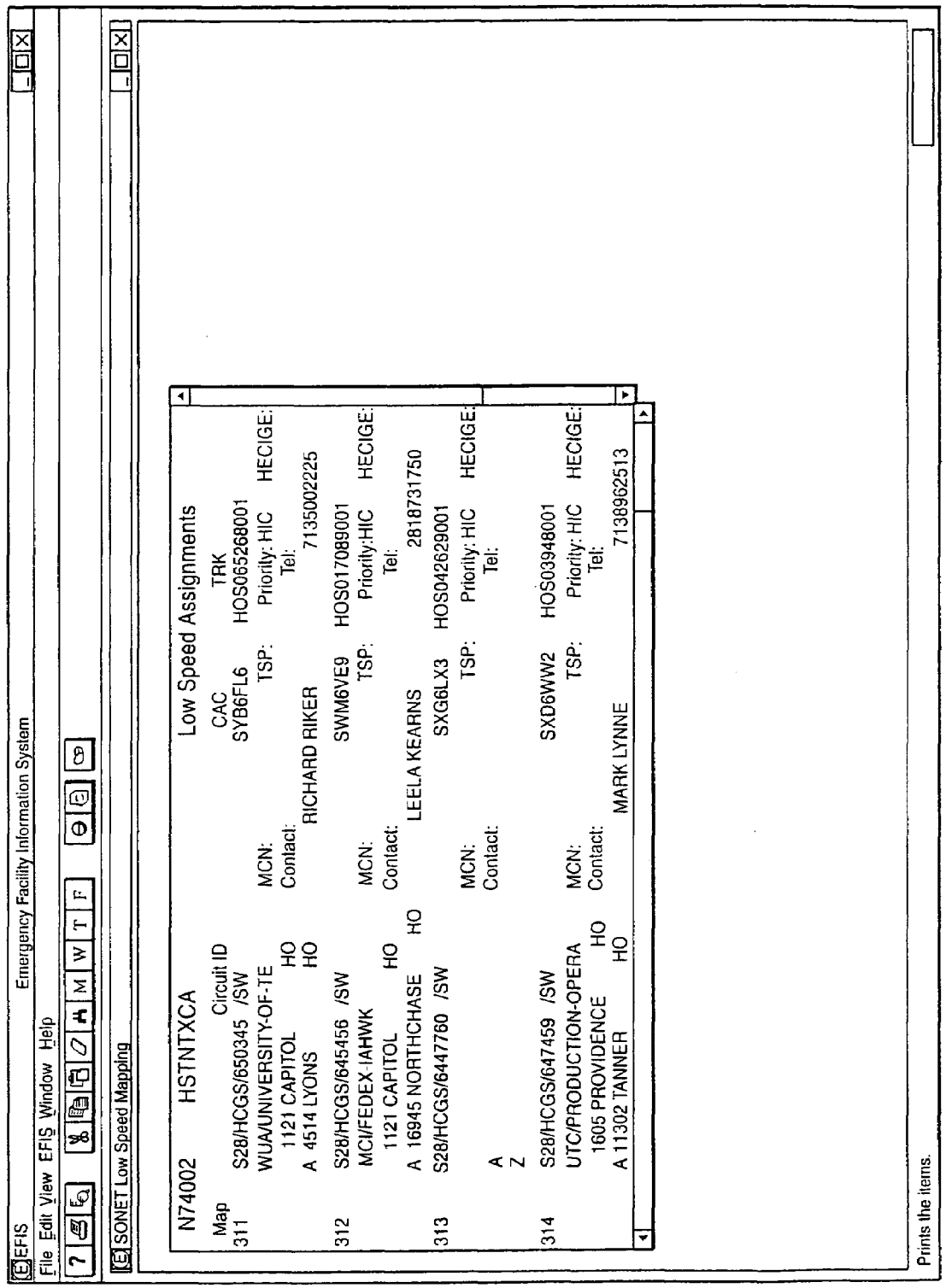
FIG. 34 shows a Low Speed Assignments display according to the present invention.

Selection of the Low Speed Assignment report option by the user will cause the display of the low speed slot assignment for individual circuits on the SCID. This display is shown in FIG. 34 and includes information such as slot number, circuit ID, CAC, CLO, equipment identifier (HECIG), customer name, MCN, TSP, circuit priority level, A and Z address of circuit ID, and contact name and telephone number.

Figure 35:
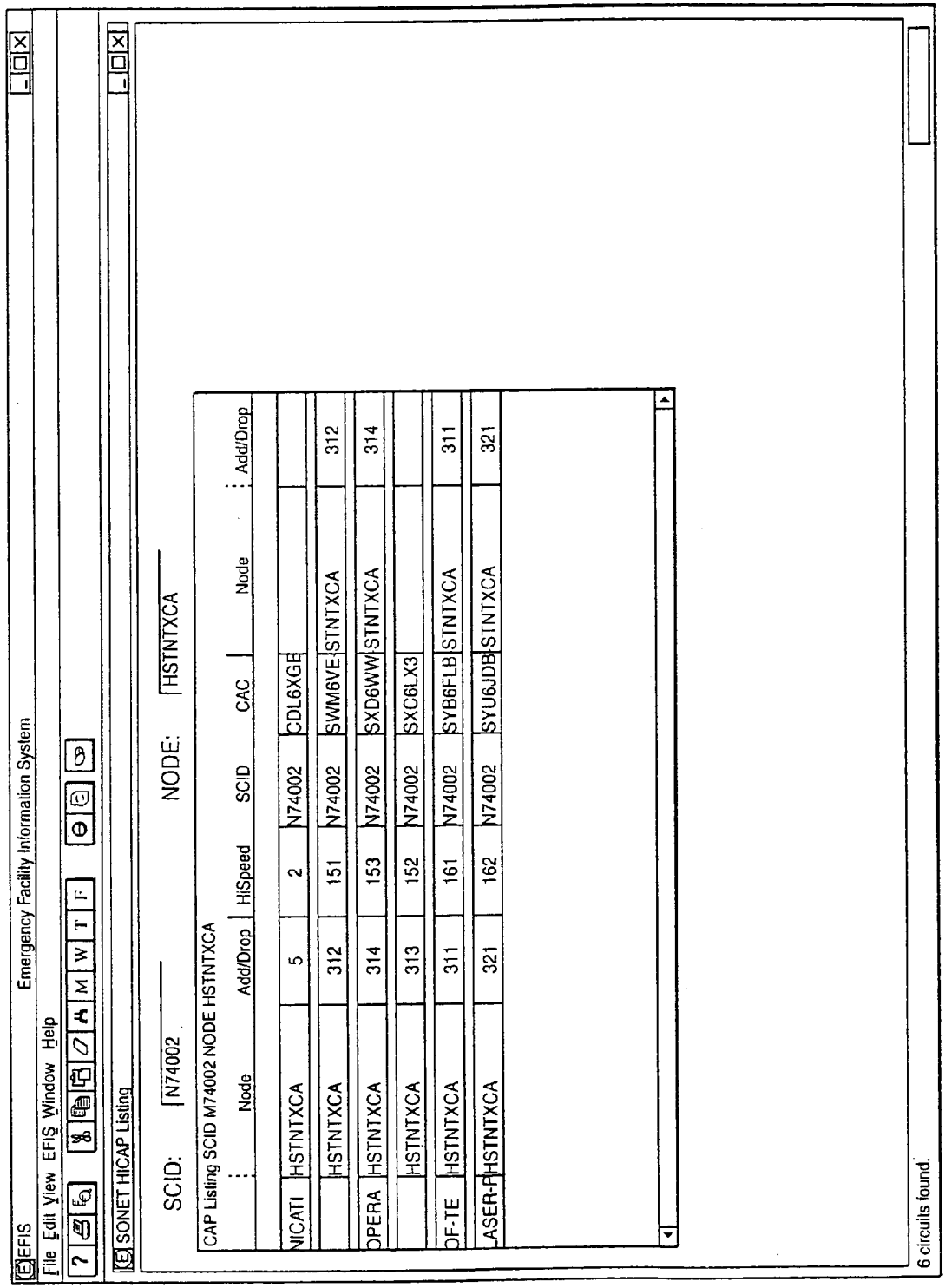
FIG. 35 shows a HICAP Listing report display according to the present invention.

If the user selects the HICAP Listing report option, a display, as shown in FIG. 35, results which shows the high capacity circuits associated with the selected node on the SCID. This display will show information that includes circuit ID, customer name, slot number, A and/or Z locations (points of entry and exit from SCID), SCID, and CAC.

Figure 36:
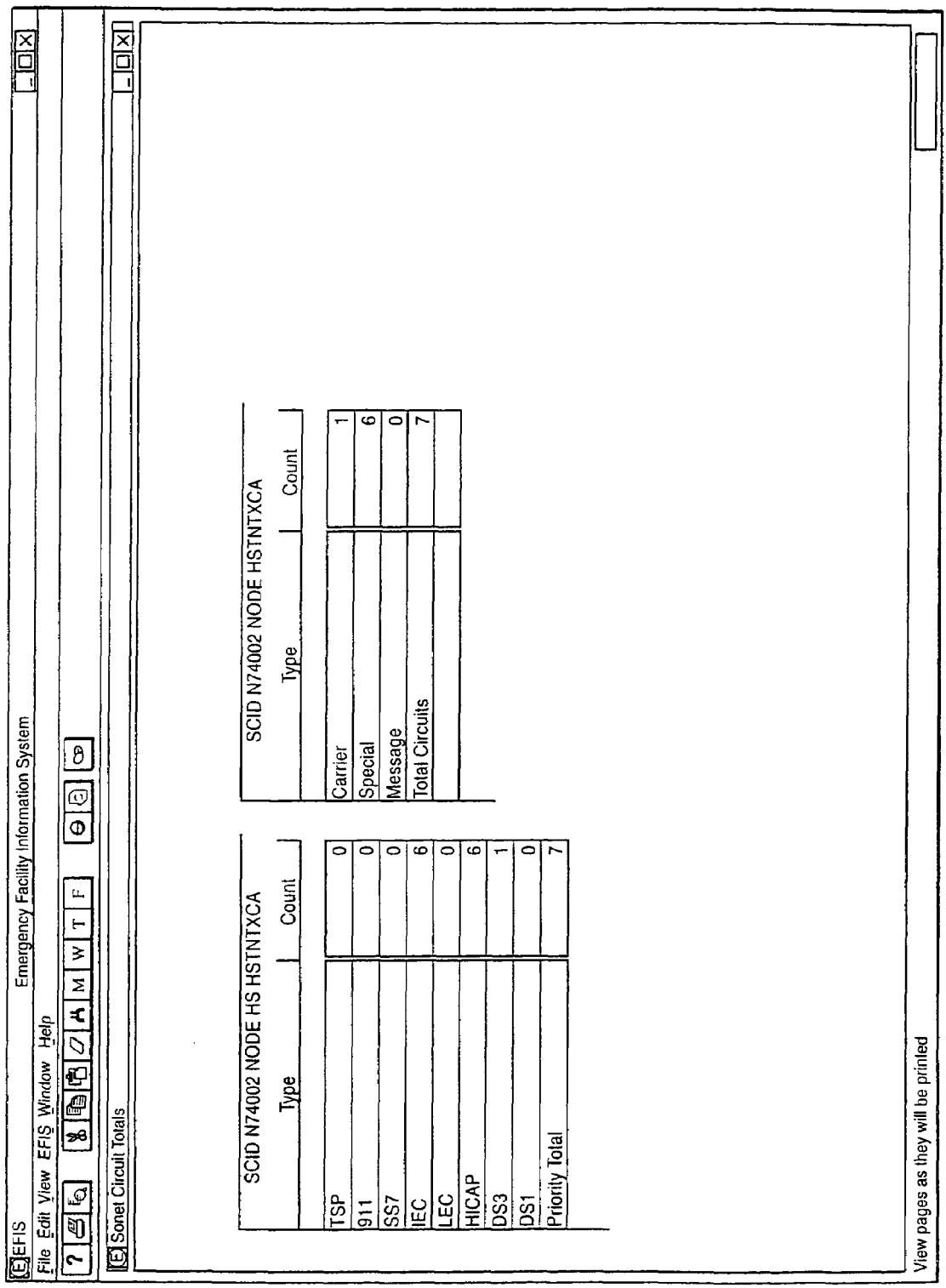
FIG. 36 shows a Circuit Totals report display according to the present invention.

Selection of the Circuit Totals report option, results in the display shown in FIG. 36, which shows the count of priority circuits associated with the selected node or SCID, as well as the count by type of Carrier, Special and Message circuits on the SCID. These counts include all levels of circuits associated with the carrier circuit hierarchy. The resulting screen displays information related to TSP totals, 911 totals, SS7 totals, IEC totals, LEC totals, DS3; totals, DS1 totals, carrier circuit totals, message circuit totals, and special circuit totals.

Figure 37:
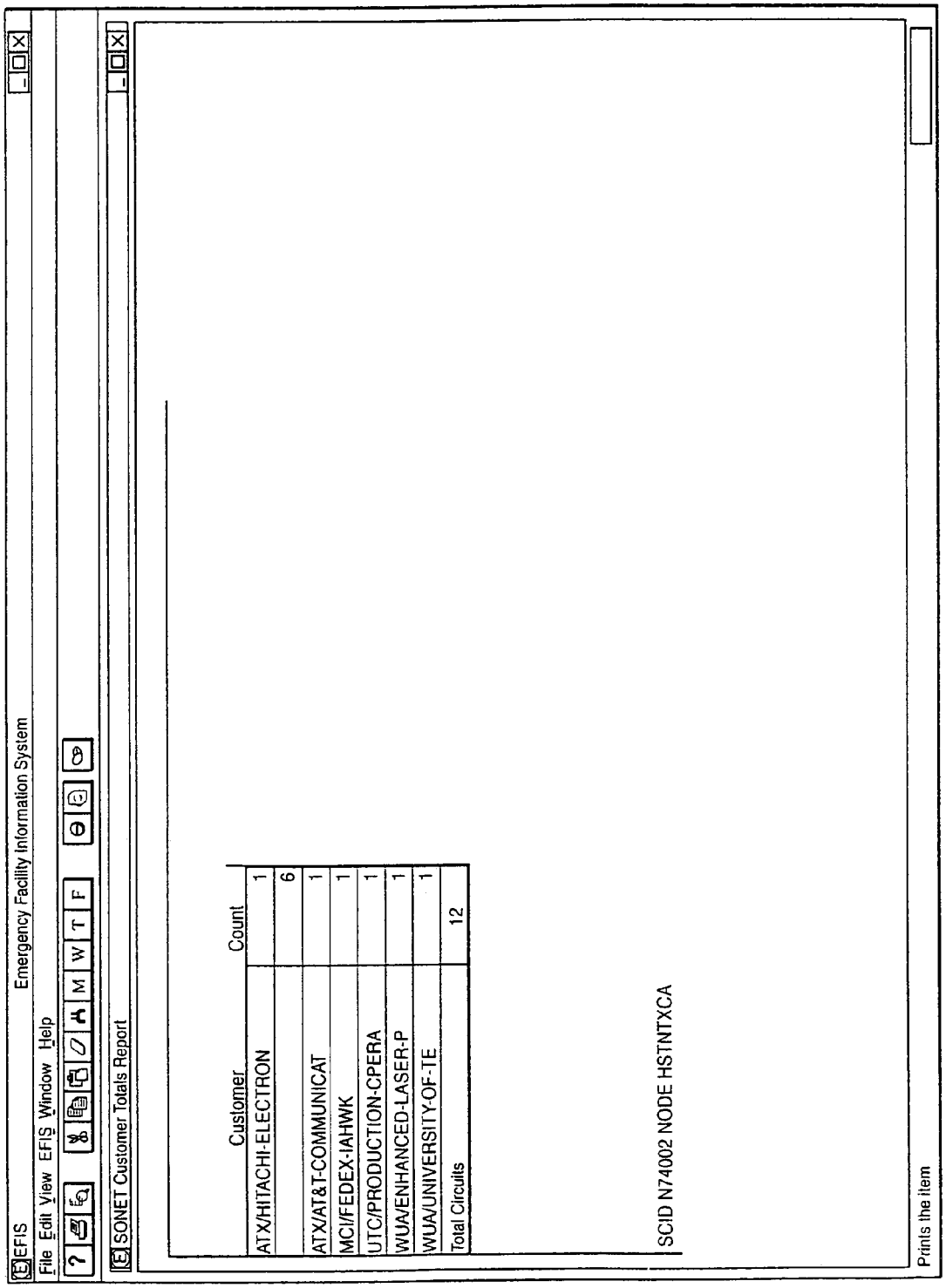
FIG. 37 shows a display with results listing counts for all circuits associated with a customer name according to the present invention.

If the user selects the Customer Totals report button, a new screen appears, as shown in FIG. 37, which shows a listing of counts for all circuits associated with a particular customer name. This includes all sub-tending circuits associated with a carrier circuit hierarchy. The screen includes information regarding customer name, and count of each customer's circuits.

Figure 38:
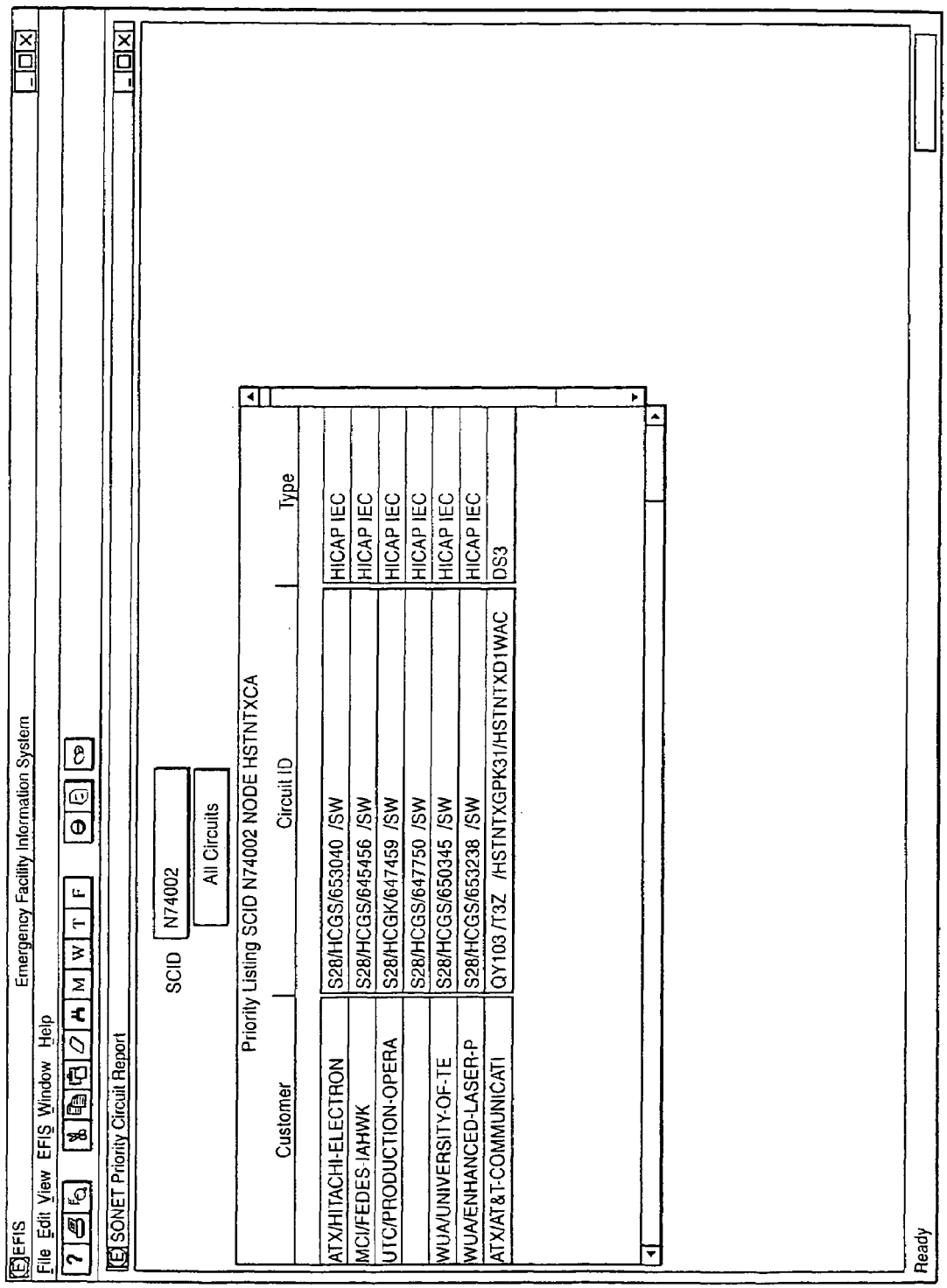
FIG. 38 shows a Priority Restoration report display according to the present invention.

Selection by the user of the Priority Restoration report button, causes the new screen shown in FIG. 38 to appear showing a listing of all priority circuits including sub-tending circuits associated with the selected node or SCID. This screen includes information regarding customer name, circuit ID, and priority classification.

Figure 39:
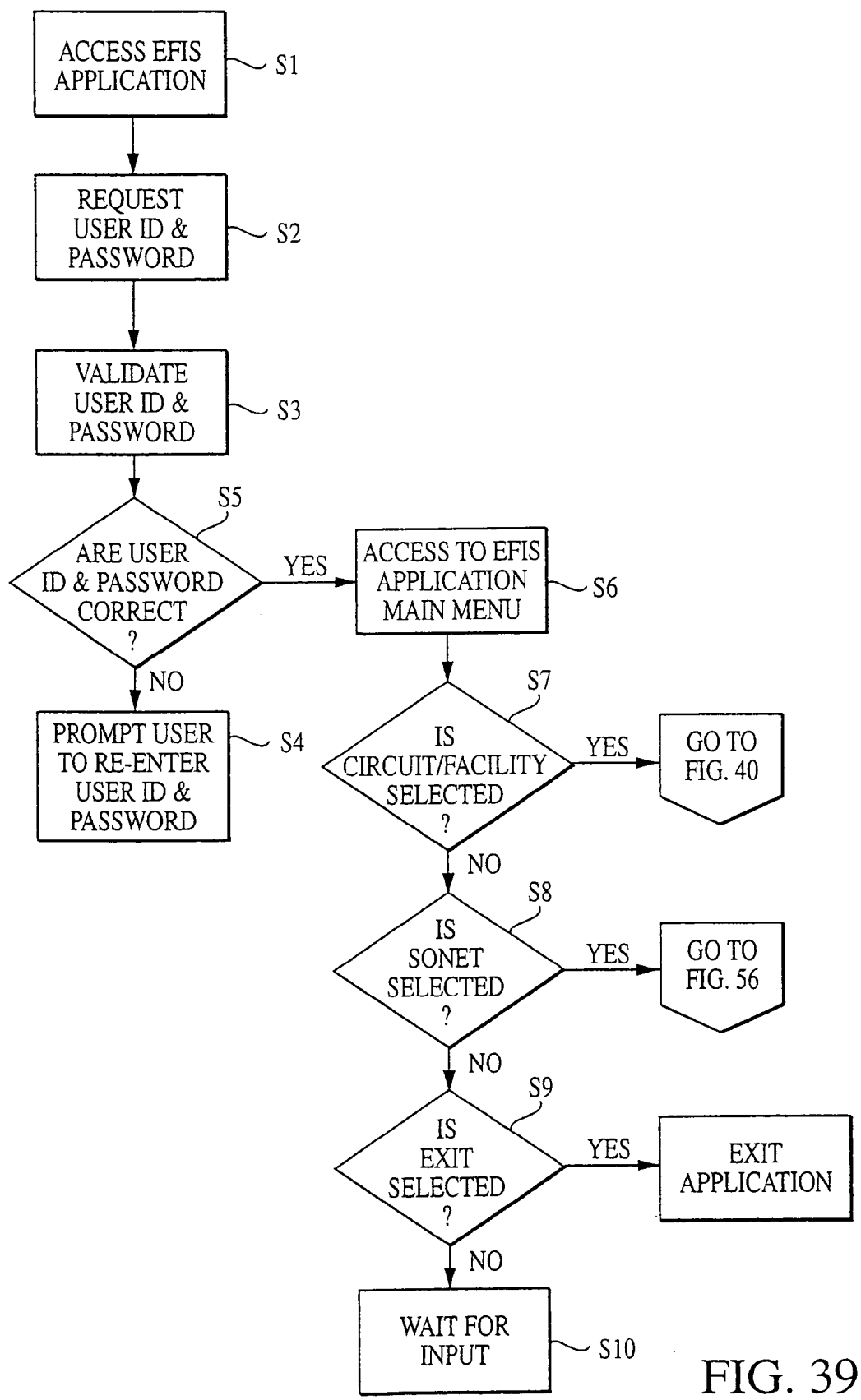
FIG. 39 is a flowchart showing the operational processing of an EFIS system for a user accessing the system according to the present invention.

FIG. 39 is a flowchart showing the functional selections made by the user during operation of the EFIS system. As noted previously, to access the EFIS system, the user must first supply a user ID and password (S2). The system will validate the user ID and password (S3), and if it is not correct, prompt the user to re-enter the user ID and Password (S5). If the user ID and password are correct, the user will be given access to the EFIS main menu (S6). On the EFIS main menu, the user will select either Circuit Facility (S7), SONET (S8), or Exit (S9). The system will wait for the user's input if no selections have been made (S10).

FIGS. 40, 45, 46, and 47 show that if the user selects Circuit Facility, the system will then check to see if the user has selected any of carrier circuit (S12), Back (S13), facility reroute (S59), back (S60), customer (S61), back (S62), cable listing (S69), and if not, the system then will go to back (S70).

Figure 40:
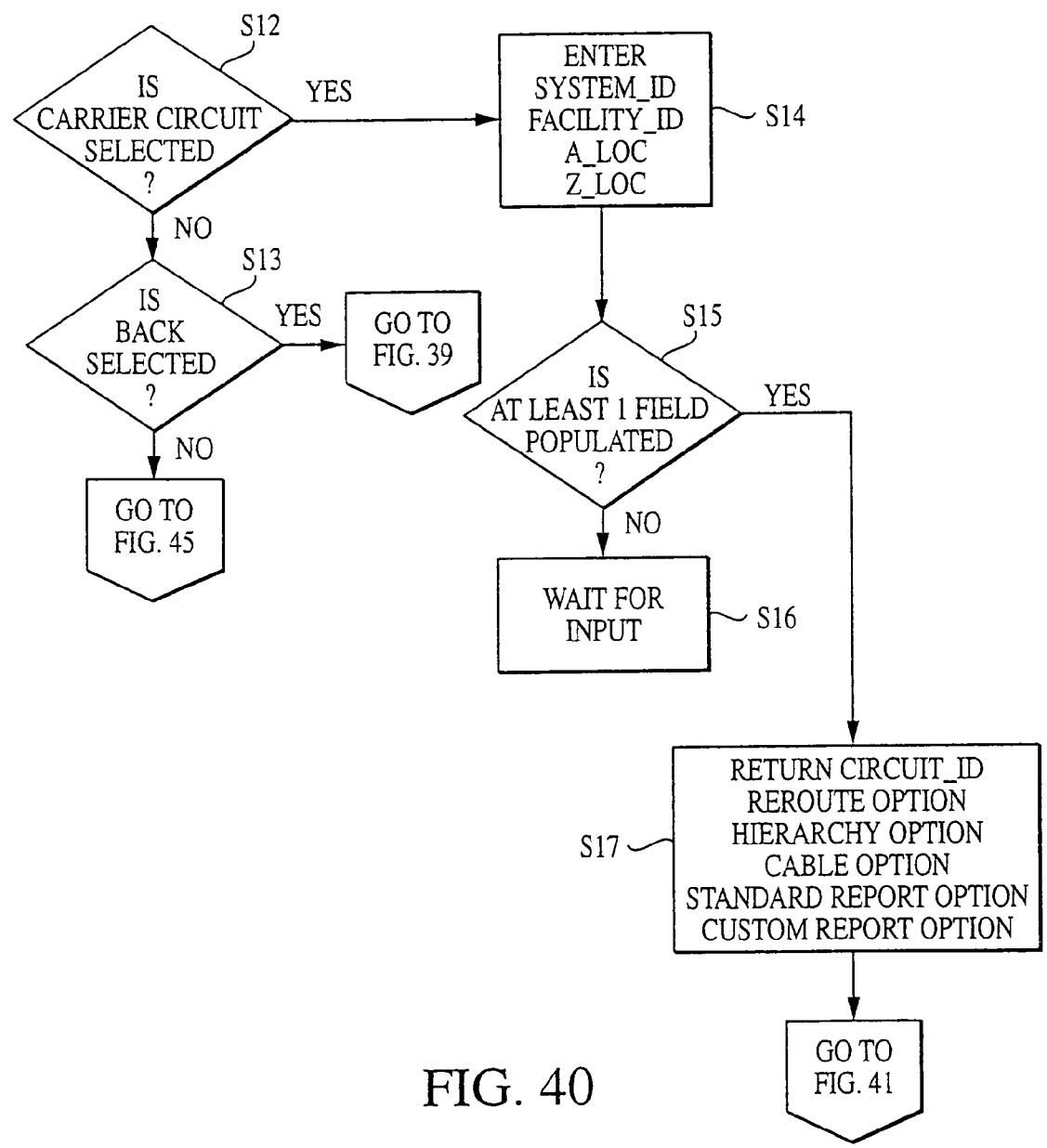
FIG. 40 is a flowchart showing the operational processing of a circuit/facility option of an EFIS system according to the present invention.

As shown in FIG. 40, if "carrier circuit" is selected (S12), the system will wait for the user to enter the system ID, facility ID, A_LOC and Z_LOC (S14). The system will verify that at least one of these has been entered (S15), and if not, the system will wait for input from the user (S16). If at least one of these has been entered, the system will then return with a screen which provides a circuit ID, reroute option, hierarchy option, cable option, standard report option and customer report option (S17).

Figure 41:
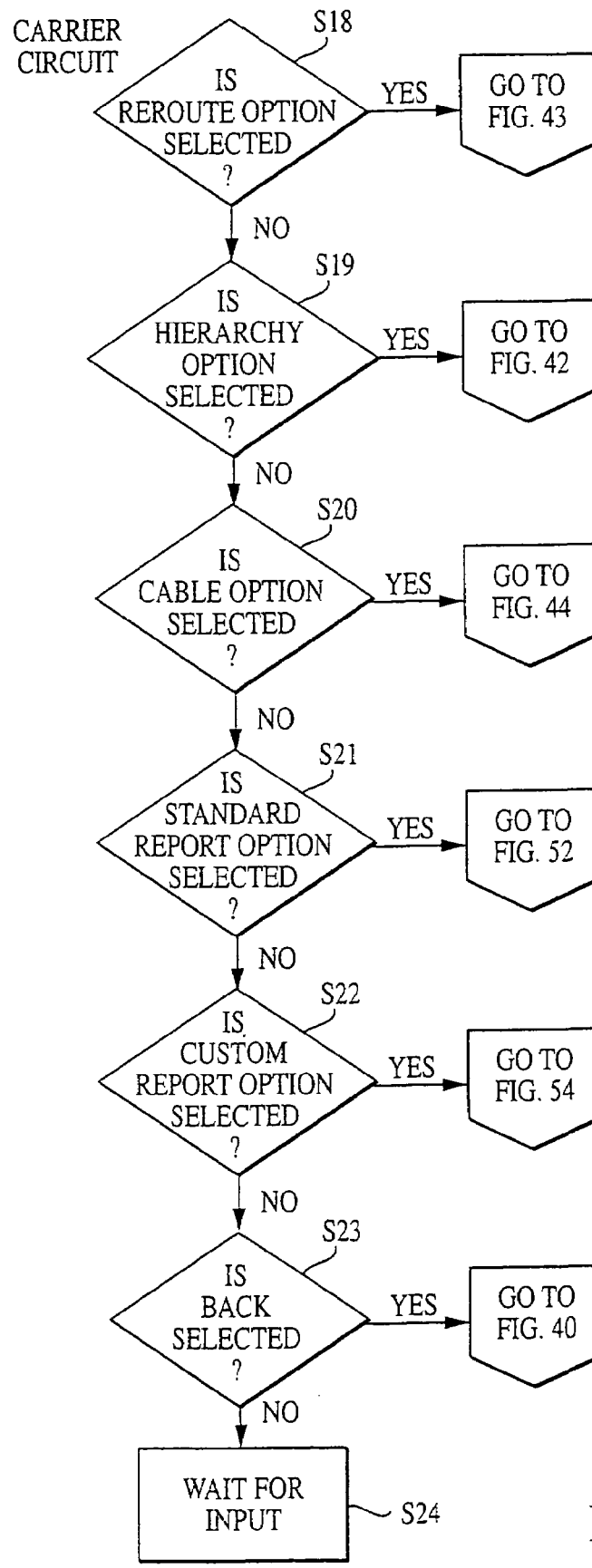
FIG. 41 is a flowchart showing the operational processing of a carrier circuit option of an EFIS system according to the present invention.
Figure 43:
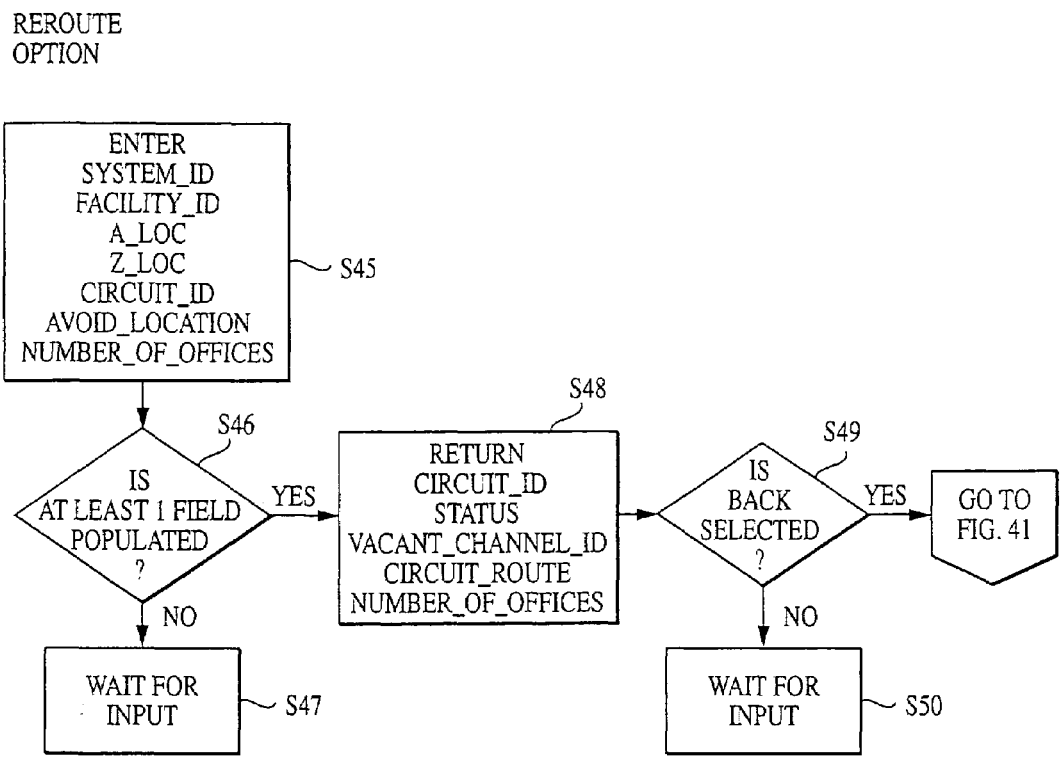
FIG. 43 is a flowchart showing the operational processing of a reroute option of an EFIS system according to the present invention.

FIGS. 41 and 43 show that if "reroute" is selected by the user (S18) a new screen will appear where the user would be allowed to enter information regarding the system ID, the facility ID, A_Loc, Z_Loc, circuit ID, avoid location, and a number of offices (S45). The system will verify that information has been entered by the user in at least one field (S46), and if not, the system will wait for input from the user (S47). If information has been entered in at least one field (S46), a new screen will be presented whereby the system presents information regarding the circuit ID, status, vacant channel ID, circuit route, and number of offices (S48). Then, if back is selected (S49), the system will go back to the previous screen, or if not, the system will wait for input from the user (S50).

Figure 42:
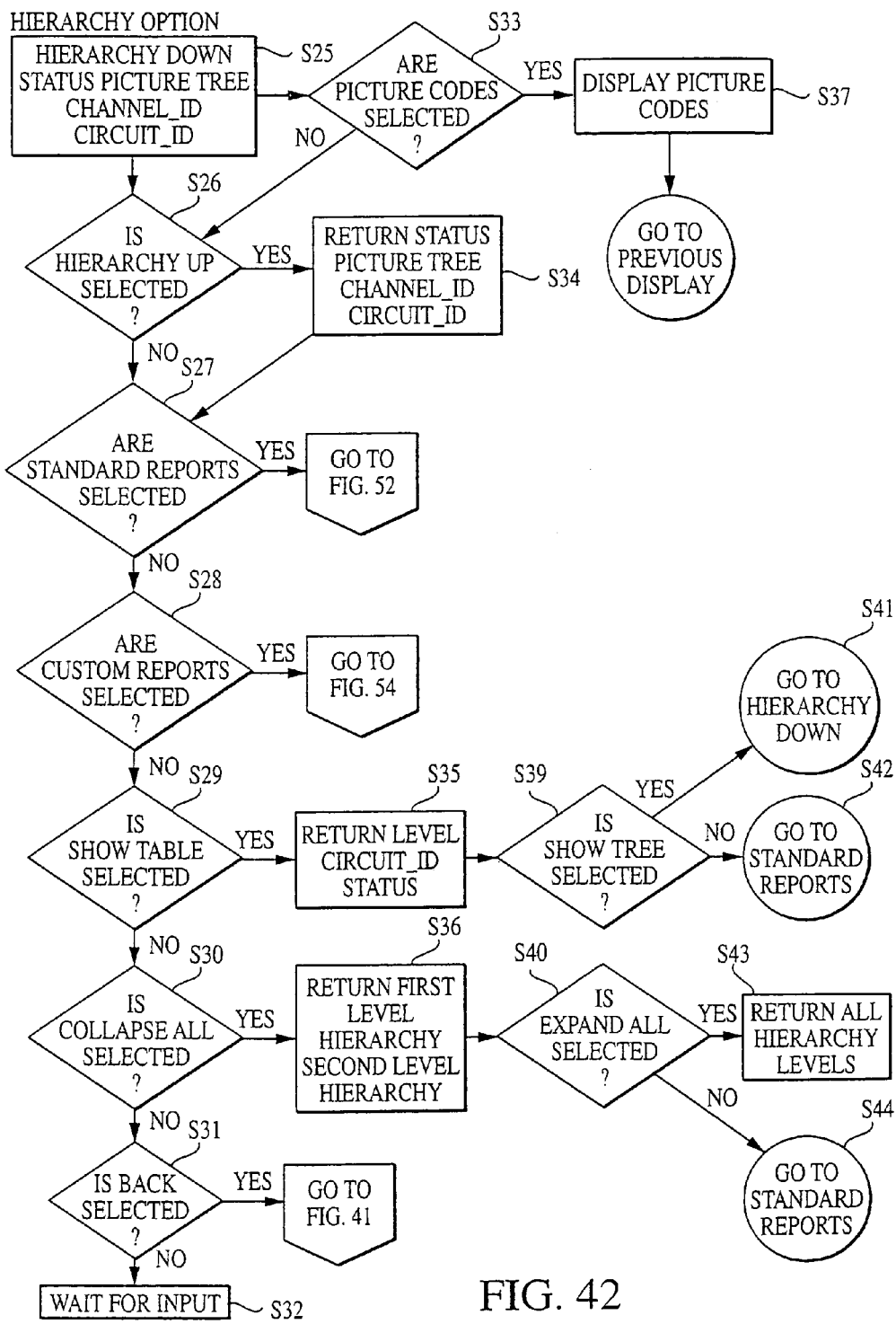
FIG. 42 is a flowchart showing the operational processing of a hierarchy option of an EFIS system according to the present invention.

FIGS. 41 and 42 show that if the hierarchy option is selected from the carrier circuit menu (S19), then the system presents another screen which shows the hierarchy down which consist of a status picture, tree, channel ID, and circuit ID (S25). The system then determines if picture codes are selected (S33) and, if so, it displays picture codes (S37), and then goes to back (S38). If not, the system determines if hierarchy up is selected (S26). If so, the system presents information regarding status, picture tree, channel ID, and circuit ID (S34). If hierarchy up is not selected, the system checks to see if the user has selected standard reports (S27), custom reports (S28), show table (S29), collapse all (S30), or back (S31), and if not, the system waits for user input (S32).

Figure 52:
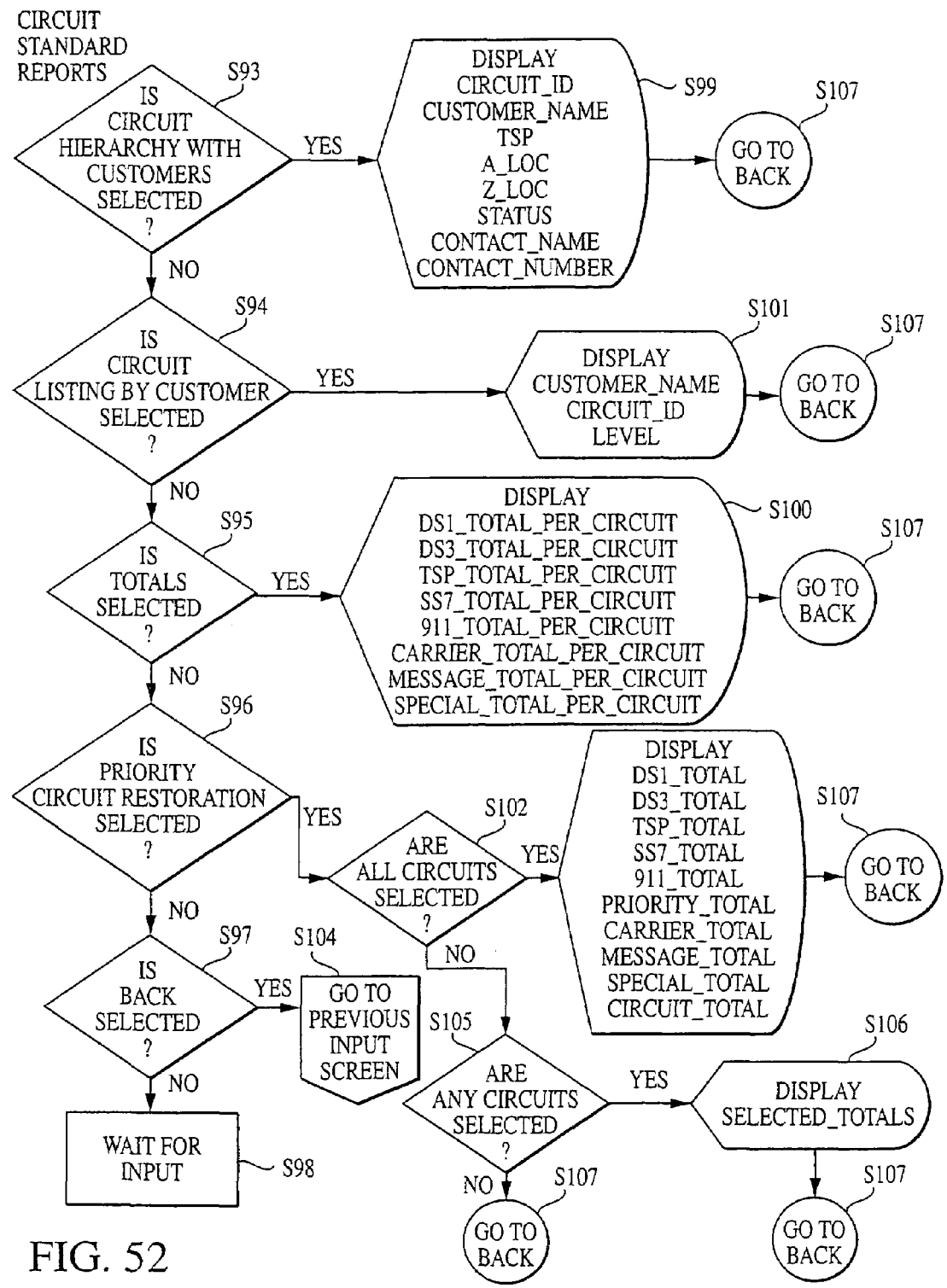
FIG. 52 is a flowchart showing the operational processing of a circuit standard reports option of an EFIS system according to the present invention.

FIGS. 42 and 52 show that if "standard reports" is selected (S27), the system checks to see if "circuit hierarchy with customers" is selected (S93), circuit listing by customers (S94), totals (S95), priority circuit restoration (S96), or back (S97) is selected and, if not, the system waits for user input (S98). If circuit hierarchy with customers is selected (S93), the system then displays information regarding circuit ID, customer name, TSP, A Loc, Z Loc, status, contact name, and contact number (S99), and then goes to back (S107).

If circuit listing by customer is selected (S94), the system displays information regarding the customer name, circuit ID, and level (S101), and then goes to back (S107).

If totals is selected by the user (S95), the customer displays information related to DS1 total per circuit, DS3 total per circuit, TSP total per circuit, SS7 total per circuit, 911 total per circuit, carrier total per circuit, message total per circuit, and special total per circuit (S100), and then goes to back (S107).

If priority circuit restoration is selected by the user (S96), the system will check to see if all circuits have been selected by the user (S102). If all circuits have not been selected by the user, the system will check to see if any circuits have been selected (S105) and if so the system will display the selected totals (S106). If the user has selected all circuits, the system will display information regarding DS1 total, DS3 total, TSP total, SS7 total, 911 total, priority total, carrier total, message total, special total, and circuit total (S103), and then go to back (S107).

If back (S97) is selected by the user, the system will display the previous input page (S104).

Figure 54:
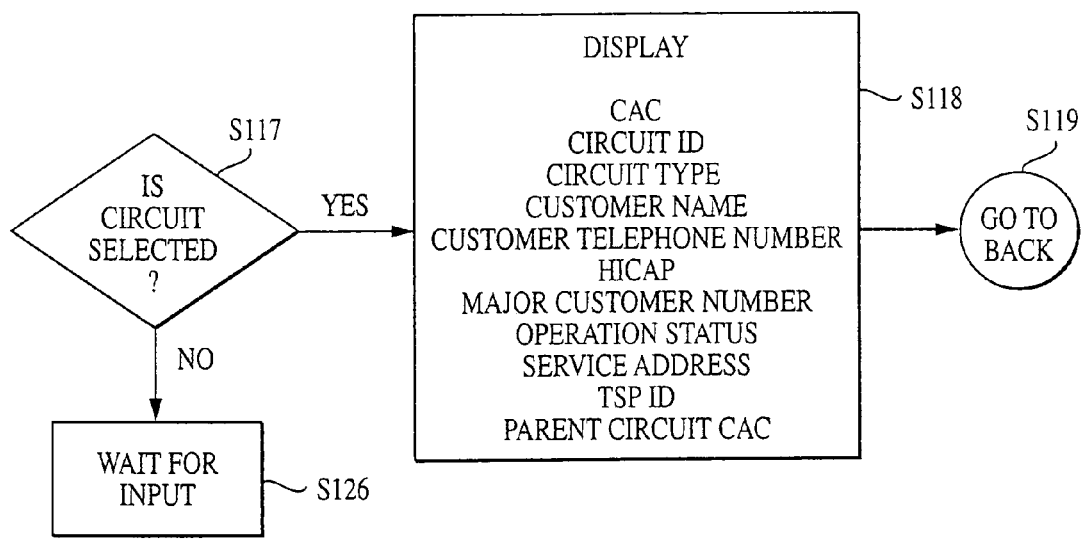
FIG. 54 is a flowchart showing the operational processing of a custom reports option of an EFIS system according to the present invention.

As shown in FIGS. 42 and 54 if customs reports is selected (S28) from the hierarchy option, the system will check to see if circuit is selected by the user (S117). If circuit has been selected by the user, the system displays information regarding CAC, circuit ID, circuit type, customer name, customer telephone number, HICAP, major customer number, operation status, service address, TSP ID, and parent circuit CAC (S118), and then goes to back (S119).

As shown in FIG. 42, if show table is selected by the user (S29) under the hierarchy option, the system will display the level, circuit ID, and status (S35). The system will then check to see if show tree has been selected (S39). If show tree has been selected, the system will go to step S25 (hierarchy down), which was previously discussed. If show tree was not selected, the system will go to standard reports (S27) discussed previously.

If collapse is selected (S30) under the hierarchy option, the system will return the first level hierarchy, and the second level hierarchy (S36). The system will then check to see if expand all has been selected by the user (S40). If expand all has been selected, the system will return all hierarchy levels (S43). If expand all has not been selected, then the system will go to step S27.

Figure 44:
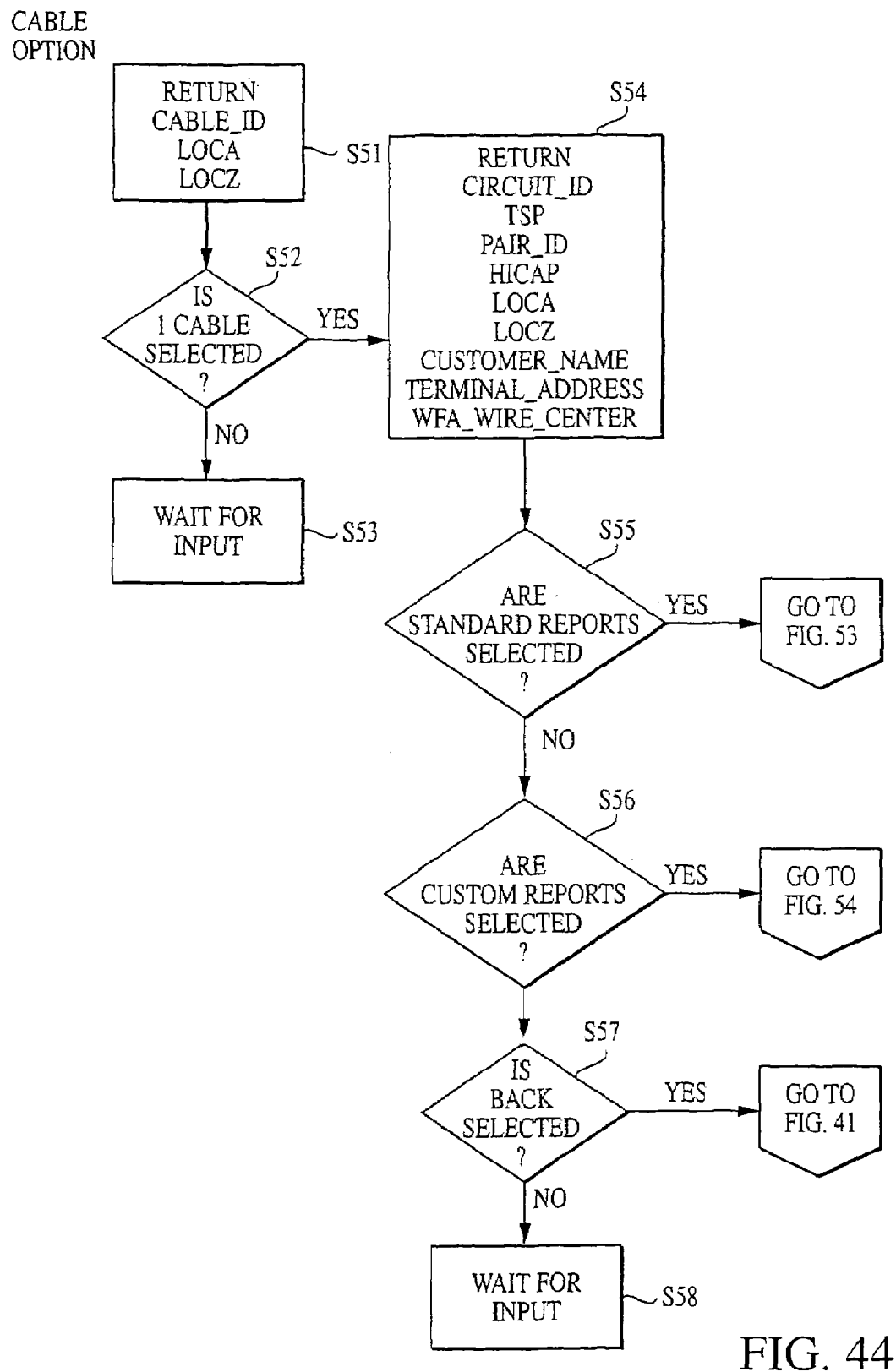
FIG. 44 is a flowchart showing the operational processing of a cable option of an EFIS system according to the present invention.

As shown in FIGS. 41 and 44, if cable option (S20) is selected under the carrier circuit menu, the system will return the cable ID, LOC A, and LOC Z (S51). The system will then check to see if cable is selected (S52). If cable is not selected, the system will wait for input from the user (S53). If cable is selected, the system will return circuit ID, TSP, pair ID, HICAP, LOCA, LOCZ, customer name, terminal address, and WFA Wire Center (S54). The system will then check to see if standard reports has been selected by the user (S55). If not, the user will check to see if custom reports (S56) or back (S57) have been selected, and if not, the system will wait for input from the user (S58).

Figure 53:
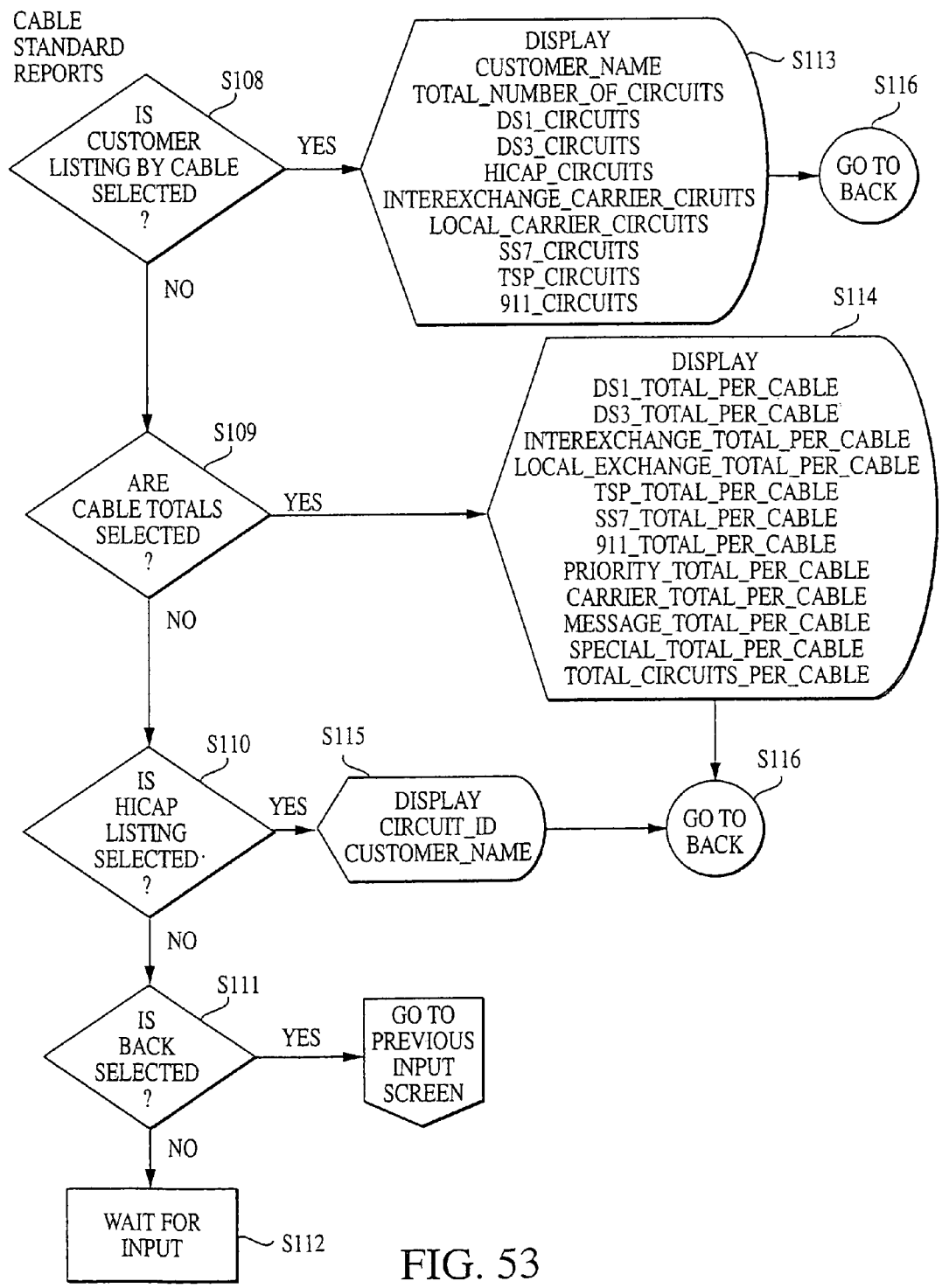
FIG. 53 is a flowchart showing the operational processing of a cable standard reports option of an EFIS system according to the present invention.

FIGS. 44 and 53 show that if standard reports under the cable option has been selected, the system will then check to see if customer listing by cable (S108), cable totals (S109), HICAP listing (S110), or back (S111) has been selected. If none of these have been selected, the system will wait for input from the user (S112).

If customer listing by cable has been selected, the system will display the customer name, total number of circuits, DS1 circuits, DS3 circuits, HICAP circuits, interexchange carrier circuits, local carrier circuits, SS7 circuits, TSP circuits, and 911 circuits (S113).

If cable totals has been selected by the user, the system will display DS1 total per cable, DS3 total per cable, interexchange total per cable, local exchange total per cable, TSP total per cable, SS7 total per cable, 911 total per cable, priority total per cable, carrier total per cable, message total per cable, special total per cable, and total circuits per cable (S114).

If HICAP listing has been selected by the user, the system will display the circuit ID and the customer name (S115). If back is selected, the system will show the previous screen.

Figure 55:
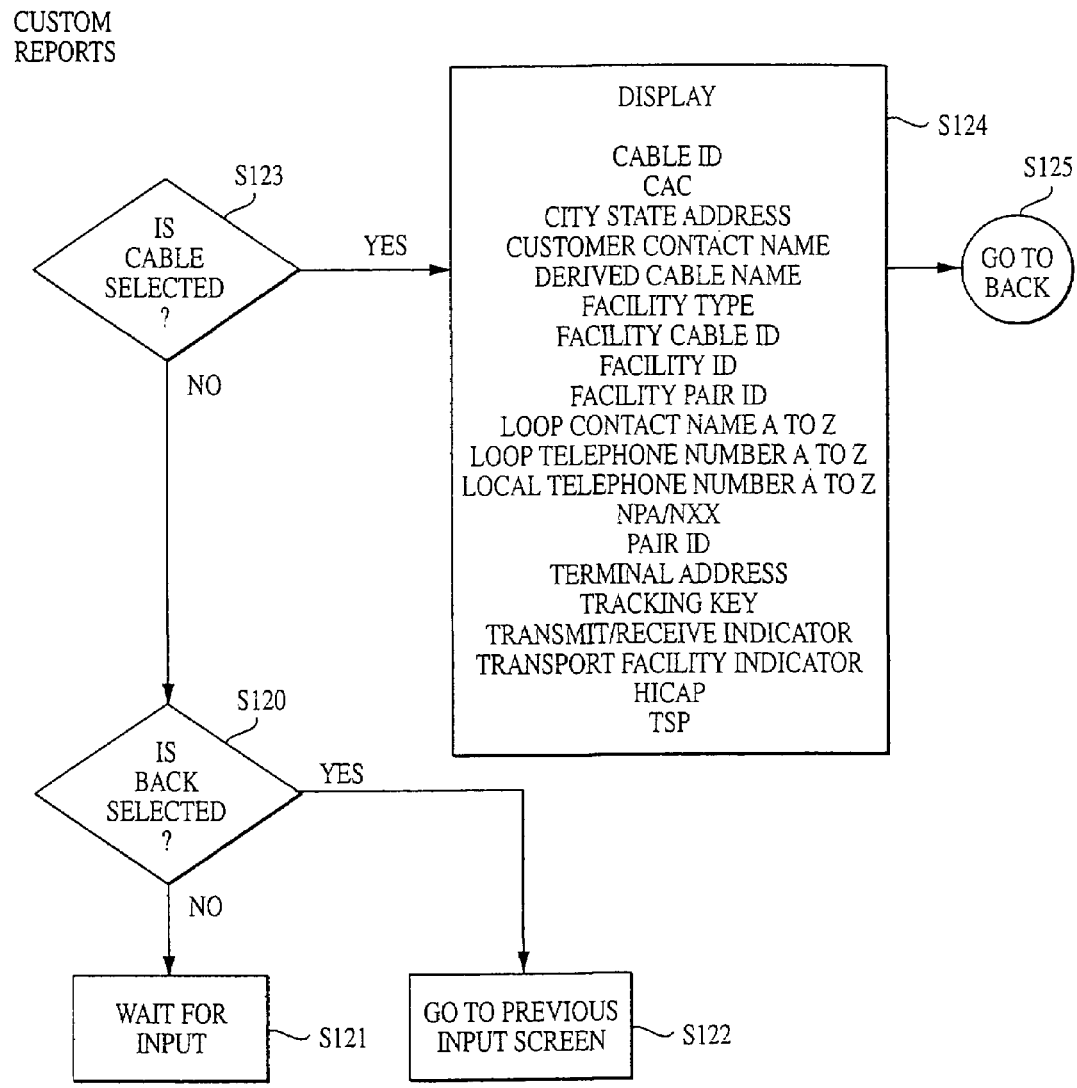
FIG. 55 is a flowchart showing further operational processing of a custom reports option of an EFIS system according to the present invention.

As shown in FIGS. 44 and 55, if custom reports (S56) under the cable option has been selected by the user, the system will then check to see if cable has been selected (S123). If cable is selected, the system will display information related to cable ID, CAC, city state address, customer contact name, derived cable name, facility type, facility cable ID, facility ID, facility pair ID, loop contact name A to Z, loop telephone number A to Z, local telephone number A to Z, pair ID, terminal address, tracking key, transmit/receive indicator, transport facility indicator, HICAP, and TSP (S124).

If back is selected (S57) under the cable option menu, the system will display the previous menu.

FIGS. 41 and 52 show that if standard report option (S21) under carrier circuit menu has been selected by the user, the system will check to see if circuit hierarchy with customers (S93) has been selected and proceed as discussed previously under the circuit standard reports menu.

FIGS. 41 and 54 show that if custom report option (S22) has been selected under the carrier circuit menu, the system will check to see if circuit has been selected (S117) and proceed as discussed previously under custom reports. If back is selected (S23) under the carrier circuit menu, the system will display the previous screen.

Figure 45:
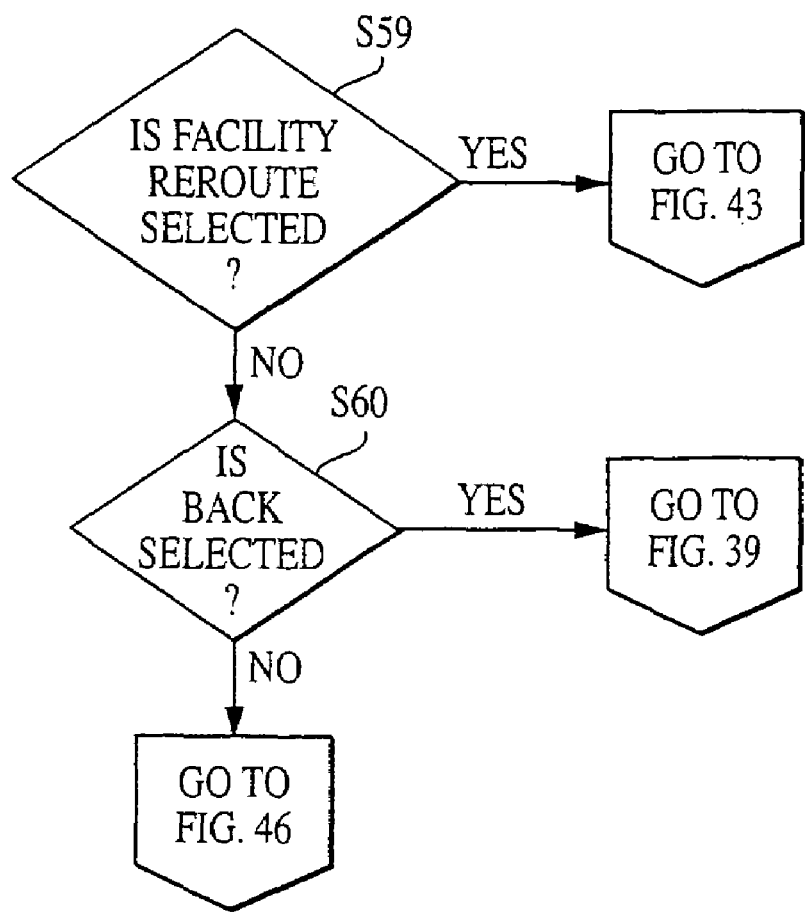
FIG. 45 is a flowchart showing further operational processing of a circuit/facility option of an EFIS system according to the present invention.

FIGS. 40, 43, and 45 show that if the carrier circuit (S12) under the circuit facility menu is not selected and back (S13) has not been selected, and facility reroute (S59) has been selected, the system will wait for the user to enter at least one of the parameters from step 45 and proceed as discussed previously under the reroute option.

Figure 46:
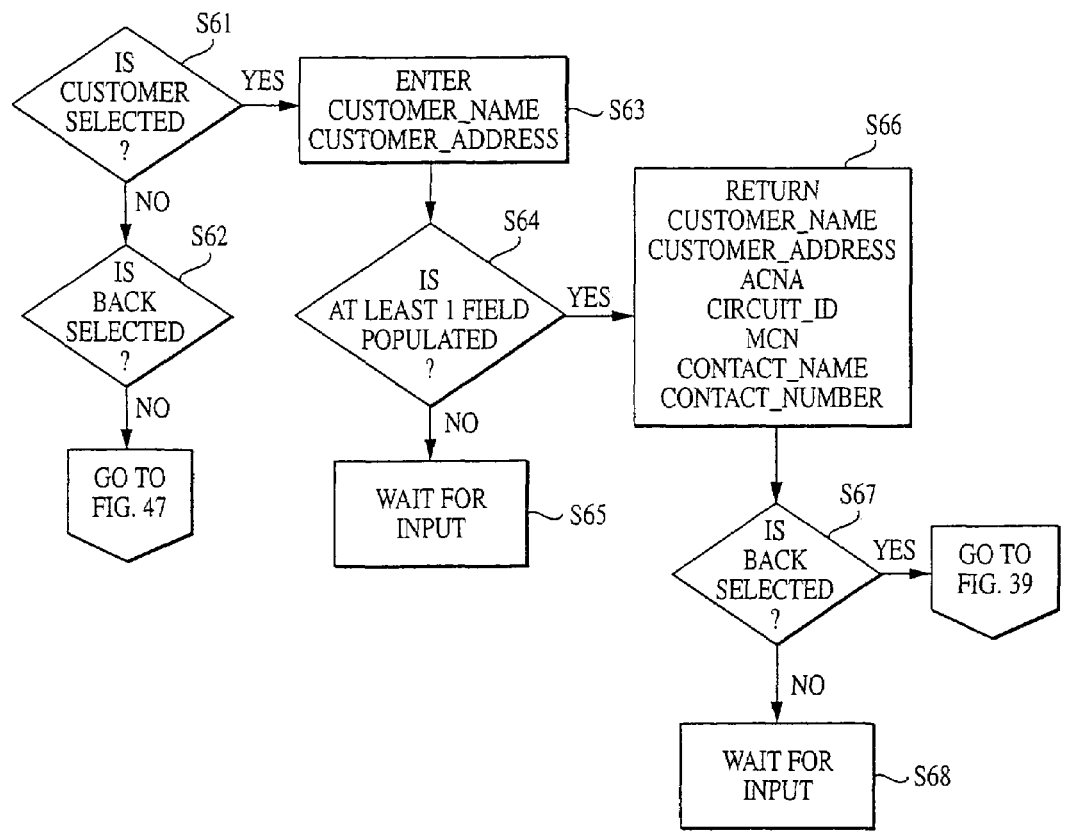
FIG. 46 is a flowchart showing further operational processing of a circuit/facility option of an EFIS system-according to the present invention.

As shown in FIG. 46, if customer is selected (S61) under the circuit facility main menu, the system will then wait for the user to enter at least one of the customer name or the customer address (S63). If one of these parameters is entered by the user (S64), the system will return a customer name, customer address, ACNA, circuit ID, MCN, contact name, and contact number (S66). The system will then check to see if back (S67) has been selected and if it has, the system will display the previous menu. If back has not been selected, the system will wait for input from the user (S68).

Figure 47:
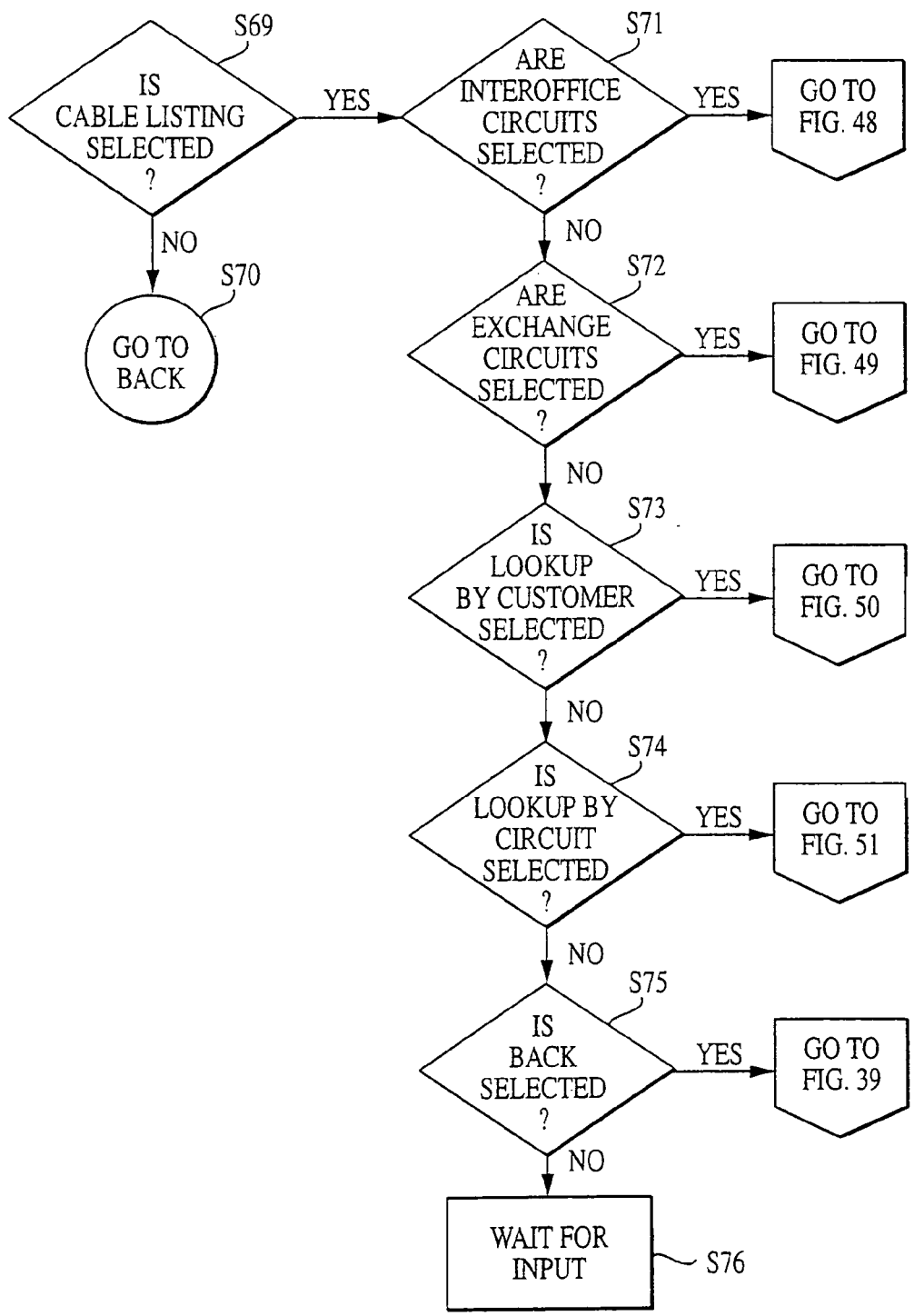
FIG. 47 is a flowchart showing further operational processing of a circuit/facility option of an EFIS system according to the present invention.

FIG. 47 shows that if cable listing (S69) has been selected by the user under the circuit/facility main menu, the system will wait (S76) for the user to select either interoffice circuits (S71), exchange circuits (S72), lookup by customer (S73), lookup by circuit selected (S74), or back (S75).

Figure 48:
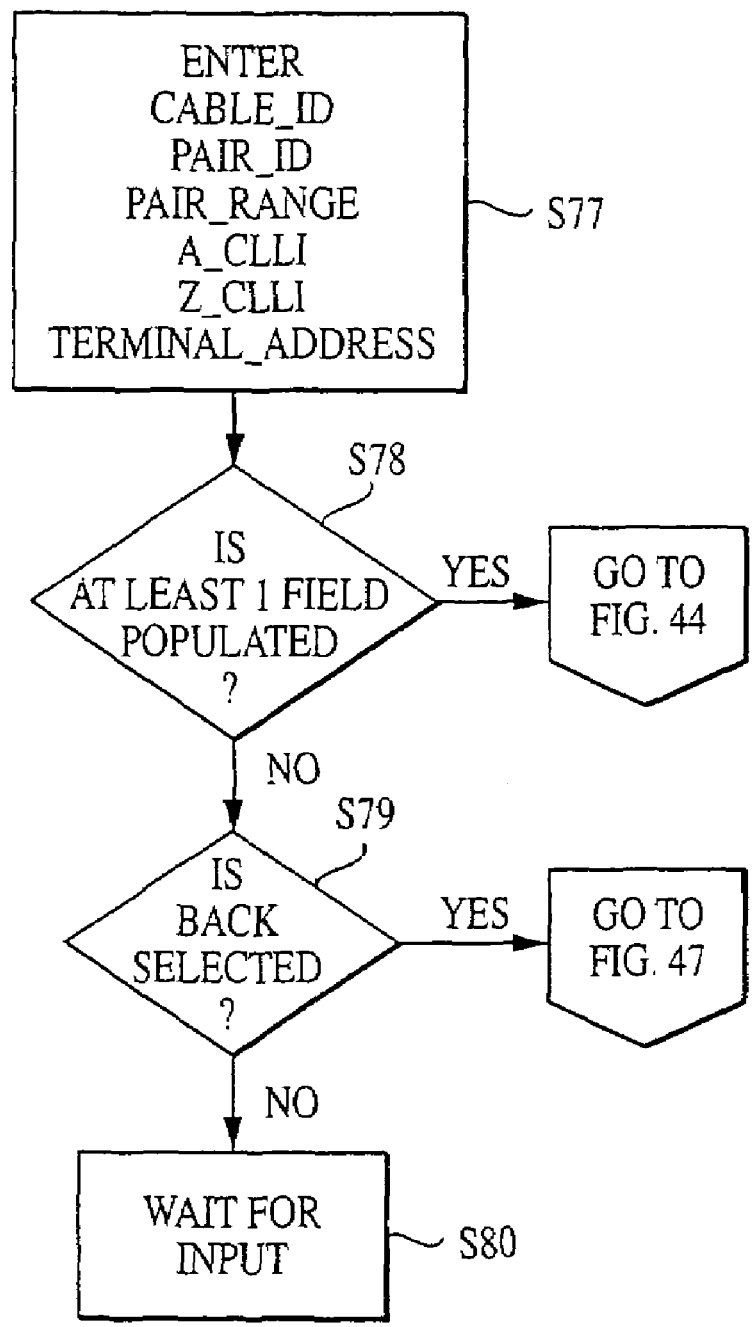
FIG. 48 is a flowchart showing the operational processing of a cable listing, interoffice circuits option of an EFIS system according to the present invention.

FIGS. 44, 47 and 48 show that if interoffice circuits (S71) has been selected, the system will provide text input fields for the user to enter cable ID, pair ID, pair range, A_CLLI, Z_CLLI, or terminal address (S77). The system will wait for input from the use (S80) unless back (S79) is selected whereby the system will display the previous menu screen. If the user has entered information in at least one of these fields (S78), the system will then return the cable ID, LOCA, and LOCZ (S51), and proceed as discussed previously under the cable option.

Figure 49:
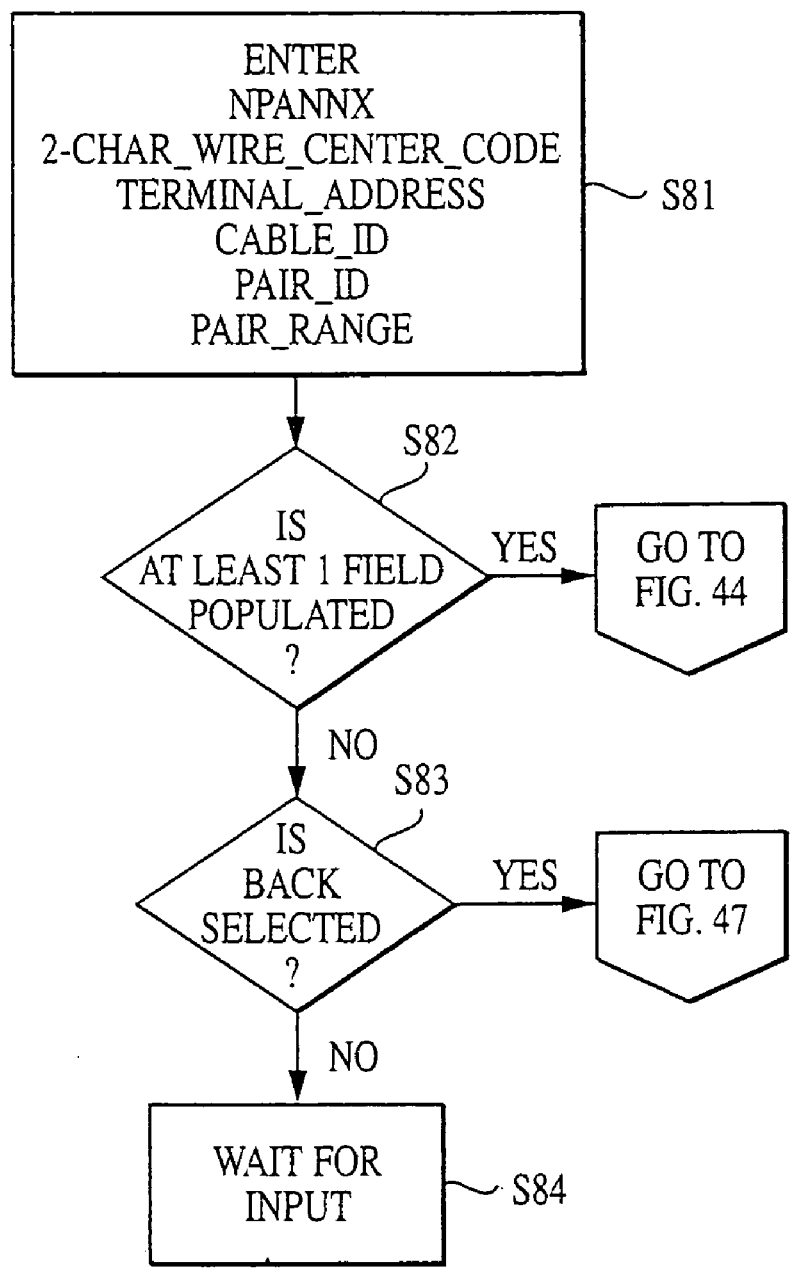
FIG. 49 is a flowchart showing the operational processing of a cable listing, exchange circuits option of an EFIS system according to the present invention.

As shown in FIG. 49, if exchange circuits (S72) has been selected, the system will provide text input boxes for the user to enter information regarding NPANNX, terminal address, cable ID, pair ID, and pair range (S81). The system will wait until the user has entered information in at least one of these fields (S84) or until the user selects back (S83) which causes the system will display the previous menu. If the user has entered information in at least one of these fields (S82), the system will return cable ID, LOCA, and LOCZ (S51), and proceed as discussed previously under the cable option.

Figure 50:
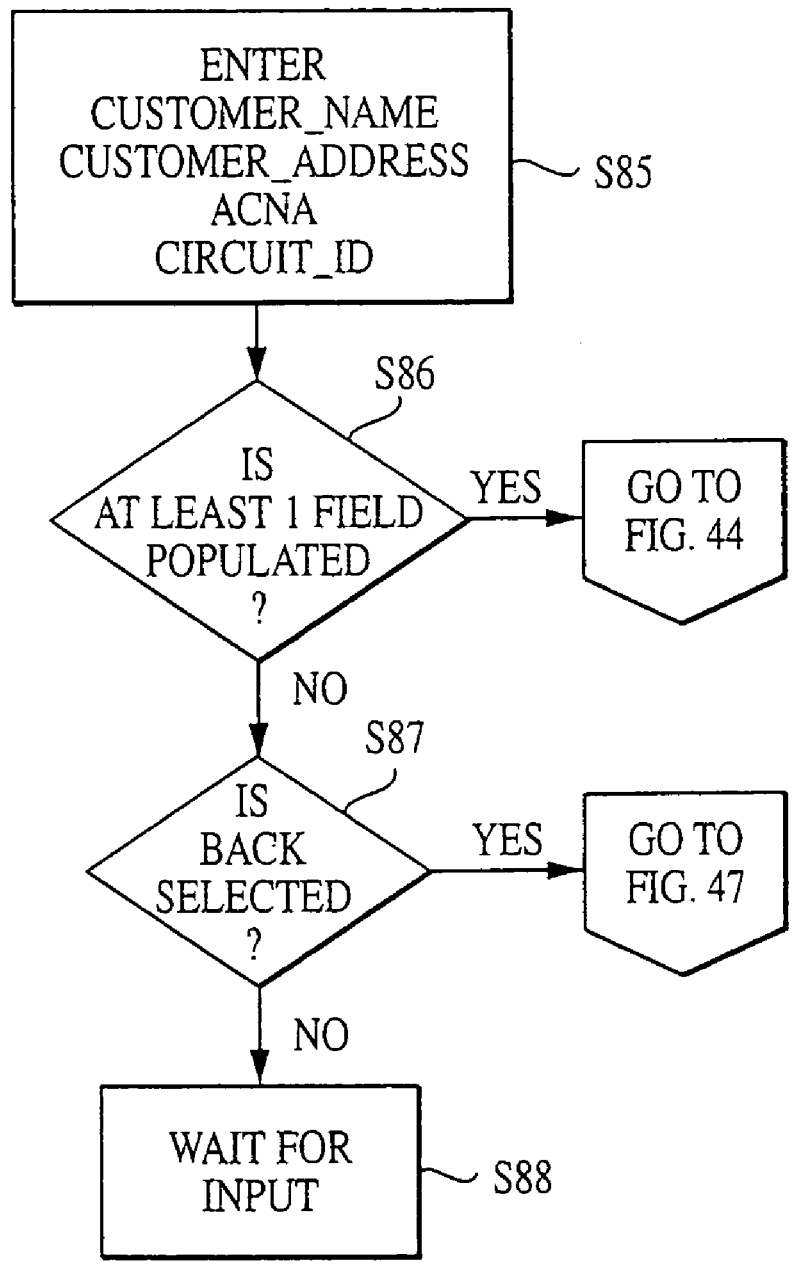
FIG. 50 is a flowchart showing the operational processing of a cable listing, lookup by customer option of an EFIS system according to the present invention.

FIGS. 47 and 50 show that if lookup by customer (S73) is selected by the user, the system will provide text input boxes for the user to enter information regarding customer name, customer address, ACNA, and circuit ID (S85). The system will wait for the user to enter information in at least one of these fields (S88) or until the user selects back (S87) which causes the system to present the previous menu screen. Once the user has entered information in one of the fields (SS6), the system will return the cable ID, LOCA and LOCZ (S51), and proceed as discussed previously under the cable option.

Figure 51:
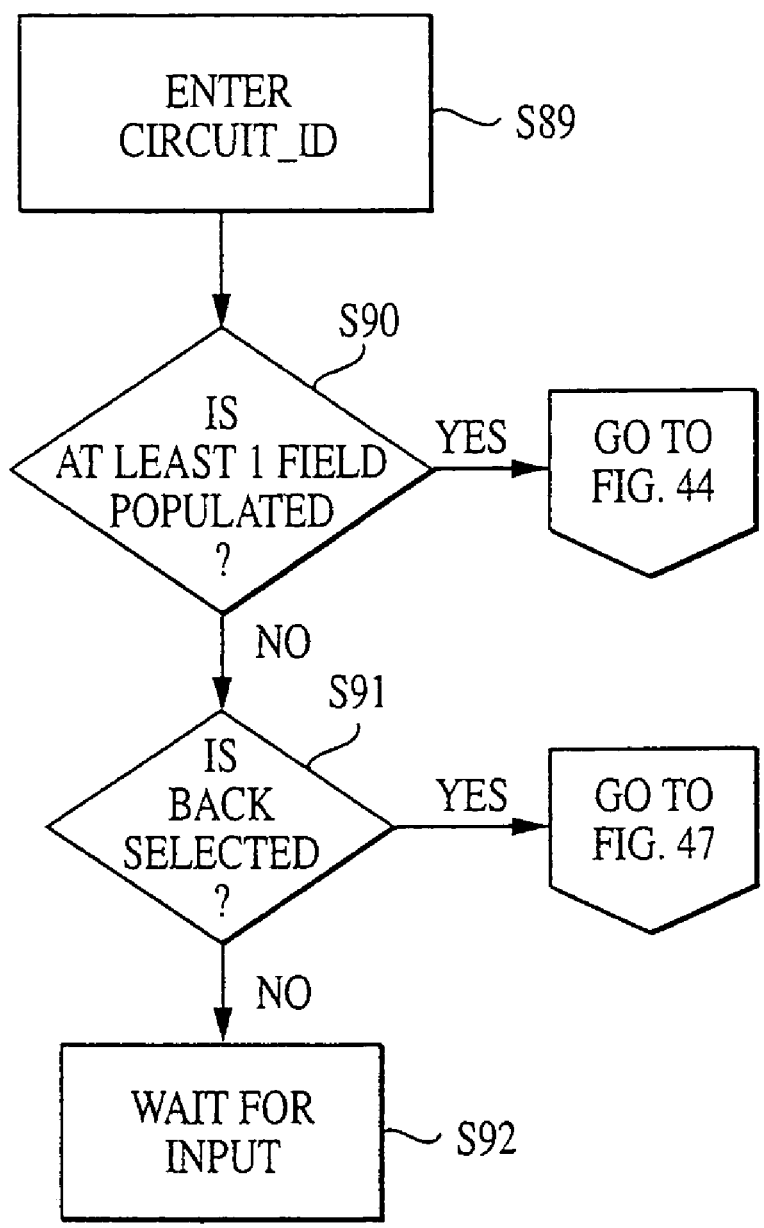
FIG. 51 is a flowchart showing the operational processing of a cable listing, lookup by circuit option of an EFIS system according to the present invention.

As shown in FIGS. 47 and 51, if lookup by circuit is selected by the user (S74), the system will provide a text input box for the user to enter the circuit ID (S89). The system will wait until the user has entered the circuit ID or selects back (S92). If the user selects back (S91), the system will display the previous menu. Once the user has entered the circuit ID, the system will return the cable ID, LOCA, and LOCZ (S44), and proceed as previously discussed under the cable option.

Figure 56:
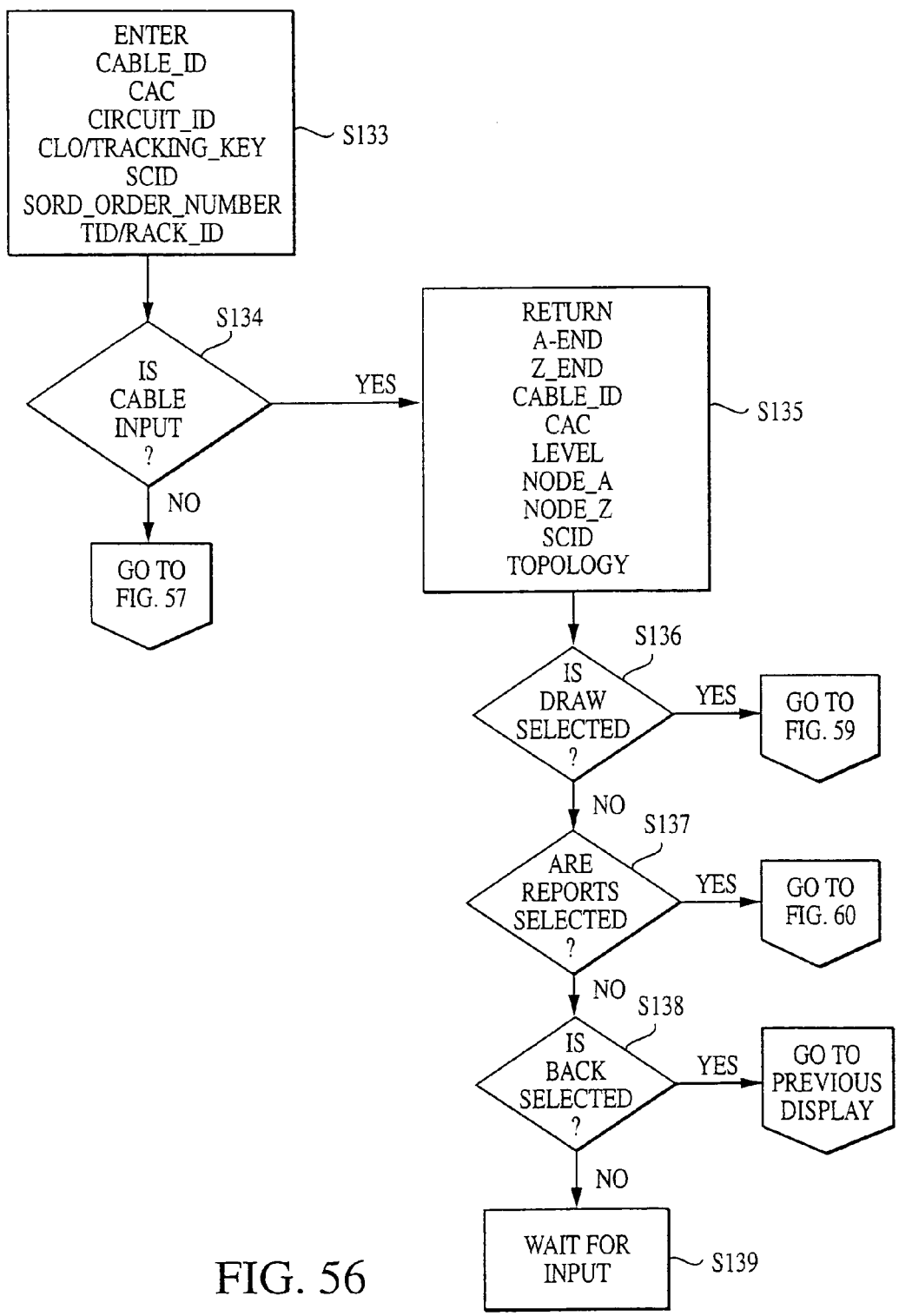
FIG. 56 is a flowchart showing the operational processing of a SONET lookup option of an EFIS system according to the present invention.
Figure 57:
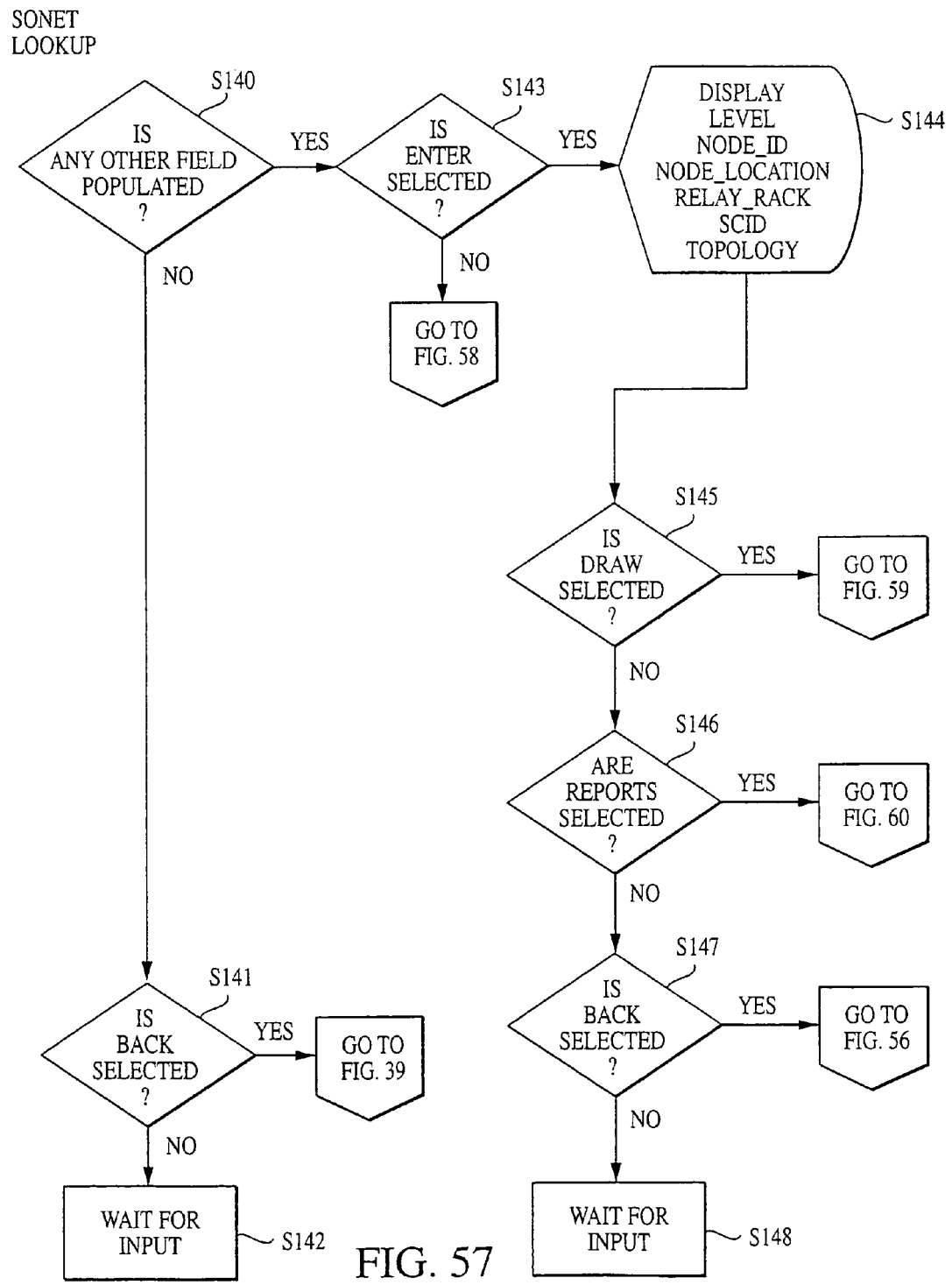
FIG. 57 is a flowchart showing further operational processing of a SONET lookup option of an EFIS system according to the present invention.

FIGS. 39, 56, and 57 show that if SONET (S8) is selected by the user from the EFIS main menu, the system will present a screen with text input boxes for the user to enter information regarding cable ID, CAC, circuit ID, CLO/tracking key, SCID, SORD order number, and TID/rack ID (S133). The system will then check to see if cable is input (S134) and, if not, will check to see if any other field is populated (S140). If no fields are populated, the system will wait for input from the user (S142). If back is selected (S141), the system will display the EFIS main menu.

Figure 59:
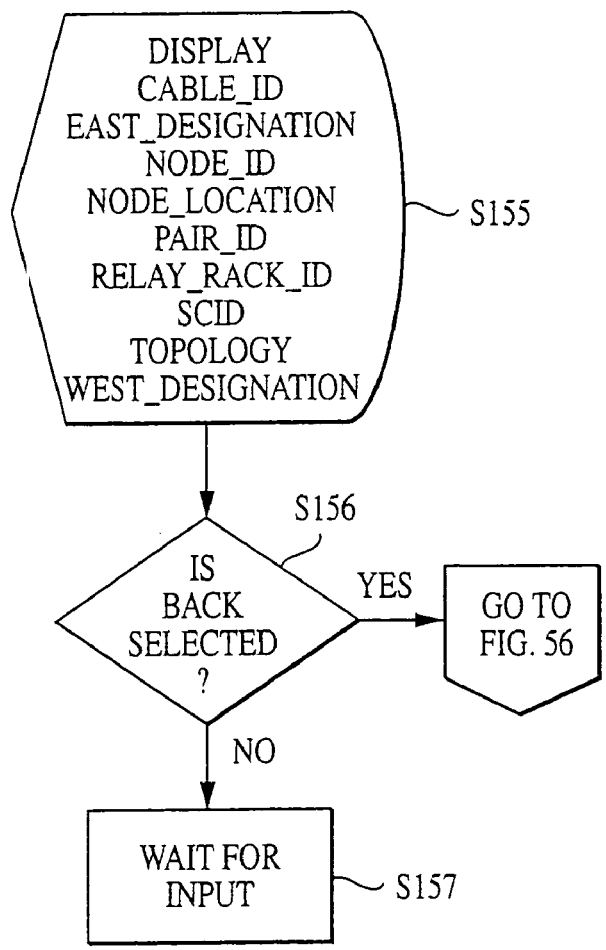
FIG. 59 is a flowchart showing the operational processing of a SONET drawing option of an EFIS system according to the present invention.
Figure 60:
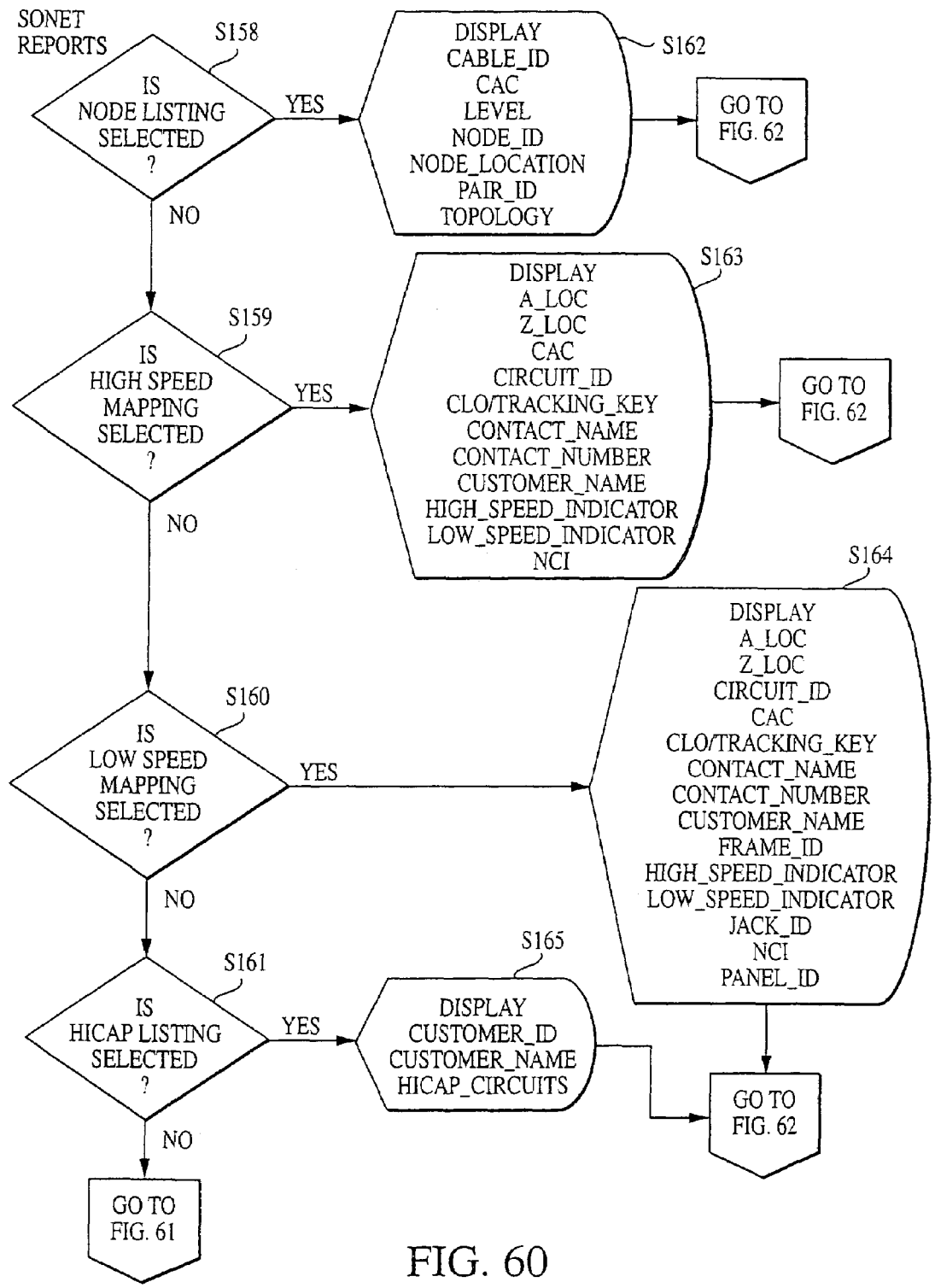
FIG. 60 is a flowchart showing the operational processing of a SONET reports option of an EFIS system according to the present invention.
Figure 61:
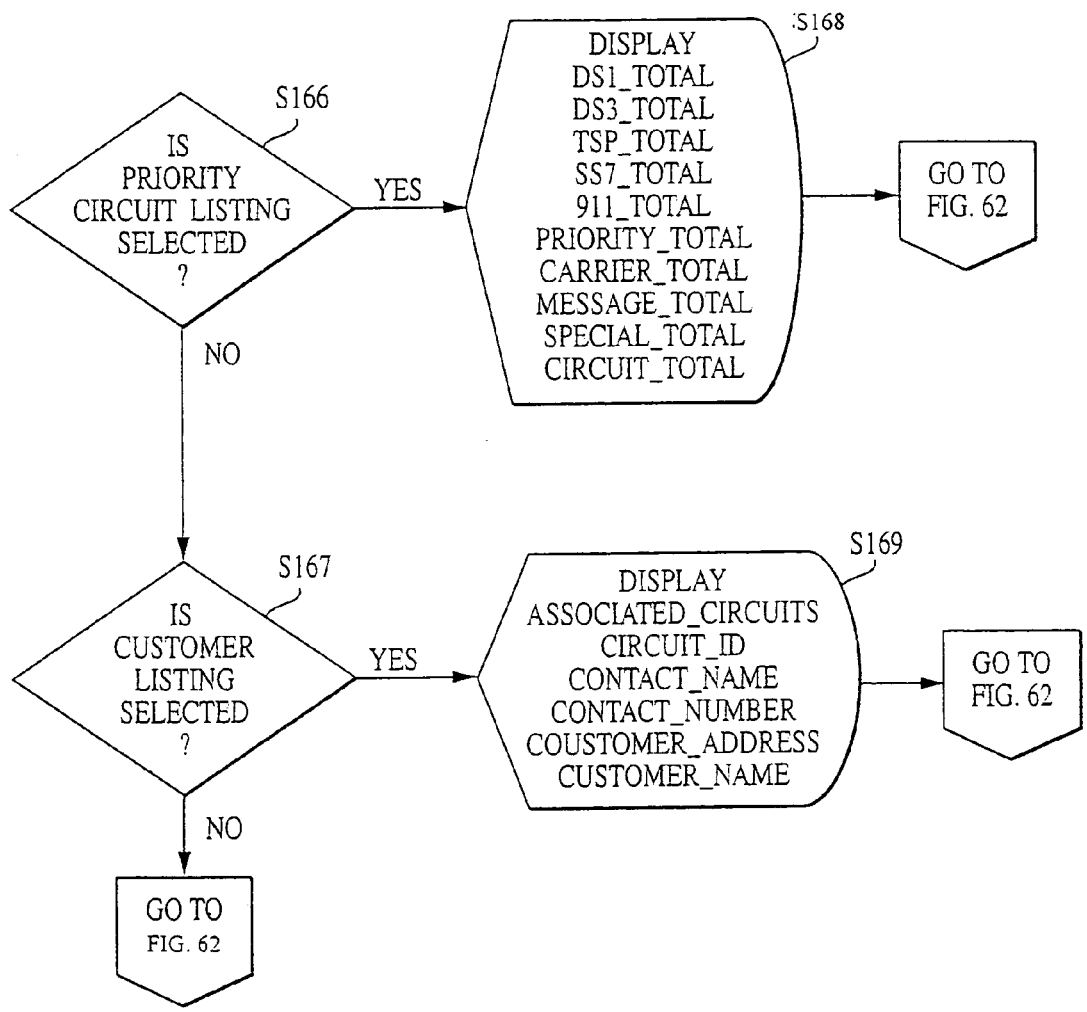
FIG. 61 is a flowchart showing further operational processing of a SONET reports option of an EFIS system according to the present invention.
Figure 62:
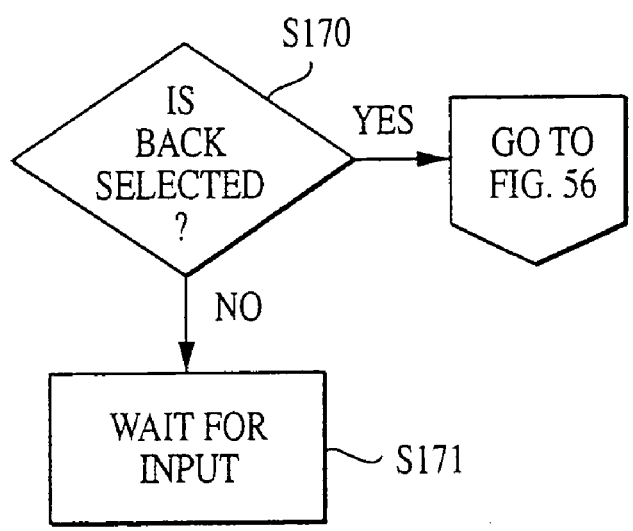
FIG. 62 is a flowchart showing further operational processing of a SONET reports option of an EFIS system according to the present invention.

As shown in FIGS. 56 and 59, if cable input is selected (S134), the system will return A end, Z end, cable ID, CAC, level, node A, node Z, SCID, and topology (S135). The system will then wait for the user to select draw, reports, or back (S139). If draw is selected by the user (S136), the system will display the cable ID, east designation, node ID, node location, pair ID, relay rack ID, SCID, topology, and west designation (S155). The system will then wait for input from the user (S157). If back is selected (S156), the system will display the previous menu screen.

As shown in FIGS. 56, 60, 61 and 62, if reports (S137) is selected by the user, the system will wait for additional input from the user. The system will wait to see if the user selects either node listing (S158), high speed mapping (S159), low speed mapping (S160), HICAP listing (S161), priority circuit listing (S166), customer listing (S167), or back (S170).

If node listing is selected (S158), the system will display the cable ID, CAC, level, node ID, node location, pair ID, and topology (S162), and then wait for user input (S171).

If high speed mapping is selected (S159), the system will display A LOC, Z LOC, CAC, circuit ID, CLO/tracking key, contact name, contact number, customer name, high speed indicator, low speed indicator, and NCI (S163). The system will then wait for additional user input (S171).

If low speed mapping is selected (S160), the system will display A LOC, Z LOC, circuit ID, CAC, CLO/tracking key, contact name, contact number, customer name, frame ID, high speed indicator, low speed indicator, jack ID, NCI, and panel ID (S164). The system will then wait for additional user input (S171).

If HICAP is selected (S161), the system will display customer ID, customer name, and HICAP circuits (S165). The system will then wait for additional user input (S171).

If priority circuit listing is selected by the user (S166), the system will display DS1 total, DS3 total, TSP total, SS7 total, 911 total, priority total, carrier total, message total, special total, and circuit total (S168). The system will then wait for additional input from the user (S171).

If customer listing is selected by the user (S167), the system will display associated circuits, circuit ID, contact name, contact number, customer address, and customer name (S169). The system will then wait for additional input from the user (S171). If back is selected by the user (S170), the system will display the previous screen.

Figure 58:
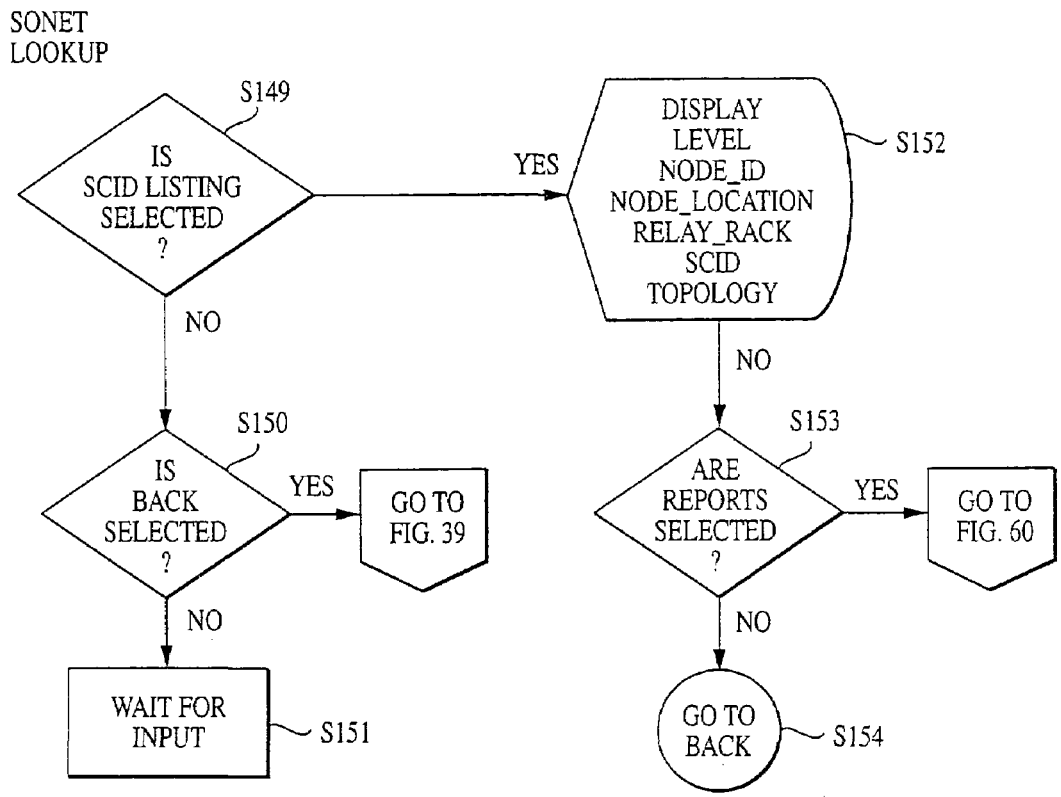
FIG. 58 is a flowchart showing further operational processing of a SONET lookup option of an EFIS system according to the present invention.

As shown in FIGS. 56, 57 and 58 if, under the SONET main menu, cable input was not selected (S134), and another field was populated (S140), the system will check to see if enter was selected (S143). If enter was not selected, the system will check to see if SCID listing or back was selected, and if not, the system will wait for user input (S151). If back is selected (S150), the system will display the previous menu screen.

If enter has been selected (S143), the system will display level, node ID, node location, relay rack, SCID, and topology (S144). The system will then check to see if the user has selected draw (S145), reports (S146), or back (S147), and if not, the system will wait for user input (S148).

If draw has been selected (S145), the system will proceed as shown in step S155, and as recited previously when draw was selected under cable input (FIG. 56, step 136).

If reports has been selected (S146), the system will proceed as shown in step S158, and as recited previously when reports was selected under cable input.

As shown in FIGS. 57 and 58, if enter was not selected (S143), and SCID listing was selected (S149), the system will display level, node ID, node location, relay rack, SCID, and topology (S152). The system will then check to see if reports (S153) has been selected, and if not, the system will go to back (S154). If reports have been selected (S153), the system will proceed as shown in step S158, and as recited previously when reports was selected under cable input.

Figure 63:
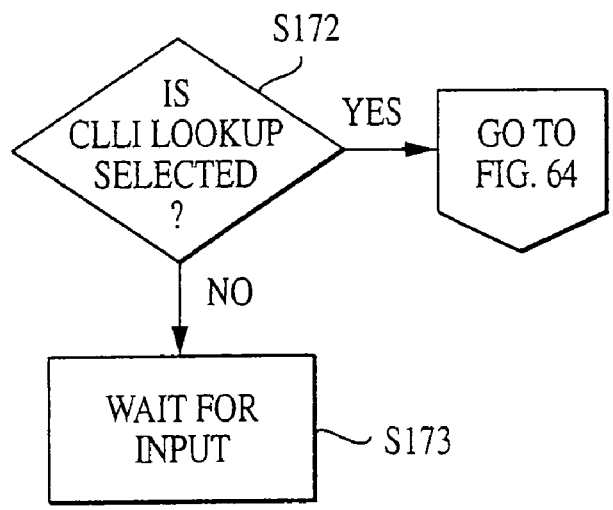
FIG. 63 is a flowchart showing the operational processing of a CLLI lookup option of an EFIS system according to the present invention.

Some features may be selected by the user from any screen. As shown in FIG. 63, the user may select CLLI lookup (S172) from any menu screen.

Figure 64:
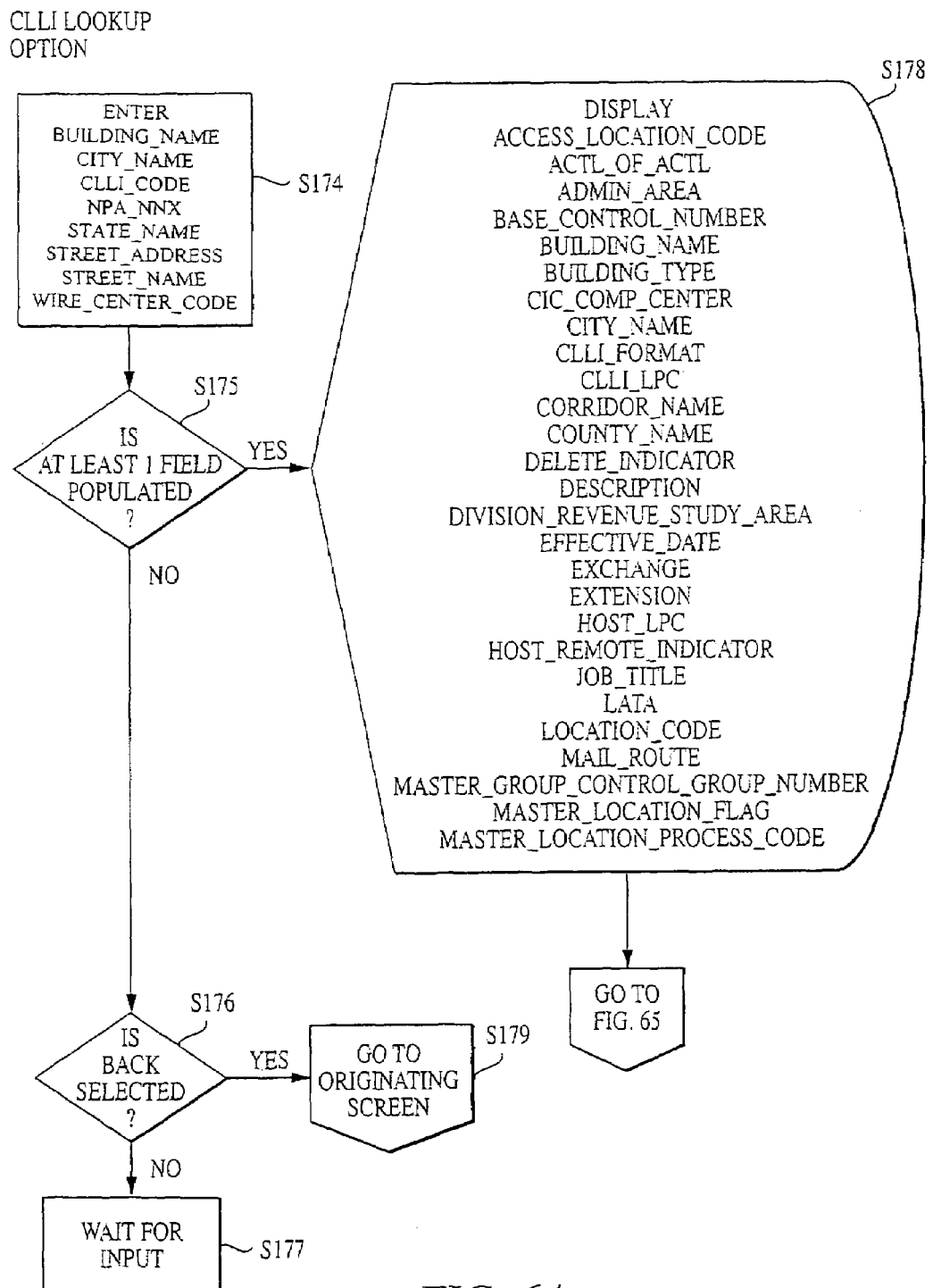
FIG. 64 is a flowchart showing further operational processing of a CLLI lookup option of an EFIS system according to the present invention.
Figure 65:
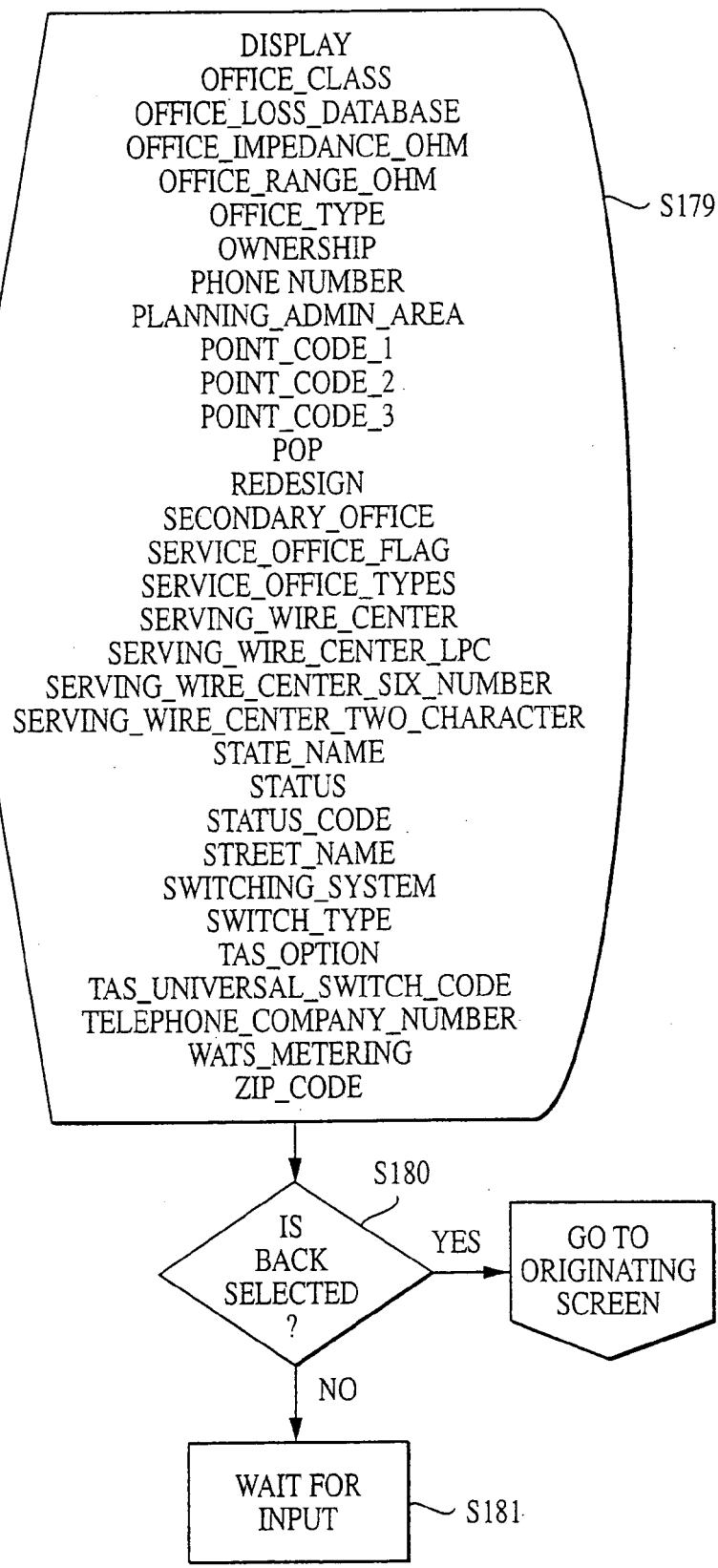
FIG. 65 is a flowchart showing further operational processing of a CLLI lookup option of an EFIS system according to the present invention.

FIGS. 63, 64 and 65 show that if CLLI lookup has been selected from any screen (S172), the system will provide text input boxes for the user to enter information regarding building name, city name, CLLI code, NPA NNX, state name, street address, street name, and wire center code (S174). The system will wait for the user to enter information in at least one of these fields (S175) or for the user to select back (S176) which causes the system to display the previously or originating displayed screen (S179). If the user has entered information in at least one of these fields (S175), the system will display access location code, ACTL of ACTO, admin area, base control number, building name, building type, CIC comp center, city name, CLLI format, CLLI LPC, corridor name, county name, delete indicator, description, division revenue study area, effective date, exchange, extension, host LPC, host remote indicator, job title, LATA, location code, mail route, master Group control group number, master location flag, and master location process code (S178).

As shown in FIG. 65, the system will also display office class, office lost database, office impedance OHM, office range OHM, office type, ownership, phone number, planning admin area, point code 1, point code 2, point code 3, POP, redesign, secondary office, service office flag, service office types, serving wire center, serving wire center LPC, serving wire center six number, serving wire center two character, state name, status, status code, street name, switching system, switch type, TAS option, TAS universal switch code, telephone company number, wats metering, and zip code (S179).

If the user selects back (S180), the system will go to the previous screen (S182) and, if not, the system will wait for further user input (S181).

It is noted that the foregoing examples have been provided merely for the purpose of explanation and are in no way to be construed as limiting of the present invention. While the present invention has been described with reference to a preferred embodiment, it is understood that the words which have been used herein are words of description and illustration, rather than words of limitation. Changes may be made within the purview of the appended claims, as presently stated and as amended, without departing from the scope and spirit of the present invention in any or all of its aspects. Although the present invention has been described herein with reference to particular means, materials, and embodiments, the present invention is not intended to be limited to the particulars disclosed herein, rather, the present invention extends to all functionally equivalent structures, methods and uses, such as are within the scope of the appended claims.

What is claimed is:

1. A system for providing networked equipment information and information of network users associated with networked equipment, comprising:
    a display that displays a graphical user interface that allows access to the networked equipment information and the information of network users associated with networked equipment, the graphical user interface having at least one input area that allows search criteria, related to at least one of equipment data and user data, to be input to initiate a search, and at least one results area that displays a result of the search, the result comprising at least one of the networked equipment information and the information of network users associated with networked equipment related to the search criteria; and a processor that implements the search for at least one of the networked equipment information and the information of network users associated with networked equipment in response to the input search criteria.

2. The system according to claim 1, further comprising:
a database that stores the networked equipment information and the information of network users,
wherein the processor retrieves the networked equipment information and the information of network users from the database.

3. The system according to claim 2,
wherein the database comprises:
a network and services database; and
a data propagator that acts as an intermediary between the network and services database and the processor.

4. The system according to claim 1,
wherein the graphical user interface displays a plurality of equipment types and allows selection of one of the equipment types and a search for the networked equipment information and the information of network users based on the selected equipment type.

5. The system according to claim 4,
wherein one of the equipment types includes SONET equipment, the graphical user interface displaying SONET networked equipment information as the result when SONET equipment data is input as the search criteria.

6. The system according to claim 4,
wherein one of the equipment types includes circuit equipment, the graphical user interface displaying circuit networked equipment information as the result when circuit equipment data is input as the search criteria.

7. The system according to claim 1,
wherein when the user data is entered as the search criteria, the graphical user interface displays information of network users as the result.

8. At least one computer readable medium for storing computer instructions that provide networked equipment information and information of network users associated with networked equipment, the at least one computer readable medium comprising:
a first displaying code segment that causes at least one input area to be displayed, the input area allowing search criteria, related to at least one of equipment data and user data, to be input;
a searching code segment that searches a database based on the search criteria; and
a second displaying code segment that causes at least one results area to be displayed, the at least one results area displaying a result of the search, the result comprising at least one of the networked equipment information and information of network users associated with networked equipment related to the search criteria.

9. The at least one computer readable medium according to claim 8, further comprising:
a storing code segment that stores the networked equipment information and the information of network users in the database; and
a retrieving code segment that retrieves the stored networked equipment information and the information of network users from the database.

10. The at least one computer readable medium according to claim 9,
wherein the database comprises:
a network and services database; and
a data propagator code segment that acts as an intermediary between the network and services database and a processor.

11. The at least one computer readable medium according to claim 8,
wherein the first displaying code segment further causes a plurality of equipment types to be displayed, enabling selection of one of the equipment types, the searching code segment searching for the networked equipment information and the information of network users based on the selected equipment type.

12. The at least one computer readable medium according to claim 11,
wherein one of the equipment types includes SONET equipment, the second displaying code segment causing SONET networked equipment information to be displayed as the result when SONET equipment data is input as the search criteria.

13. The at least one computer readable medium according to claim 11,
wherein one of the equipment types includes circuit equipment, the second displaying code segment causing circuit networked equipment information to be displayed as the result when circuit equipment data is input as the search criteria.

14. The at least one computer readable medium according to claim 8,
wherein when the user data is entered as the search criteria, the second display code segment causes information of network users to be displayed as the result.

15. A system that provides networked equipment information and information of network users associated with networked equipment, the system comprising:
a display that displays a graphical user interface that allows access to the networked equipment information and the information of network users associated with networked equipment; and
a processor that retrieves the networked equipment information and the information of network users associated with networked equipment,
wherein the graphical user interface includes at least one input area that allows a search criteria, related to at least one of equipment data and user data, to be input to initiate a search; and
at least one results area that displays a result of the search, the result comprising at least one of the networked equipment information and the information of network users associated with networked equipment related to the search criteria.

16. The system according to claim 15, further comprising:
a database that stores the networked equipment information and the information of network users.

17. The system according to claim 16,
wherein the database comprises:
a network and services database; and
a data propagator that acts as an intermediary between the network and services database and the processor.

18. The system according to claim 15,
wherein the graphical user interface displays a plurality of equipment types and allows a selection of one of the equipment types and a search for the networked equipment information and the information of network users based on the selected equipment type.

19. The system according to claim 18, wherein one of the equipment types includes SONET equipment, the graphical user interface displaying SONET networked equipment information as the result when SONET equipment data is input as the search criteria.

20. The system according to claim 18, wherein one of the equipment types includes circuit equipment, the graphical user interface displaying circuit networked equipment information as the result when circuit equipment data is input as the search criteria.

* * * * *